(12) United States Patent
Kildew et al.

(10) Patent No.: US 12,510,174 B2
(45) Date of Patent: Dec. 30, 2025

(54) AUTO-DRAINING DIVERTER VALVE

(71) Applicant: GEBERIT INTERNATIONAL AG, Jona (CH)

(72) Inventors: James Kildew, Des Plaines, IL (US); Andrew Helgeland, Des Plaines, IL (US); Douglas Fischer, Des Plaines, IL (US); David Vagasky, Des Plaines, IL (US)

(73) Assignee: Geberit International SG, Jona (CH)

( * ) Notice: Subject to any disclaimer, the term of this patent is extended or adjusted under 35 U.S.C. 154(b) by 39 days.

(21) Appl. No.: 18/534,513

(22) Filed: Dec. 8, 2023

(65) Prior Publication Data

US 2024/0360909 A1 Oct. 31, 2024

Related U.S. Application Data

(60) Provisional application No. 63/578,476, filed on Aug. 24, 2023, provisional application No. 63/499,027, filed on Apr. 28, 2023.

(51) Int. Cl.
| | |
|---|---|
| *F16K 11/16* | (2006.01) |
| *A61M 39/26* | (2006.01) |
| *F16K 11/076* | (2006.01) |
| *F16T 1/42* | (2006.01) |

(52) U.S. Cl.
CPC .......... *F16K 11/163* (2013.01); *F16K 11/076* (2013.01); *F16T 1/42* (2013.01); *A61M 2039/266* (2013.01)

(58) Field of Classification Search
CPC ...... F16K 11/163; F16K 24/02; F16K 11/085; F16K 1/076; F16K 11/074; A61M 2039/266; E03B 9/14; E03C 2201/30; F24D 17/0073
See application file for complete search history.

(56) References Cited

U.S. PATENT DOCUMENTS

| | | | | |
|---|---|---|---|---|
| 2,646,059 A | * | 7/1953 | Wittner | E03C 1/104 137/107 |
| 2,775,979 A | * | 1/1957 | Stout | F16K 15/00 137/433 |
| 4,976,279 A | * | 12/1990 | King, Sr. | E03C 1/104 137/107 |
| 7,343,933 B2 | * | 3/2008 | McBeth | F16K 11/074 137/625.46 |

FOREIGN PATENT DOCUMENTS

KR 101890412 B1 * 10/2018

* cited by examiner

*Primary Examiner* — Atif H Chaudry
(74) *Attorney, Agent, or Firm* — Polsinelli PC

(57) ABSTRACT

The present disclosure provides for fluid valves with automatic draining diverters.

9 Claims, 41 Drawing Sheets

AUTO-DRAINING DIVERTER VALVE

FIELD OF THE DISCLOSURE

The present disclosure relates to a fluid valve with an automatic draining function also referred to as an auto-draining diverter valve.

BACKGROUND OF THE INVENTION

Water valves are useful in today's society. These water valves can be used in various settings such as a residential setting, a commercial setting, a hospital setting, a nursing home setting, an assisted living environment, an extended care setting, etc. In each of these settings, water is introduced through a pressured water inlet pipe and directed to an overhead shower device, a hand-held shower device, a wall mounted shower device, or a combination of two or more devices. When water pressure is released from these shower devices, a portion of the water in these devices is drained but a significant amount of water is still retained within the valves, lines, valves, faucets, and fixtures. This standing water in the shower device, valves, and water lines can potentially cause calcium and lime buildup with the shower device, lines, valves, faucets, and fixtures. This water can also provide a venue for pathogenic species propagation. Generally, the pathogenic build-up causes limited issues with most people. Yet, for the people especially with compromised or diminished immune systems, lacerations, or the elderly, the presence of these pathogenic species can cause serious health issues.

Diverter valves are not necessarily a new concept. Diverter valves can be used to transport various material such as chemicals, bulk solids, oil, and water through a system in different directions and to various components connected to the system. These diverter valves can come in various configurations such as a two valve, a three valve, or multiple valves that provide continuous flow through a center point. Yet, the diverter valves would require to be flushed or a clean out to remove a portion of the materials from the diverter valve.

What is needed is a fluid valve especially a water valve with automatic draining diverter which is activated by fluidic pressure, can direct the flow a fluid through various fluid outlet ports from a fluid inlet port, and drains the fluid from the fluid valve when the fluid pressure decreases, thereby eliminating the venue for pathogens.

SUMMARY OF THE INVENTION

In one aspect of the present disclosure is a fluid valve with automatic draining diverter comprising: a valve body defining an interior; a fluid inlet in fluidic communication with the interior; a first passage in fluidic communication with the interior; a first outlet in fluidic communication with the first passage; a second passage in fluidic communication with the interior; a second outlet in fluidic communication with the second passage; a diverter passage in fluidic communication with the interior; a diverter outlet in fluidic communication with the diverter passage; a diverter actuator stem configured to rotate between a first configuration and a second configuration; an auto drain seal mounted within the diverter actuator stem; wherein, the first configuration, the diverter actuator stem directs a fluid to the first outlet and closes the second outlet; and wherein, the second configuration, the diverter actuator stem directs the fluid to the second outlet and closes the first outlet.

In another aspect of the present disclosure is a fluid valve with automatic draining diverter comprising: a valve body defining an interior; a fluid inlet in fluidic communication with the interior; a first passage in fluidic communication with the interior; a first outlet in fluidic communication with the first passage; a second passage in fluidic communication with the interior; a second outlet in fluidic communication with the second passage; a third passage in fluidic communication with the interior; a third outlet in fluidic communication with the third passage; a diverter passage in fluidic communication with the interior; a diverter outlet in fluidic communication with the diverter passage; a diverter actuator stem configured to rotate between a first configuration, a second configuration, and a third configuration; an auto drain seal diaphragm mounted within the diverter actuator stem; wherein, the first configuration, the diverter actuator stem directs a fluid to the first outlet and closes the second outlet and the third outlet; and wherein, the second configuration, the diverter actuator stem directs the fluid to the second outlet and closes the first outlet and third outlet; wherein, the third configuration, the diverter actuator stem directs the fluid to the third outlet and closes the first outlet and the second outlet; wherein a diverter cap may be placed on the first outlet, the second outlet, or the third outlet not allowing the fluid to flow through the first outlet, the second outlet, or the third outlet.

In yet another embodiment of the present disclosure is a fluid valve with automatic draining diverter comprising: a valve body defining an interior; a fluid inlet in fluidic communication with the interior; a first passage in fluidic communication with the interior; a first outlet in fluidic communication with the first passage; a second passage in fluid communication with the interior; a second outlet in fluidic communication with the second passage; a diverter passage in fluidic communication with the interior; a diverter outlet in fluidic communication with the diverter passage; a diverter actuator stem configured to rotate between a first configuration and a second configuration; a diverter return spring and an auto drain seal plunger mounted between the diverter actuator stem and the first outlet and the second outlet; wherein, the first configuration, the diverter actuator stem directs a fluid to the first outlet and closes the second outlet; and wherein, the second configuration, the diverter actuator stem directs the fluid to the second outlet and closes the first outlet; wherein, upon a reduction in the water pressure in the interior causes the diverter return spring to open the gap between the auto drain seal plunger and the valve body, allowing the water to drain from the first and the second outlet, all associated pipes connected to these outlets, devices connected to these outlets, and diverter body interior automatically.

In still another embodiment of the present disclosure is a fluid valve with automatic draining diverter comprising: a valve body defining an interior; a fluid inlet in fluidic communication with the interior; a first passage in fluidic communication with the interior; a first outlet in fluidic communication with the first passage; a second passage in fluid communication with the interior; a second outlet in fluidic communication with the second passage; a third passage in fluidic communication with the interior; a third outlet in fluidic communication with the third passage; a diverter passage in fluidic communication with the interior; a diverter outlet in fluidic communication with the diverter passage; a diverter actuator stem configured to rotate between a first configuration, a second configuration, and a third configuration; a diverter return spring and an auto drain seal plunger mounted between the diverter actuator stem and the first outlet and the second outlet; wherein, the first configuration, the diverter actuator stem directs a fluid to the first outlet and closes the second outlet and the third outlet; and wherein, the second configuration, the diverter actuator stem directs the fluid to the second outlet and closes the first outlet and the third outlet; wherein, the third configuration, the diverter actuator stem terminates directs the fluid to the third outlet and closes the first outlet and the second outlet and opens the diverter outlet; wherein, upon a reduction in the water pressure to the interior causes the diverter return spring to open the gap between the auto drain seal plunger and the valve body, allowing the water to drain from the first, second and third outlets, all associated pipes connected to these outlets, devices connected to these outlets, and diverter body interior automatically; wherein a diverter cap may be placed on the first outlet, the second outlet, or the third outlet not allowing the fluid to flow through the first outlet, the second outlet, or the third outlet.

In another embodiment of the present disclosure is a fluid valve with automatic draining diverter comprising: a valve body defining an interior; a first fluid inlet and a second fluid inlet in fluidic communication with the interior; a first passage in fluidic communication with the interior; a first outlet in fluidic communication with the first passage; a second passage in fluidic communication with the interior; a second outlet in fluidic communication with the second passage; a diverter passage in fluidic communication with the interior; a diverter outlet in fluidic communication with the diverter passage; a boot seal configured to regulate a flow of a fluid from the first fluid inlet, the second fluid inlet, and seal the fluid from a handle and a diverter body; a diverter knob configured to rotate a diverter body between a first configuration, a second configuration, and a third configuration; a diverter return spring mounted between the diverter body and a valve body cap; wherein, the first configuration, the diverter body directs a fluid to the first outlet; and wherein, the second configuration, the diverter body directs the fluid to the second outlet; wherein, the third configuration, the diverter body directs the fluid to the drain outlet.

Further provided herein is a fluid valve with automatic draining diverter. The fluid valve can include a valve body defining an interior; a fluid inlet in fluidic communication with the interior; a first passage in fluidic communication with the interior; a first outlet in fluidic communication with the first passage; a second passage in fluidic communication with the interior; a second outlet in fluidic communication with the second passage; a diverter passage in fluidic communication with the interior; a diverter outlet in fluidic communication with the diverter passage; a diverter actuator stem configured to rotate between a first configuration and a second configuration; and an auto drain seal mounted within the diverter actuator stem. In an aspect, in the first configuration, the diverter actuator stem directs a fluid to the first outlet and closes the second outlet. In an aspect, in the second configuration, the diverter actuator stem directs the fluid to the second outlet and closes the first outlet. In an aspect, the diverter actuator stem is mounted perpendicularly within the valve bod. In an aspect, the diverter actuator stem includes an upper diverter actuator coupled to a diverter handle, the upper diverter actuator comprising at least one hole; the auto drain seal coupled to a diverter seal retainer; and a lower diverter actuator coupled to the auto drain seal.

In various aspects, the diverter actuator stem provides a positive stop in either a clockwise or a counterclockwise direction. In an aspect, the auto drain seal is a pressure sensitive auto drain seal, the pressure sensitive auto drain seal configured in an expanded configuration and a normal configuration. In an aspect, an increase in a fluidic pressure within the interior causes the auto drain seal to expand within the diverter actuator stem from a normal configuration to an expanded configuration, closing a gap between the lower diverter actuator and the diverter outlet, and opening the first outlet or the second outlet. In an aspect, a decrease in a fluidic pressure within the interior causes the auto drain seal to return to a normal configuration from the expanded configuration, opening the gap between the lower diverter actuator and the diverter outlet, allowing the fluid to drain from the first outlet, the second outlet, associated pipes connected to the first outlet or the second outlet, devices connected to the first outlet or the second outlet, and the interior. In an aspect, the fluid valve with automatic draining diverter further includes a valve cap which is coupled to the diverter handle, the valve cap encapsulates the upper diverter actuator, the auto drain seal, and the lower diverter actuator within the valve body.

In various aspects, the fluid valve with automatic draining diverter further includes a third passage in fluidic communication with the interior and a third outlet in fluidic communication with the third passage. In an aspect, the diverter actuator stem is further configured to rotate between the first configuration, the second configuration, and a third configuration. In an aspect, the auto drain seal is an auto drain seal diaphragm. In an aspect, in the first configuration, the diverter actuator stem directs a fluid to the first outlet and closes the second outlet and the third outlet. In an aspect, the second configuration, the diverter actuator stem directs the fluid to the second outlet and closes the first outlet and third outlet. In an aspect, in the third configuration, the diverter actuator stem directs the fluid to the third outlet and closes the first outlet and the second outlet. In an aspect, a diverter cap may be placed on the first outlet, the second outlet, or the third outlet not allowing the fluid to flow through the first outlet, the second outlet, or the third outlet.

In various aspects, the fluid valve with automatic draining diverter further includes a diverter sleeve to encapsulate the upper diverter actuator, the auto drain seal diaphragm, and the lower diverter actuator; and at least one seal, the at least one seal is coupled externally to the upper diverter actuator and provides a seal against the diverter sleeve, the at least one seal provides a seal against the valve body and the diverter sleeve. In an aspect, the upper diverter actuator, the auto drain seal diaphragm and the lower diverter actuator provides fluidic communication between the fluid inlet and the first passage, fluidic communication between the fluid inlet and the second passage, and fluidic communication between the fluid inlet and the third passage. In an aspect, the fluid valve with automatic draining diverter further includes a threaded valve bonnet which is coupled to the valve body and encloses the upper diverter actuator, the auto drain seal diaphragm, and the lower diverter actuator within the valve body.

Further provided herein is a fluid valve with automatic draining diverter. The fluid valve with automatic draining diverter can include a valve body defining an interior; a fluid inlet in fluidic communication with the interior; a first passage in fluidic communication with the interior; a first outlet in fluidic communication with the first passage; a second passage in fluid communication with the interior; a second outlet in fluidic communication with the second passage; a diverter passage in fluidic communication with the interior; a diverter outlet in fluidic communication with the diverter passage; a diverter actuator stem configured to rotate between a first configuration and a second configuration; and a diverter return spring and an auto drain seal plunger mounted between the diverter actuator stem and the first outlet and the second outlet. In an aspect, in the first configuration, the diverter actuator stem directs a fluid to the first outlet and closes the second outlet. In an aspect, in the second configuration, the diverter actuator stem directs the fluid to the second outlet and closes the first outlet. In an aspect, a reduction in water pressure in the interior causes the diverter return spring to open a gap between the auto drain seal plunger and the valve body, allowing water to drain from the first and the second outlet, all associated pipes connected to these outlets, devices connected to these outlets, and diverter body interior automatically.

In various aspects, the diverter actuator stem is mounted perpendicularly within the valve body. In an aspect, the diverter actuator stem includes an upper diverter actuator body coupled to a diverter handle; the diverter return spring, the diverter return spring comprising a pressure sensitive diverter return spring mounted parallel to a central axis of the diverter actuator stem; and a lower diverter actuator. In an aspect, the pressure sensitive diverter return spring is configured in a compressed configuration and a normal configuration. In an aspect, the diverter actuator stem is configured to move vertically within the valve body. In an aspect, the auto drain seal plunger is located in between the diverter actuator stem and the pressure sensitive diverter return spring. In an aspect, the pressure sensitive diverter return spring is configured in a compressed configuration and a normal configuration, wherein, in the compressed configuration, the auto drain seal plunger seals the diverter passage, and wherein, in the normal configuration, the auto drain seal plunger seals the first outlet and the second outlet. In an aspect, the fluid valve with automatic draining diverter further includes a threaded valve body cap to enclose the diverter actuator stem, the auto drain seal plunger, and the pressure sensitive diverter return spring within the valve body.

In various aspects, the fluid valve with automatic draining diverter further includes a third passage in fluidic communication with the interior and a third outlet in fluidic communication with the third passage. In an aspect, the diverter actuator stem is configured to rotate between a first configuration, a second configuration, and a third configuration. In an aspect, in the first configuration, the diverter actuator stem directs a fluid to the first outlet and closes the second outlet and the third outlet. In an aspect, in the second configuration, the diverter actuator stem directs the fluid to the second outlet and closes the first outlet and the third outlet. In an aspect, in the third configuration, the diverter actuator stem directs the fluid to the third outlet and closes the first outlet and the second outlet. In an aspect, the reduction in the water pressure to the interior causes the diverter return spring to open the gap between the auto drain seal plunger and the valve body, allowing the water to drain from the first, second and third outlet, all associated pipes connected to these outlets, devices connected to these outlets, and diverter body interior automatically. In an aspect, a diverter cap may be placed on the first outlet, the second outlet, or the third outlet not allowing the fluid to flow through the first outlet, the second outlet, or the third outlet.

Further provided herein is a fluid valve with automatic draining diverter. The fluid valve with automatic draining diverter can include a valve body defining an interior; a first fluid inlet and a second fluid inlet in fluidic communication with the interior; a first passage in fluidic communication with the interior; a first outlet in fluidic communication with the first passage; a second passage in fluidic communication with the interior; a second outlet in fluidic communication with the second passage; a diverter passage in fluidic communication with the interior; a diverter outlet in fluidic communication with the diverter passage; a boot seal configured to regulate a flow of a fluid from the first fluid inlet, the second fluid inlet, and seal the fluid from a handle and a diverter body; a diverter knob configured to rotate a diverter body between a first configuration, a second configuration, and a third configuration; and a diverter return spring mounted between the diverter body and a valve body cap. In an aspect, in the first configuration, the diverter body directs a fluid to the first outlet. In an aspect, in the second configuration, the diverter body directs the fluid to the second outlet. In an aspect, in the third configuration, the diverter body directs the fluid to a drain outlet.

In various aspects, the diverter knob is coupled to the diverter body in a recess of a diverter handle. In an aspect, the diverter return spring is a pressure sensitive diverter return spring mounted parallel to a central axis of the diverter body, the pressure sensitive diverter return spring configured in a compressed configuration and a normal configuration. In an aspect, in the compressed configuration, the diverter body seals the diverter passage. In an aspect, in the normal configuration, the diverter body the diverter body seals the first outlet and the second outlet. In an aspect, wherein an increase in a fluidic pressure within the interior causes the diverter body to descend vertically within the valve body, the pressure sensitive diverter return spring compresses from a normal configuration to a compressed configuration, closing the diverter passage, and opening the first outlet and the second outlet. In an aspect, a decrease in the fluidic pressure within the interior causes the diverter body to ascend vertically within the valve body, the pressure sensitive diverter return spring expands from a compressed configuration to a normal configuration, opening the diverter passage, allowing water to flow from the first outlet, the second outlet, associated pipes, devices connected to the first outlet and second outlet, and diverter body interior, automatically draining the fluid in the first outlet and second outlet and associated pipes and diverter body interior to the drain outlet.

Other features and iterations of the invention are described in more detail below.

DETAILED DESCRIPTION OF THE INVENTION

A fluid valve with automatic draining diverter will now be described with reference to FIGS. 1-37. Various fluids may be used in the fluid valve with automatic draining diverter but primarily water. The water may be hot water, cold water, or tempered water. The fluid valve with automatic draining diverter may be used in a home environment, a medical environment such as a hospital, urgent care, or doctor's office, a senior living environment, an assisted living environment, and the like.

Figure 1:
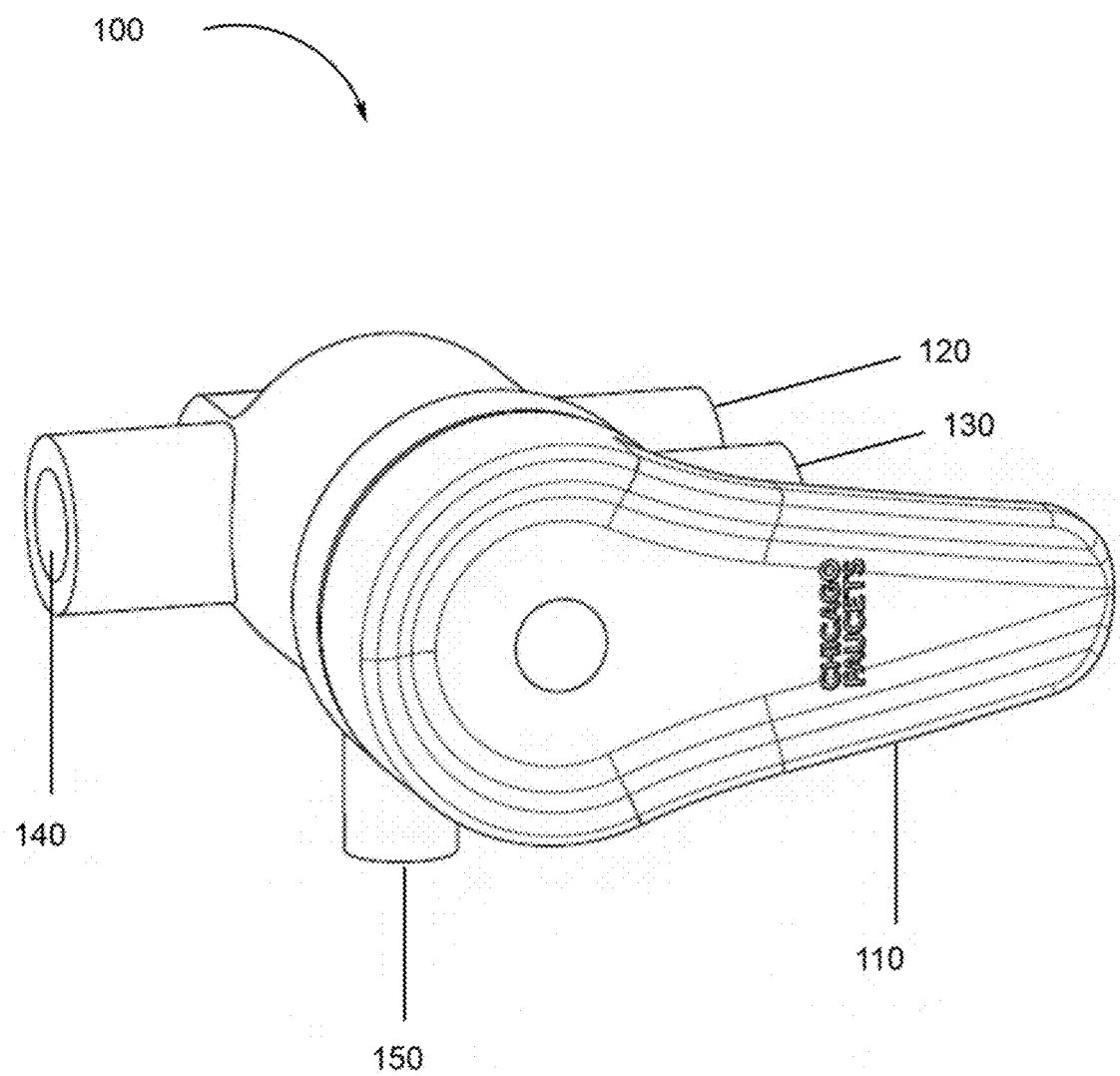
FIG. 1 is a perspective view (frontal view) of the fluid valve with automatic draining diverter according to one aspect.

With respect to FIG. 1, an external view of a frontal shower (wall) mount view of the fluid valve with automatic draining diverter is shown. In this aspect, the fluid valve with automatic draining diverter 100 includes a valve body, a diverter handle 110, a fluid inlet 130, an auto drain outlet 150, a first outlet 120, and a second outlet 140. The valve body defines the interior of the fluid valve. In order to direct the water to one of the fluid outlets, the handle is rotated 90° to the right or 90° to the left either the first configuration (first outlet 120) or the second configuration (second outlet 140). By rotating the handle 90° in either a clockwise or a counterclockwise direction to the first or second configuration, pressurized water flows from the fluid inlet 130, through the valve body to either the first outlet 120 or second outlet 140. The first outlet 120 or the second outlet 140 may be connected to an output device such as a hand-held shower, an overhead shower, a tub filing device, a second hand-held shower, etc. Upon completion of utilizing the output device, the water pressure in a main pressure ON/OFF valve is turned off. By turning the water pressure off, the water pressure to the diverter valve is eliminated and an auto drain seal (not shown) relaxes. Thereby, draining the water not only from the output devices connected the first outlet 120 and the second outlet 140 but also from the interior of the valve body and all associated pipes in which the diverter diverts water to. Regardless of the diverter handle is position, whether the diverter handle 110 is in the OFF position, rotated 90° to the right to the first configuration (first outlet 120) or 90° to the left to the second configuration (second outlet 140), the water is drained through outlet 150.

The valve handle 110 and valve body may be made of the same material or a different material. The valve handle 110 and valve body may be made from a metal, metals and metal alloys such as stainless steel or brass, plastics, and a like which do not rust or corrode in the presence of water.

Figure 2:
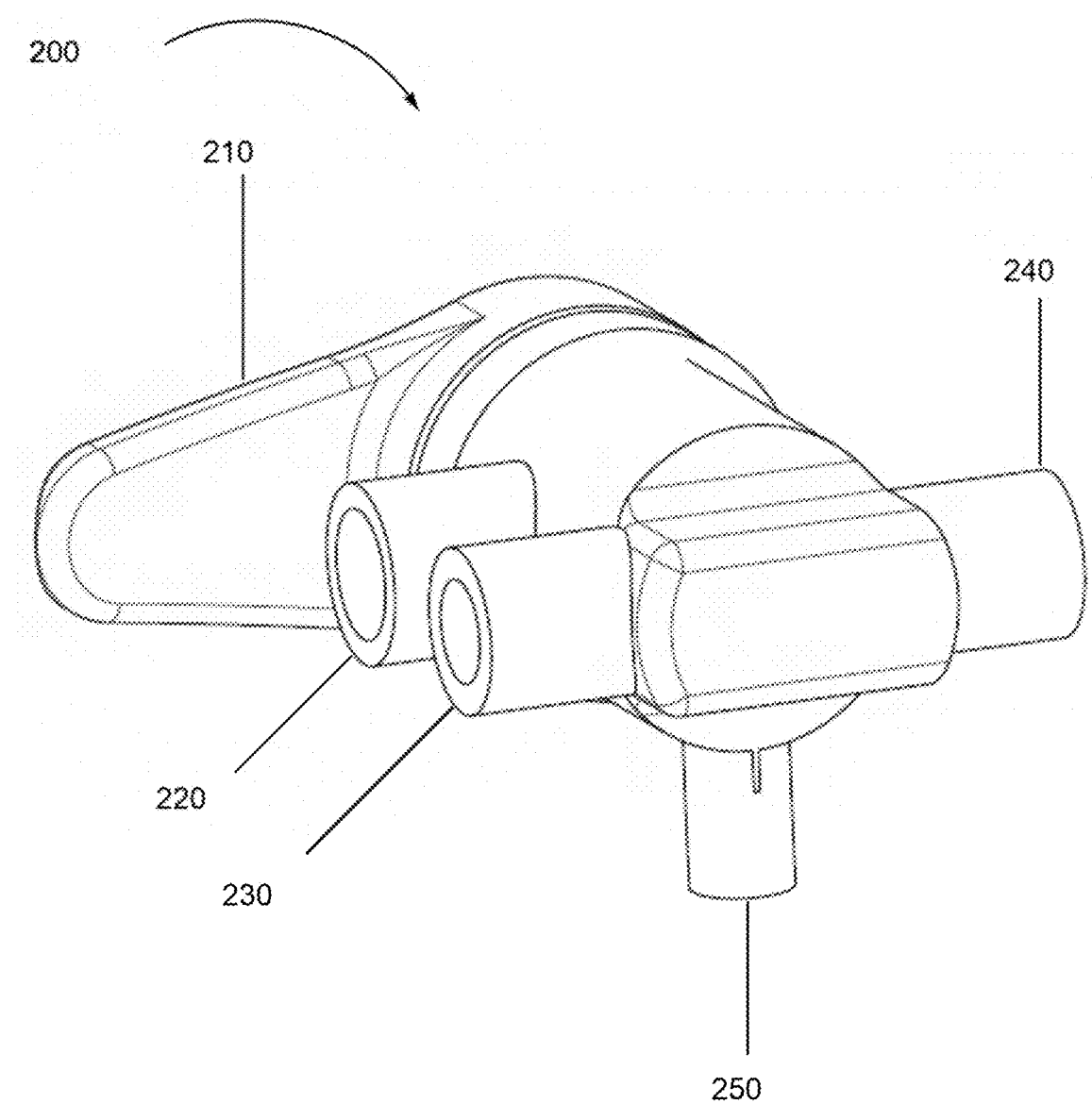
FIG. 2 is a rear view of the fluid valve of FIG. 1 according to one aspect.

FIG. 2 is the rear view of the fluid valve with automatic draining diverter. The fluid valve with automatic draining diverter 200 includes a diverter handle 210, a fluid inlet 220, a first outlet 230, a second outlet 240, and a diverter outlet 250.

In this aspect, the fluid handle 210 is rotated 90° to activate the water to the first outlet 230 or the second outlet 240. Rotating the diverter handle 210 to either a 90° clockwise or counterclockwise rotation, the water flow to the first outlet 230 or the second outlet 240 is terminated thereby eliminating the water flow to either the first outlet 230 or the second outlet 240. In between the first outlet 230 and the second outlet 240, water does not flow to the diverter pipe rather water remains in the diverter pipe. Once water is terminated by a main pressure balancing ON/OFF valve, an auto drain seal relaxes and allows the water in the first outlet 230, the second outlet 240, associated pipes connected to the outlets, devices connected to these outlets, and water in the interior of the valve body to drain.

Figure 3:
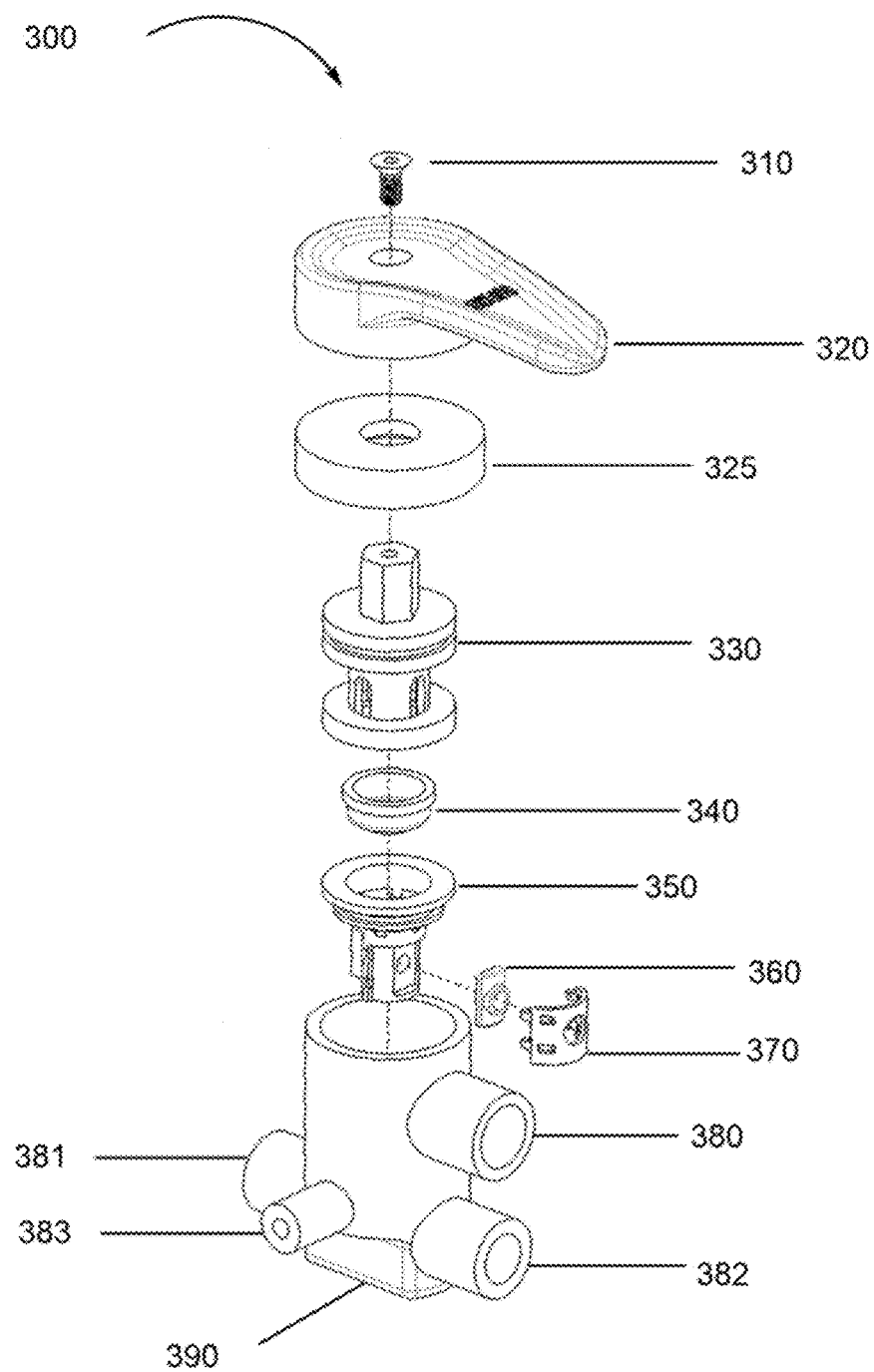
FIG. 3 is an exploded view of the fluid valve with automatic draining diverter of FIG. 1 showing the internal components utilizing a pressure sensitive drain seal diaphragm according to one aspect.

With regards to FIG. 3, an internal view of a fluid valve with automatic draining diverter 300 in the valve body 390 is shown. The fluid valve with automatic draining diverter 300 includes a valve handle 320 coupled to the upper diverter actuator body 330 by a screw 310 through a hole in the valve handle 320 and valve cap 325. The screw 310 may be made of a metal, a metal alloy, or a combination of a metal and metal alloy such as stainless steel or brass such that the metal or metal alloys do not corrode in the presence of water. By rotating the diverter handle 90° either clockwise or counterclockwise, water flows from the fluid inlet 380 to either the first outlet 381 or the second outlet 382.

In this aspect, the upper diverter body 330 is part of the diverter actuator stem. The diverter actuator stem includes the upper diverter actuator body 330 (upper diverter actuator), an auto drain seal 340, and a lower diverter actuator body 350 (lower diverter actuator). The diverter actuator stem is mounted perpendicular within the valve body 390 and contained within the valve body 390 using a valve cap 325. A hole in the valve cap 325 couples the diverter handle 320 to the upper diverter actuator body 330 using the screw 310 maintaining the perpendicular position. Once activated by rotating 90° to the right, the diverter actuator stem provides fluidic communication between the fluid inlet 380 through the first passage to the first outlet 381. By rotating the diverter actuator stem 90° to the left, which is coupled to the diverter handle 320, the diverter actuator stem provides fluidic communication between the fluid inlet 380 through the second passage to the second outlet 382. The upper diverter body includes at least one holes wherein the rotation aligns one of the holes and provides fluidic communication through with the first passage or the second passage to one of the outlets. Additionally, the upper diverter body 330 includes an additional seal. The seal (not shown) is externally coupled to the upper diverter body 330 and provides a watertight seal between the upper diverter body 330 and the valve body 390.

In this aspect, an auto drain seal 340 is located between the upper diverter actuator body 330 and a lower diverter actuator body 350. The upper diverter actuator body 330 and the lower diverter actuator body 350 additionally provides a positive stop to move the water from the water inlet 380 through the internal components of the fluid valve with automatic draining diverter 300 to either the first outlet 381 or the second outlet 382. On the lower diverter actuator body 350, a diverter seal 360 and diverter seal retainer 370 is coupled. The diverter seal 360 provides a sealed water flow from the fluid inlet 380 to either the first outlet 381 or the second outlet 382 and the valve body 390. The diverter seal 360 is coupled to the lower diverter body 350 using a diverter seal retainer 370.

The auto drain seal 340 and the diverter seal 360 may be made of various elastomer substances such as styrene butadiene, neoprene, acrylonitrile butadiene rubber, ethylene propylene diene rubber, butyl rubber, or alike. The auto drain seal 340 may be made of an elastomer material which is flexible and considered a pressure sensitive auto drain seal.

The auto drain seal 340 may be configured in either an expanded configuration or a normal configuration. Under an increase in the fluidic water pressure within the interior causes the pressure sensitive auto drain seal 340 to expand from a normal configuration to an expanded configuration. In the expanded configuration, the pressure sensitive auto drain seal 340 expands within the diverter actuator stem, closing a gap between the lower diverter actuator body 350 and the pressure sensitive auto drain seal 340 (i.e., diaphragm) allowing water to be directed to the first outlet 381 and second outlet 382. Thus, the first outlet 381 and second outlet 382 are opened depending on the rotation of the diverter handle 320. When the fluidic water pressure is terminated by turning off the water pressure by turning off the pressure balancing ON/OFF valve, regardless of the diverter handle position, the auto drain seal 340 returns from an expanded configuration to a normal configuration. In a normal configuration, the gap between the lower diverter actuator body 350 and the pressure sensitive auto drain seal 340 while the first outlet 381 or second outlet 382 closes depending on the diverter handle 320 position. With the termination of water pressure, the water in the device, internally within the valve body 390, associated pipes connected to the first outlet 381 and second outlet 382, and connected devices to the outlets drains by gravity.

Figure 4:
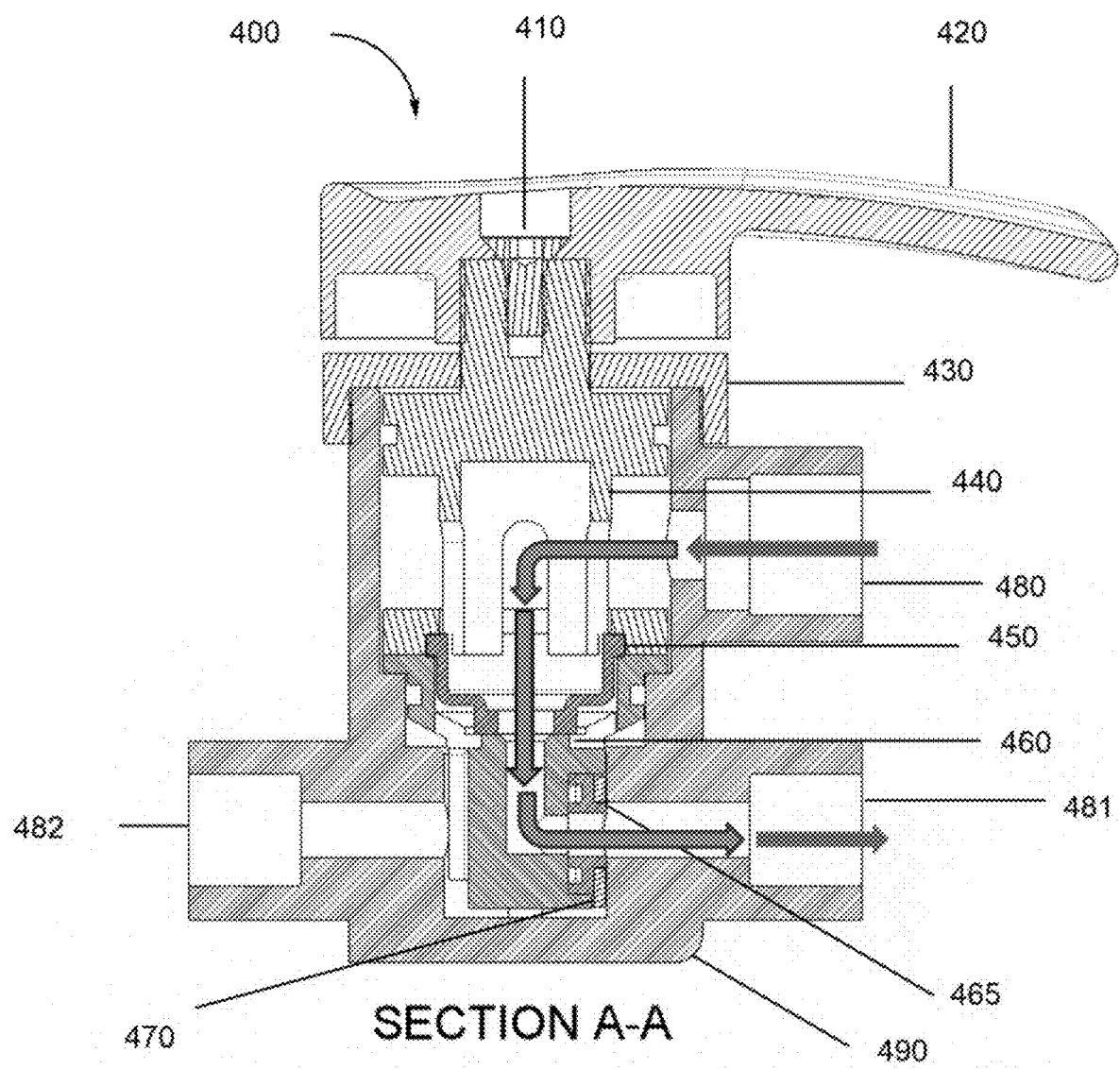
FIG. 4 is a cross-sectional view of the fluid valve with automatic draining diverter of FIG. 1 showing the internal components and the flow of fluid from the fluid inlet through the first passage to a first outlet according to one aspect.

With respect to FIG. 4, an internal view of the fluid valve with automatic draining diverter is shown. In this figure, the direction of the pressurized water from the fluid inlet 480 to the first outlet 481 is shown. The water entering the fluid inlet 480 may be cold water or tempered water ranging from a temperature from about 10° C. to about 85° C. and a pressure ranging from about 10 pounds per square inch (psi) to about 150 psi.

The fluid valve with automatic draining diverter 400 includes a diverter handle 420 coupled by a screw 410 to an upper diverter actuator 440 through a hole in the diverter handle 420 and valve body cap 430. The valve body cap 430 encapsulates a diverter actuator stem within a valve body 490. The diverter actuator stem includes the upper valve actuator 440, an auto drain seal 450, and a lower diverter actuator 460 which is in a perpendicular position within the valve body 490.

In this aspect, by rotating the diverter handle 420 by 90° to the right, water flows through the fluid inlet 480 into the first passage. In the first passage, the water is directed through at least one hole in the upper diverter actuator 440 and contacts an auto drain seal 450. The auto drain seal is considered a pressure sensitive auto drain seal. The fluidic pressure of the water may cause the pressure sensitive auto drain seal 450 to expand and to close the gap between the lower diverter actuator 460 and the pressure sensitive auto drain seal 450. The water, after exiting the upper diverter actuator 440, activating the pressure sensitive auto drain seal 450, travels through the lower diverter actuator 460. Exiting the lower diverter actuator 460, the water passes through the diverter seal 465 which is coupled to the lower diverter actuator by the diverter seal retainer 470. The water exits the first passage and enters the first outlet 481. No water exits through the second outlet 482 nor the diverter outlet (not shown) since the diverter handle 420 is selected for the first outlet device. As the water enters the first outlet 481, the water then proceeds to the device connected to the first outlet 481 such as an overhead shower device option.

Figure 5:
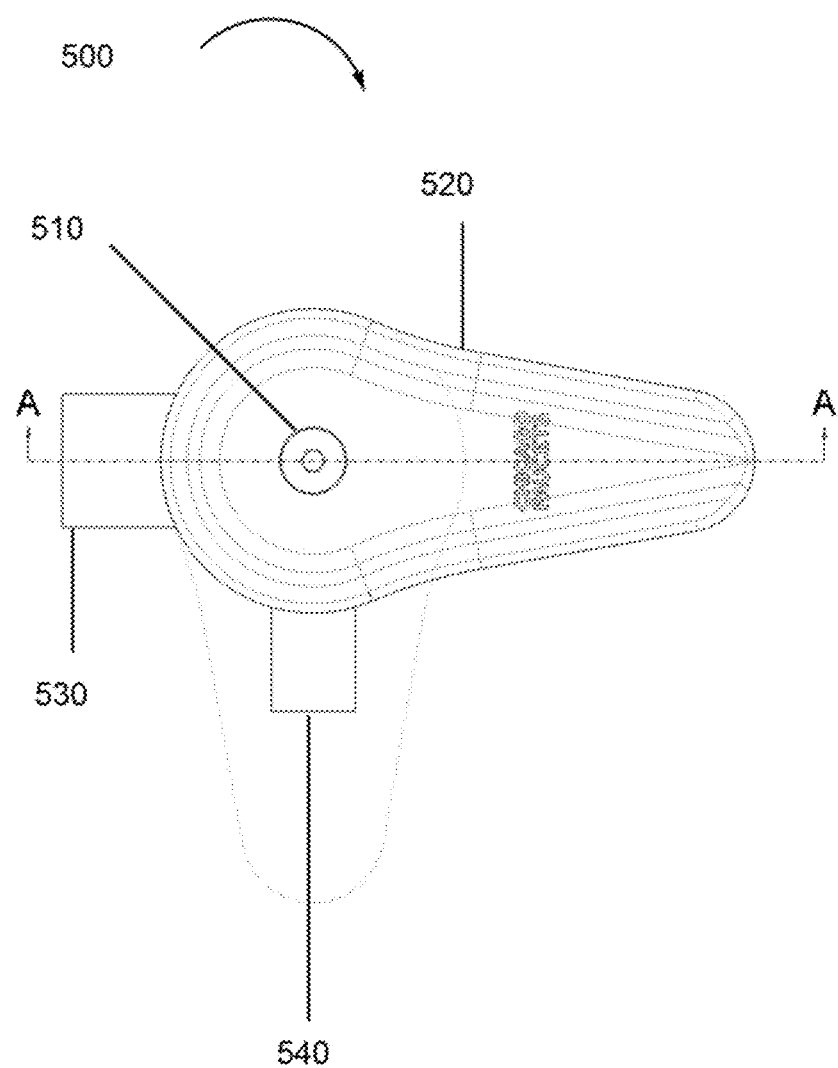
FIG. 5 is a front elevation view of the fluid valve with automatic draining diverter of FIG. 1 wherein the diverter handle is moved 90° from a closed position to the first outlet according to one aspect.

With respect to FIG. 5, an external view of the fluid valve with automatic draining diverter 500 is shown. The external view of the automatic draining diverter 500 includes a diverter handle 520 coupled to the valve body with a screw 510. By rotating the diverter handle 520 to the right by 90°, water flows from the fluid inlet (not shown) through the valve and out through the first outlet (now shown, under the fluid handle 520). The second fluid outlet 530 and the diverter outlet 540 are shown for reference.

Figure 6:
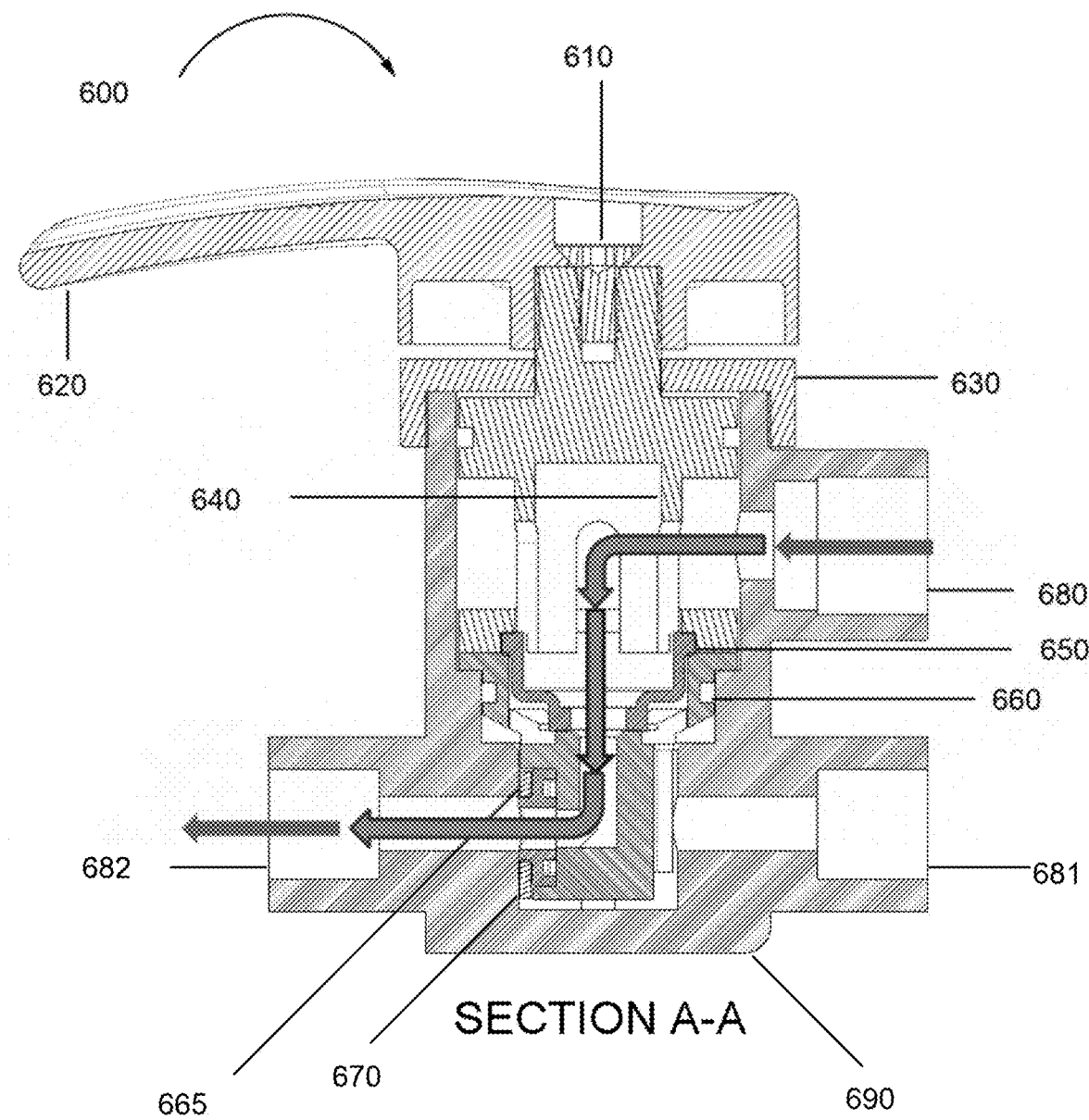
FIG. 6 is a cross-sectional view of the fluid valve with automatic draining diverter of FIG. 1 showing the flow of fluid from the fluid inlet through a second passage to a second outlet according to one aspect.

With respect to FIG. 6, an internal view of the fluid valve with automatic draining diverter 600 is shown. In this figure, the direction of the pressurized water from the fluid inlet 680 to the second outlet 682 is shown. The water entering the fluid inlet 680 may be cold water or tempered water ranging from a temperature from about 10° C. to about 85° C. The water may have a pressure ranging from about 10 pounds per square inch (psi) to about 150 psi.

In this aspect, the fluid valve with automatic draining diverter 600 includes a diverter handle 620 coupled by a screw 610 to the upper diverter actuator 640 through a hole in the valve body cap 630. The valve body cap 630 encapsulates the diverter actuator stem within the valve body 690. The diverter actuator stem includes the upper valve actuator 640, an auto drain seal 650, and a lower diverter actuator 660.

In this aspect, by rotating the diverter handle 620 by 90° to the left, water flows through the fluid inlet 680 into the second passage. In the second passage, the water is directed by holes in the upper diverter actuator 640 and contacts the auto drain seal 650. The auto drain seal is considered a pressure sensitive auto drain seal. The fluidic pressure of the water may cause the pressure sensitive auto drain seal 650 to expand and close the gap between the lower diverter actuator 660 and the auto drain seal 650 and the diverter outlet (not shown). The water, after exiting the upper diverter actuator 640 and activating the pressure sensitive auto drain seal 650, travels through the lower diverter actuator 660. Exiting the lower diverter actuator 660, the water enters the fluid outlet 682. No water exits through the first outlet 681 nor the diverter outlet (not shown). As the water enters the second outlet 682, the water then proceeds to the associated piping and a device connected to the second outlet 682 such as a hand-held shower device.

Figure 7:
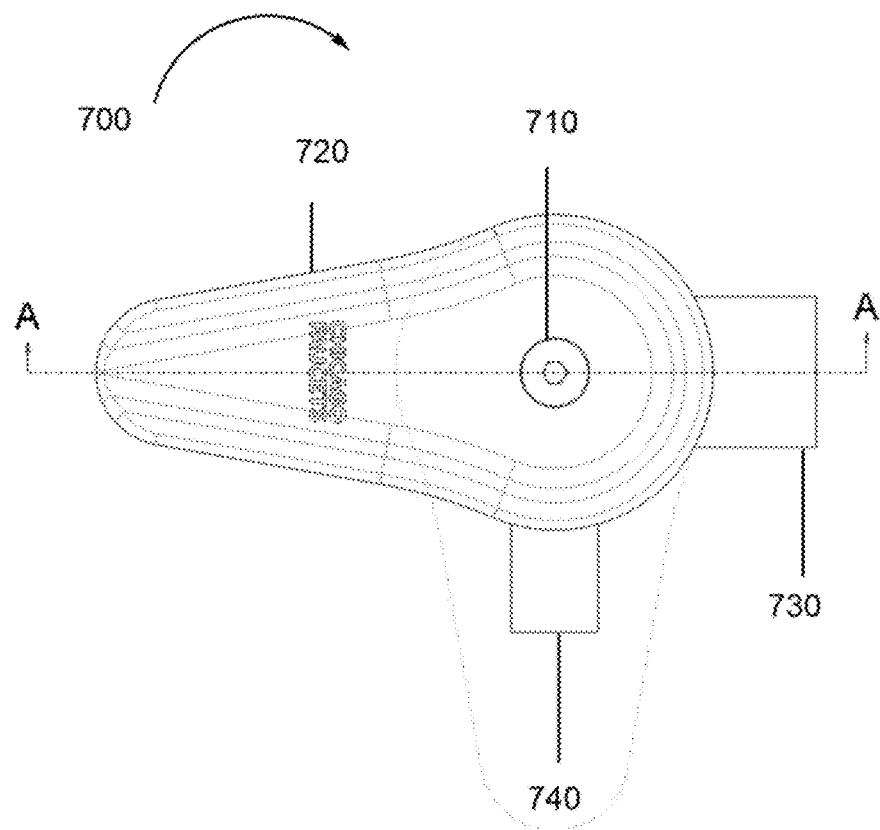
FIG. 7 is a front elevation view of the fluid valve with automatic draining diverter of FIG. 1, wherein the diverter handle is positioned 180° from a closed position to the second outlet.

With respect to FIG. 7, an external view of the fluid valve with automatic draining diverter 700 is displayed. The external view of the automatic draining diverter 700 includes a diverter handle 720 coupled to the valve with a screw 710. By rotating the diverter handle 520 to the left by 90°, water flows from the fluid inlet (not shown) through the valve and out through the second outlet (now shown, under the fluid handle 720). The first fluid outlet 730 and the diverter outlet 740 are shown for reference.

Figure 8:
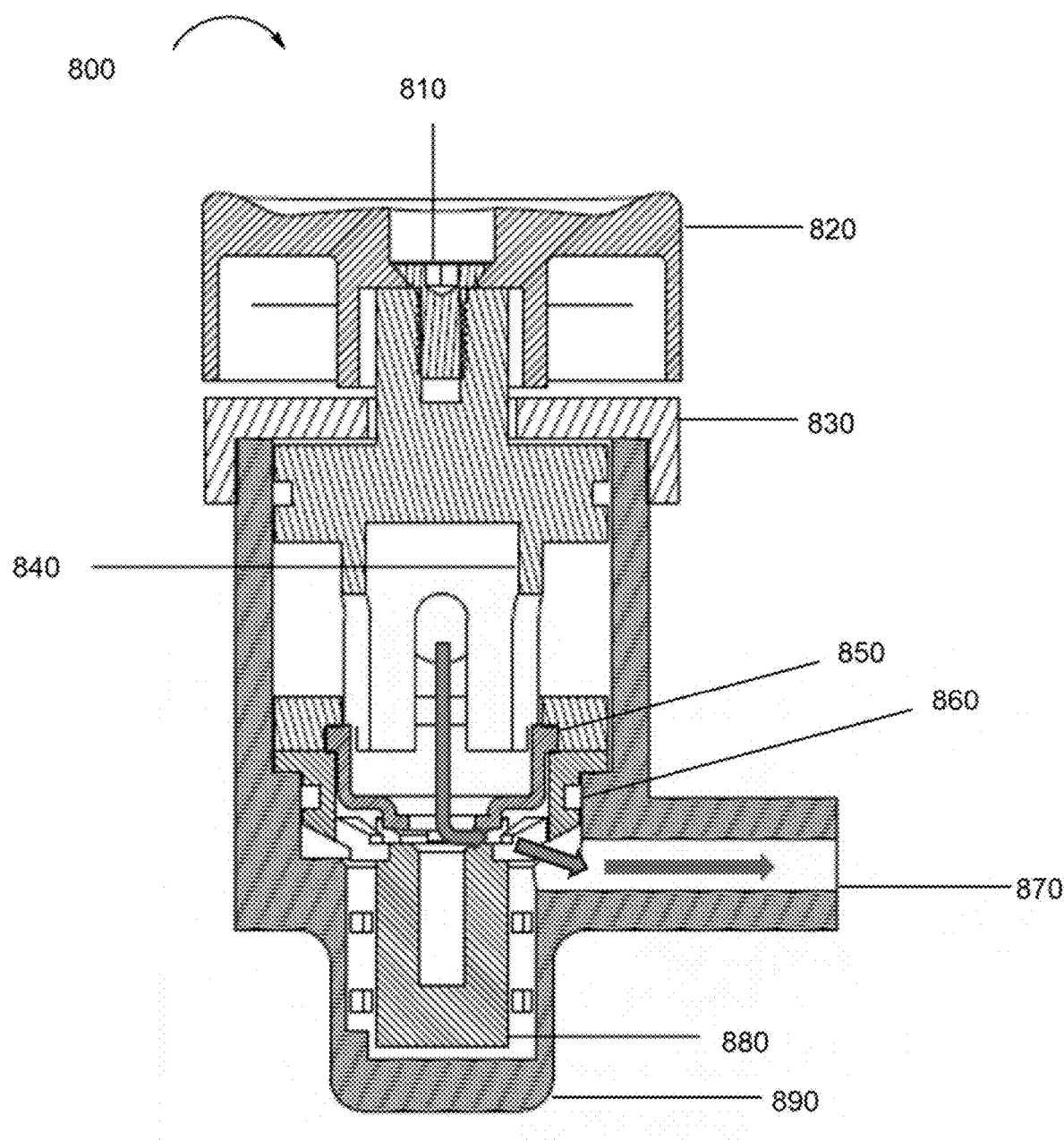
FIG. 8 is a cross-sectional view of the fluid valve with automatic draining diverter of FIG. 1, showing the flow of fluid from one or more outlets to the drain, wherein the pressure sensitive drain seal diaphragm decompresses to open the drain outlet according to one aspect.

With respect to FIG. 8, an internal view of the fluid valve with automatic draining diverter is shown. In this figure, the direction of the water exiting the fluid valve with automatic draining diverter 800 to the diverter outlet 870 is shown. The fluid valve with automatic draining diverter includes a diverter handle 820 coupled to the upper diverter actuator 840 using a screw 810 through a hole in the diverter handle 820 and a valve body cap 830.

In this aspect, as the pressure of the water in the valve is reduced from a range from about 10 psi to about 150 psi to about 0 psi, the reduction in fluidic pressure may cause the pressure sensitive auto drain seal 850 to return from an expanded configuration to a normal configuration. With the pressure sensitive auto drain seal in a normal configuration, the gap between the lower diverter actuator 860 and the diverter outlet 870 opens and opens the first outlet (not shown) and the second outlet (not shown) to drain. Water travels from inside the upper diverter actuator 840 through a gap between the lower diverter actuator 860 and the auto drain seal 850 and to drain outlet 890. Water from the first outlet (not shown) and second outlet (not shown), associated pipes connected to the first outlet and second outlet, and those devices connected to these outlets is also drained to the diverter outlet 870.

Figure 9:
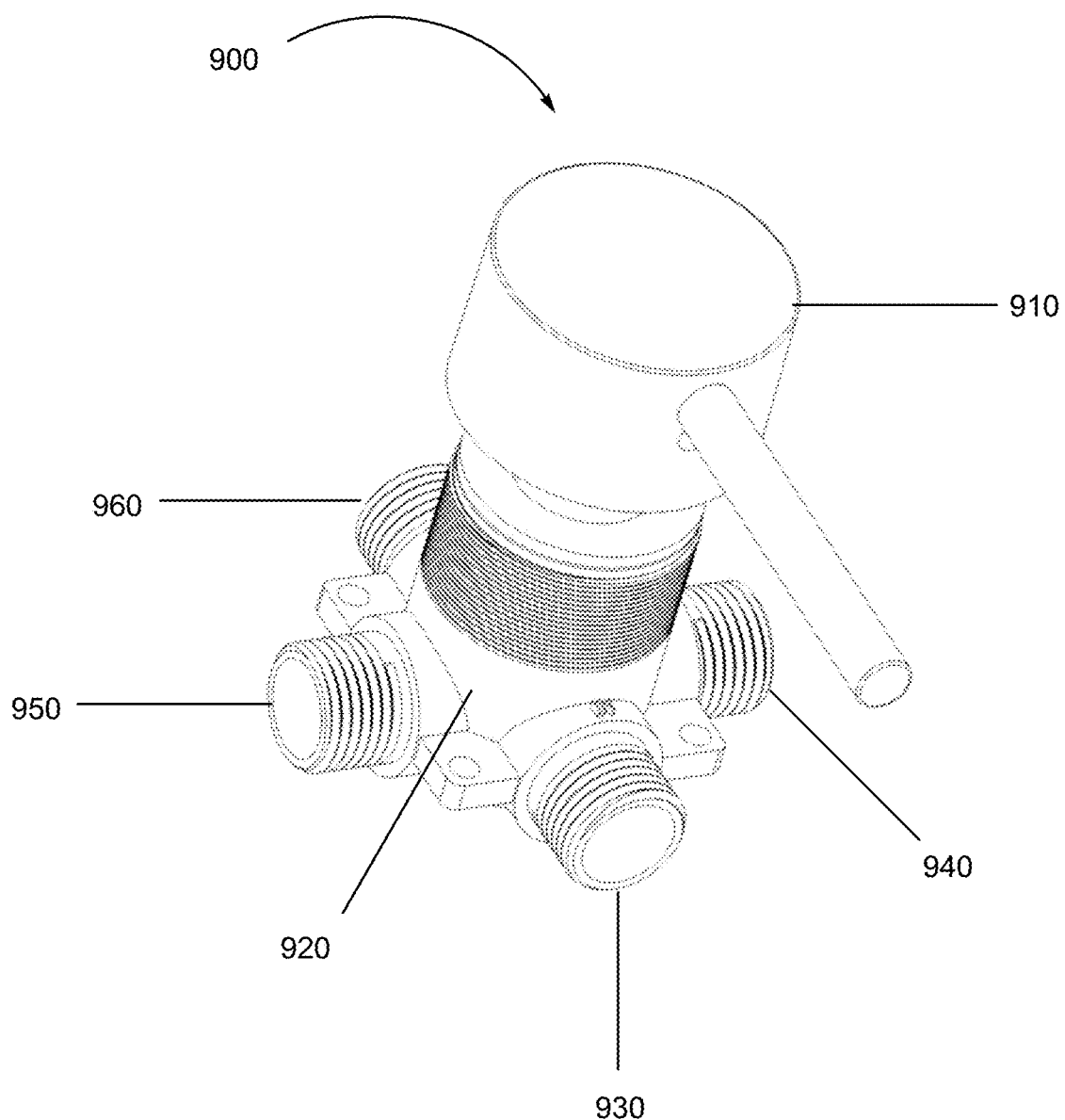
FIG. 9 is a perspective view of the fluid valve with automatic draining diverter according to one aspect.

With respect to FIG. 9, a frontal external view of a fluid valve with automatic draining diverter 900 is shown. This figure shows the diverter handle 910 on valve body 920 with a fluid inlet 930 and a diverter outlet, a first outlet 940, a second outlet 950, and a third outlet 960. The third outlet 960 is shown, can be utilized or not utilized similar to outlets 940 and 950. Outlet 960 may be field selected by an installer and/or a plumber depending on the output device configuration, either right or left. Either one of the outlets 940, 950, or 960 may be closed by placing on the outlet with a ½" NPT cap or other similar cap. When one of the outlets 940, 950, or 960 is closed with a ½" NPT cap or another similar cap, water pressure is still present to the closed outlet 940, 950, or 960. This configuration allows for consistent pressure and water flow from the fluid inlet to the outlets 940, 950, or 960 and does not present a pause when selecting either output 940, 950, or 960 even when the diverter handle 910 is moved to another outlet.

In this aspect, by rotating the handle 90° or 180° in either a clockwise or a counterclockwise to a first configuration, a second configuration, or a third configuration, pressurized water flows from the fluid inlet 930, through the valve body to either the first outlet 940, the second outlet 950, or the third outlet 960. The first outlet 940, the second outlet 950, or the third outlet 960 may be connected to an output device such as a hand-held shower, a second hand-held shower, an overhead shower, a tub filing device, etc. Either the first outlet 940, the second outlet 950, or the third outlet 960 may alternatively be closed with a ½" NPT cap or another similar cap. Yet, water pressure from fluid inlet 930 to this closed outlet remains. This configuration allows for consistent water pressure when switching from one output device to another output device connected to first outlet 940, the second outlet 950, or the third outlet 960 and prevents a pause in the water flow or water pressure. Upon completion of utilizing the output device, the handle in any position or between positions, a user can terminate the water flow and pressure to the diverter inlet by turning a pressure balancing ON/OFF valve (not shown) to the off position. Turning the pressure balancing ON/OFF valve to the off position, the water flow is terminated, and the water pressure is depleted. By terminating the water pressure to the diverter, an auto drain seal diaphragm (not shown) relaxes, allowing the water in outlets 940, 950, and 960, associated pipes connected to outlets 940, 950, and 960, and the interior of the valve body 920 to drain.

Figure 10:
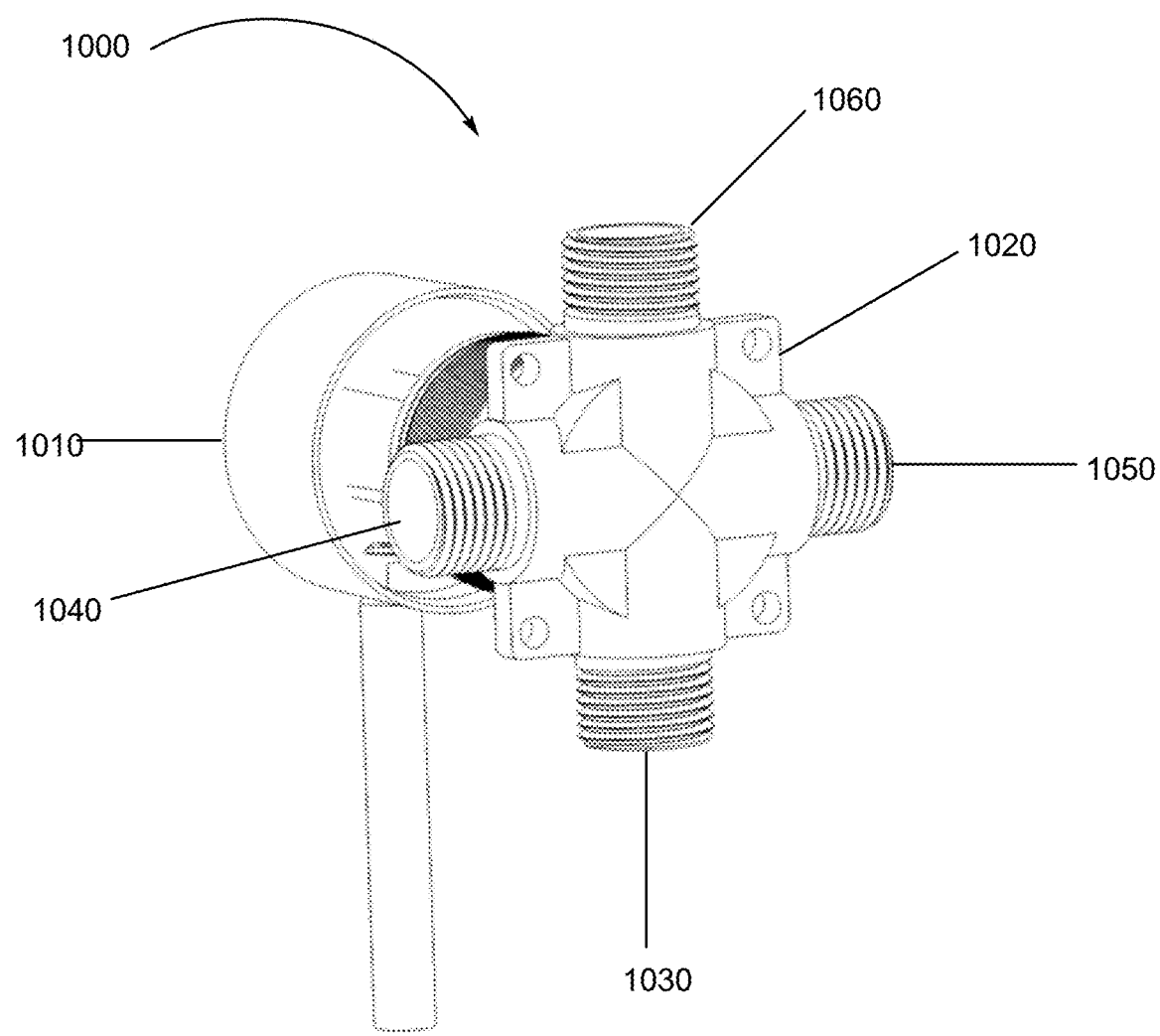
FIG. 10 is a rear view of the fluid valve of FIG. 9 according to one aspect.
Figure 34:
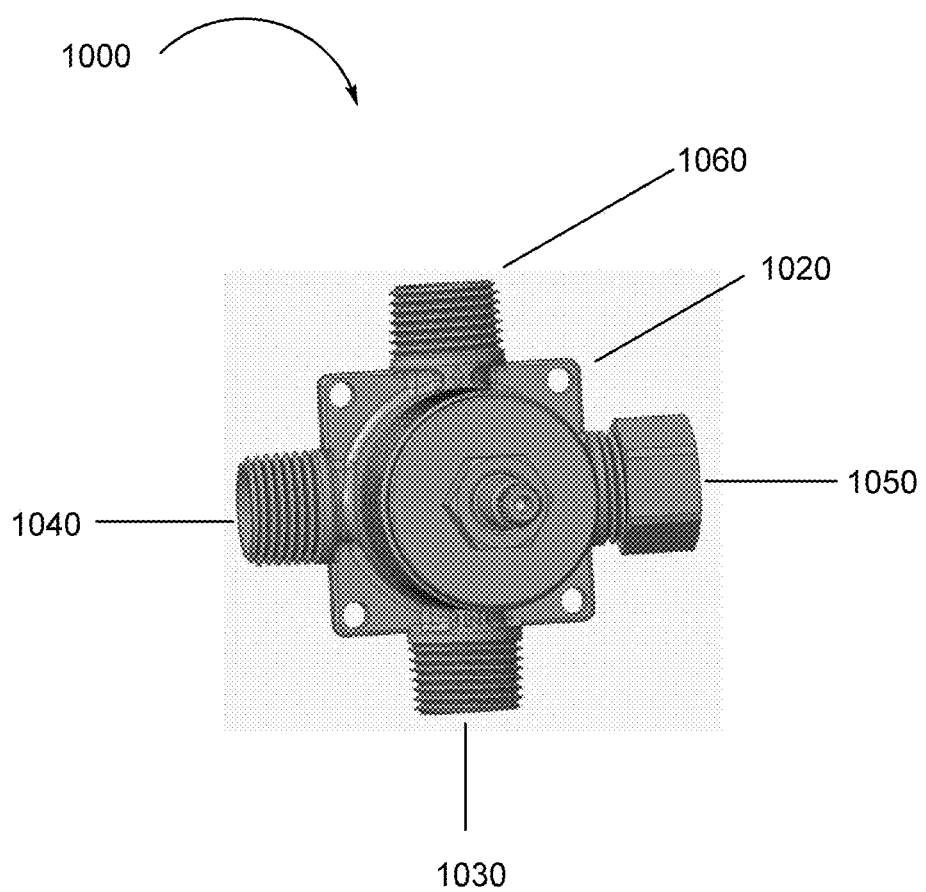
FIG. 34 is a rear view of the fluid valve of FIG. 9 with one position closed according to one aspect.
Figure 35:
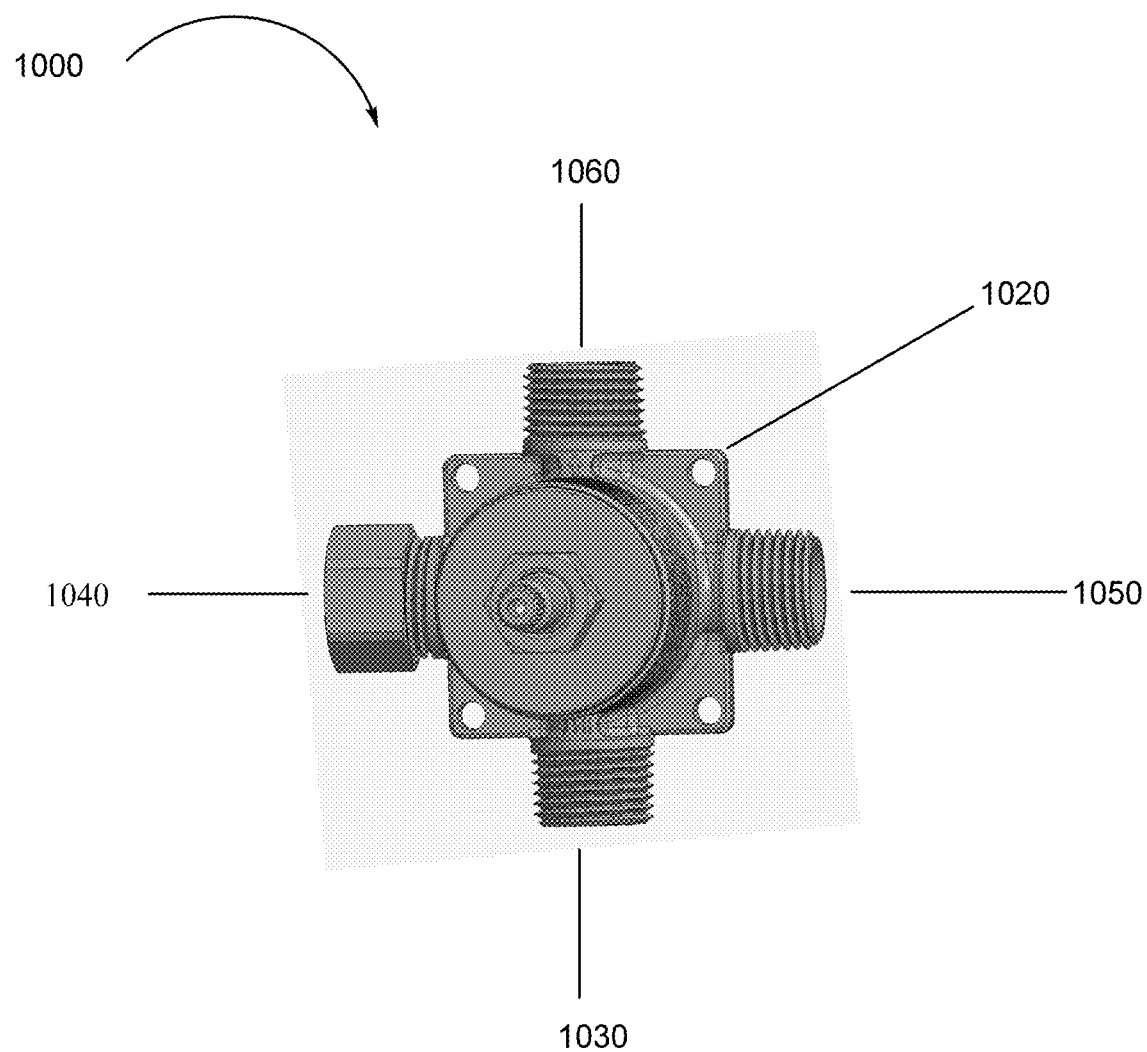
FIG. 35 is a rear view of the fluid valve of FIG. 9 with another position closed according to one aspect.

With respect to FIG. 10, a rear external view of the fluid valve with automatic draining diverter 1000 is shown. This figure shows the diverter handle 1010 coupled to the valve body 1020 with fluid inlet 1030 and diverter outlet, the first outlet 1040, the second outlet 1050, and the third outlet 1060. The third outlet is shown, can be utilized or not utilized similar to outlets 1040 and 1050. Outlet 1060 may be field selected by an installer and/or a plumber depending on the output device configuration, either right or left). Either one of the outlets 1040, 1050, or 1060 may be closed by placing on the outlet with a ½" NPT cap or another similar cap. When one of the outlets 1040, 1050, or 1060 is closed with a ½" NPT cap or another similar cap, water pressure is still present to the closed outlet 1040, 1050, or 1060 as shown in FIG. 34 and FIG. 35. This configuration allows for consistent pressure and water flow from the fluid inlet to the outlets 1040, 1050, or 1060 and does not present a pause when selecting either output 1040, 1050, or 1060 even when the diverter handle 1010 is moved to another outlet.

In this aspect, by rotating the handle 90° or 180° in either a clockwise or a counterclockwise to the first configuration, the second configuration, or the third configuration, pressurized water flows from the fluid inlet 1030, through the valve body to either the first outlet 1040, the second outlet 1050, or the third outlet 1060. The first outlet 1040, the second outlet 1050, and the third outlet 1060 may be connected to an output device such as a hand-held shower, a second hand-held shower, an overhead shower, a tub filing device, etc. Either the first outlet 1040, the second outlet 1050, or the third outlet 1060 may alternatively be closed with a ½" NPT cap or another similar cap. Yet, water pressure from fluid inlet 1030 to this closed outlet remains. This configuration allows for consistent water pressure when switching from one output device to another output device connected to first outlet 1040, the second outlet 1050, or the third outlet 1060 and prevents a pause in the water flow or water pressure. Upon completion of utilizing the output device, the handle in any position or between positions, a user can terminate the water flow and pressure to the diverter inlet by turning the pressure balancing ON/OFF valve (not shown) to the off position. Turning the pressure balancing ON/OFF valve to the off position, the water flow is terminated, and the water pressure is depleted. By terminating the water pressure to the diverter, an auto drain seal diaphragm (not shown) relaxes, allowing the water in outlets 1040, 1050, and 1060, associated pipes connected to outlets 1040, 1050, and 1060, and the interior of the valve body 1020 to drain.

Figure 11:
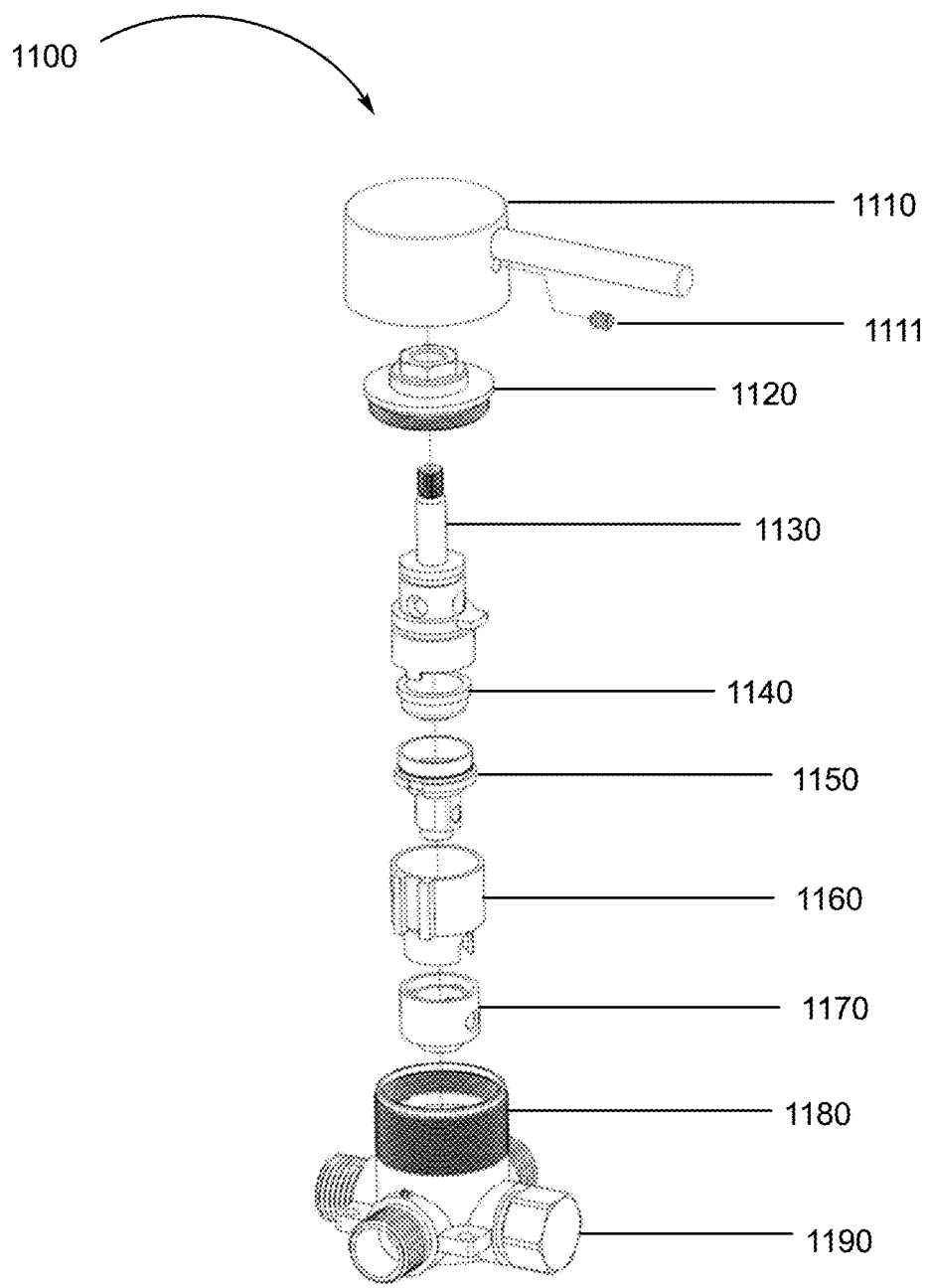
FIG. 11 is an exploded view of the fluid valve with automatic draining diverter showing the internal components utilizing a pressure sensitive drain seal diaphragm according to one aspect.

With respect to FIG. 11, an internal view of the fluid valve with automatic draining diverter 1100 is shown. This figure shows the internal view of the fluid valve with automatic draining diverter 1100 includes a valve body 1190, a diverter handle 1110, a screw 1111, an upper diverter body 1130, an auto drain seal diaphragm 1140, a lower diverter body 1150. The upper diverter body 1130, the auto drain seal diaphragm 1140, and the lower diverter body 1150 are collectively termed "the diverter actuator stem." The upper diverter body 1130 is coupled to the diverter handle 1110 through a hole in the diverter handle using a screw 1111 and provides a stop of the upper valve body 1130 to align the holes for water flow in the fluid valve with automatic draining diverter. The diverter actuator stem is mounted perpendicular within the valve body 1190 and encapsulated by diverter sleeve 1160. A diverter seal 1170 is coupled to the bottom side of the diverter sleeve 1160 and provides a seal for the lower diverter body 1150, the fluid inlet (not shown), and the valve body 1190. The seal for the upper diverter body 1130 is created by an O-ring between the upper diverter body 1130 and the diverter sleeve 1160.

The valve body 1190, the diverter handle 1110, the screw 1111, the valve cap 1120, the upper diverter body 1130, the lower diverter body 1150 may be made of a metal, a metal alloy, plastic, or a like as described above. The auto drain seal diaphragm 1140 and the diverter seal 1170 made be made out of an elastomer material as described above.

In this aspect, the figure depicts a fluid inlet and three outlets. The fluid inlet may be also the diverter outlet. One of the outlets may be terminated with a valve cap. The valve cap may be a ½" NPT or a similar cap to prevent water flow through the outlet.

Figure 12:
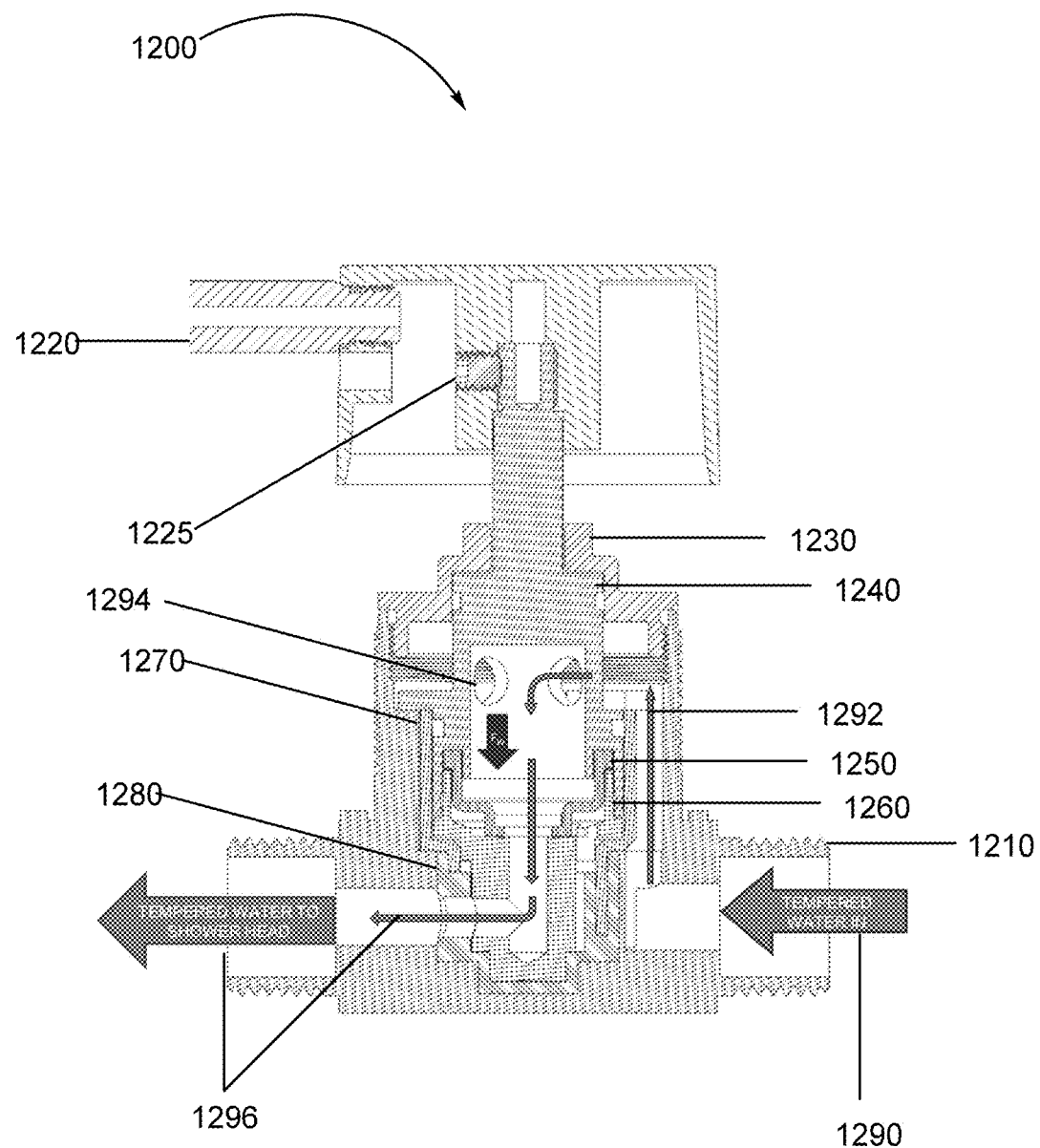
FIG. 12 is a cross-sectional view of the fluid valve with automatic draining diverter showing the internal components and the flow of fluid from the fluid inlet through the first passage to a first outlet according to one aspect.

With regards to FIG. 12, an internal view of the fluid valve with automatic draining diverter 1200 is shown. The valve body 1210 defines the interior. The water flow ($F_W$) is displayed from the fluid inlet 1290, through the internal components of the fluid valve with automatic draining diverter 1200, to the first outlet 1296. As mentioned above, the water introduced through the fluid inlet 1290 may be cold water or tempered water and have a pressure. The first outlet 1296 may be connected to specific output device such as hand-held shower device, an overhead shower device, a basin filing device, a wall mounted shower device, a second-hand held shower device, etc.

In this aspect, the internal components of the fluid valve with automatic draining diverter 1200 is displayed. The fluid valve with automatic draining diverter 1200 includes a valve handle 1220 coupled to the upper diverter body 1240 using a screw 1225 through a hole in the valve bonnet 1230 and valve handle 1220. The screw 1225 may be a set screw, a Phillips head screw, etc. and made of a metal or metal alloy as described above. The upper diverter body 1240 included at least one holes 1294 which align the diverter actuator stem to either the first outlet, the second outlet, or the third outlet. The diverter actuator stem includes the upper diverter body 1240, an auto drain seal diaphragm 1250, and a lower diverter body 1260. The diverter actuator stem is encapsulated in the valve body 1210 with the valve bonnet 1230 and is perpendicular. The auto drain seal diaphragm 1250 is coupled onto the bottom of the upper diverter body 1240. Onto the bottom of the auto drain seal diaphragm 1250 is coupled the lower diverter body 1260. The diverter actuator stem is encapsulated in a diverter sleeve 1270. The diverter sleeve 1270 has an externally coupled diverter seal 1280 which seals the diverter actuator stem to the valve body 1210, allows water to flow from the diverter actuator stem through the diverter seal 1280, through the valve body 1210, the first outlet 1296, the second outlet (not shown), and the third outlet (not shown). Upper diverter body 1240 provides a positive stop in a 90° clockwise or a 90° counterclockwise to the center position at full travel.

In this aspect, the diverter handle 1220 is rotated 90° from the off position to the first outlet 1296 position. In this rotation, a hole in the upper diverter body of the diverter actuator stem provides a pathway of the water to the first outlet 1296. Pressurized water then enters the fluid inlet 1290 and is directed towards the first passage. The water then comes in contact with the aligned hole 1294 on the upper diverter body and then contacts the auto drain seal diaphragm 1250. The auto drain seal diaphragm 1250 is made of a flexible elastomer material and is considered a pressure sensitive auto drain seal diaphragm 1250. The water pressure expands the pressure sensitive auto drain seal diaphragm 1250 to expand from a normal configuration to an expanded configuration. With the configuration change, the pressure sensitive auto drain seal diaphragm 1250 closes a gap between the lower diverter body 1260 and the auto drain seal diaphragm and allows water to flow from the inlet 1290 on the diverter body 1210 through the diverter body and diverter sleeve 1270 channel through the holes 1294 in the upper diverter body through the auto drain seal diaphragm 1250 through the lower diverter body 1260 through the diverter seal 1280 through the diverter body to the first outlet 1296, second outlet (not shown) and third outlet (not shown). Yet, water pressure is still present at the first outlet 1296, second outlet (not shown) and third outlet (not shown). Water exits the first outlet 1296 and water enters the associated pipes connected to the first outlet 1296 and the device connected to that outlet.

Figure 12A:
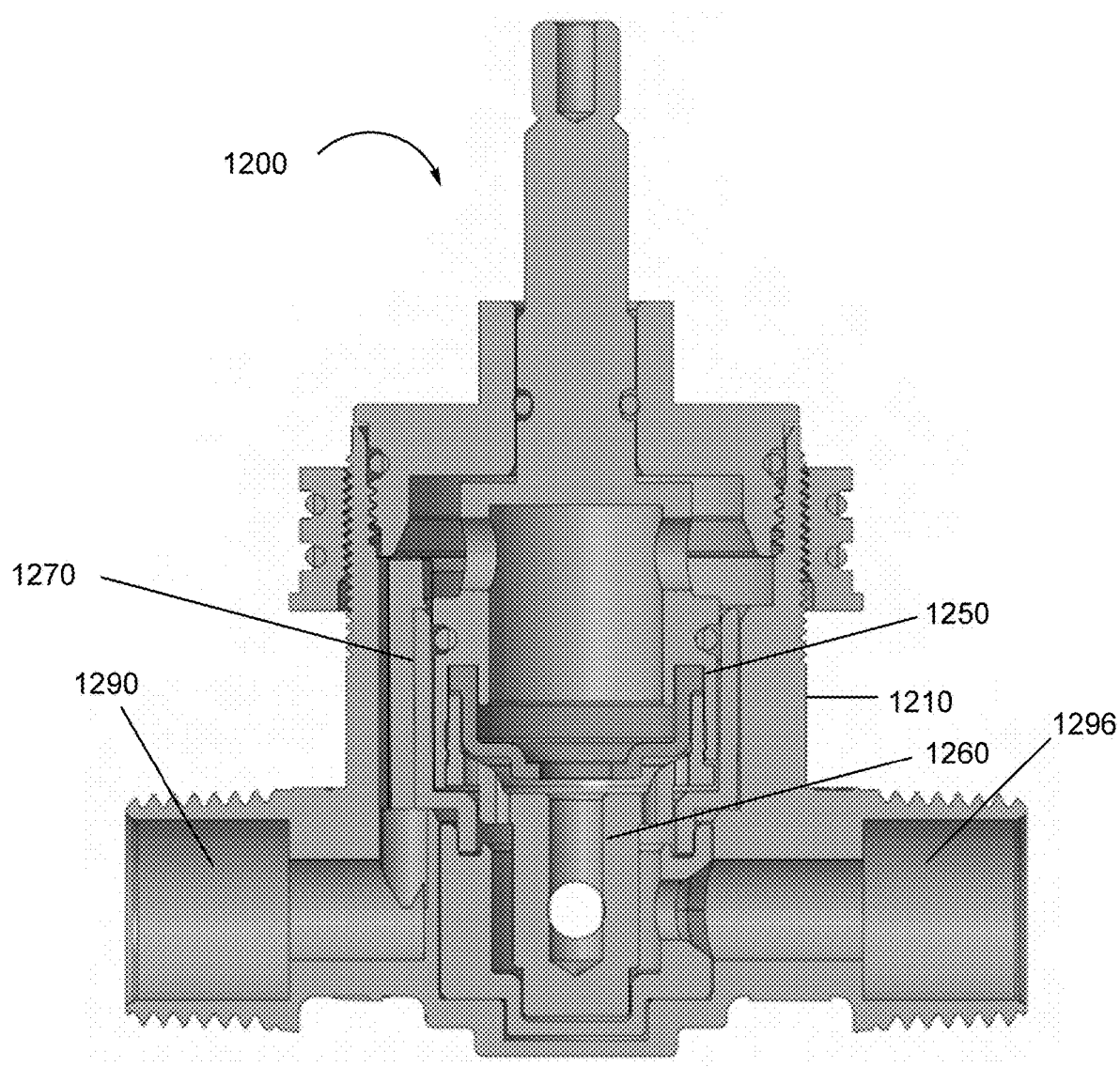
FIG. 12A is a cross sectional view of the fluid valve with automatic draining diverter showing the pressure sensitive drain seal diaphragm when the water pressure is not present and is in a normal configuration according to one aspect.
Figure 12B:
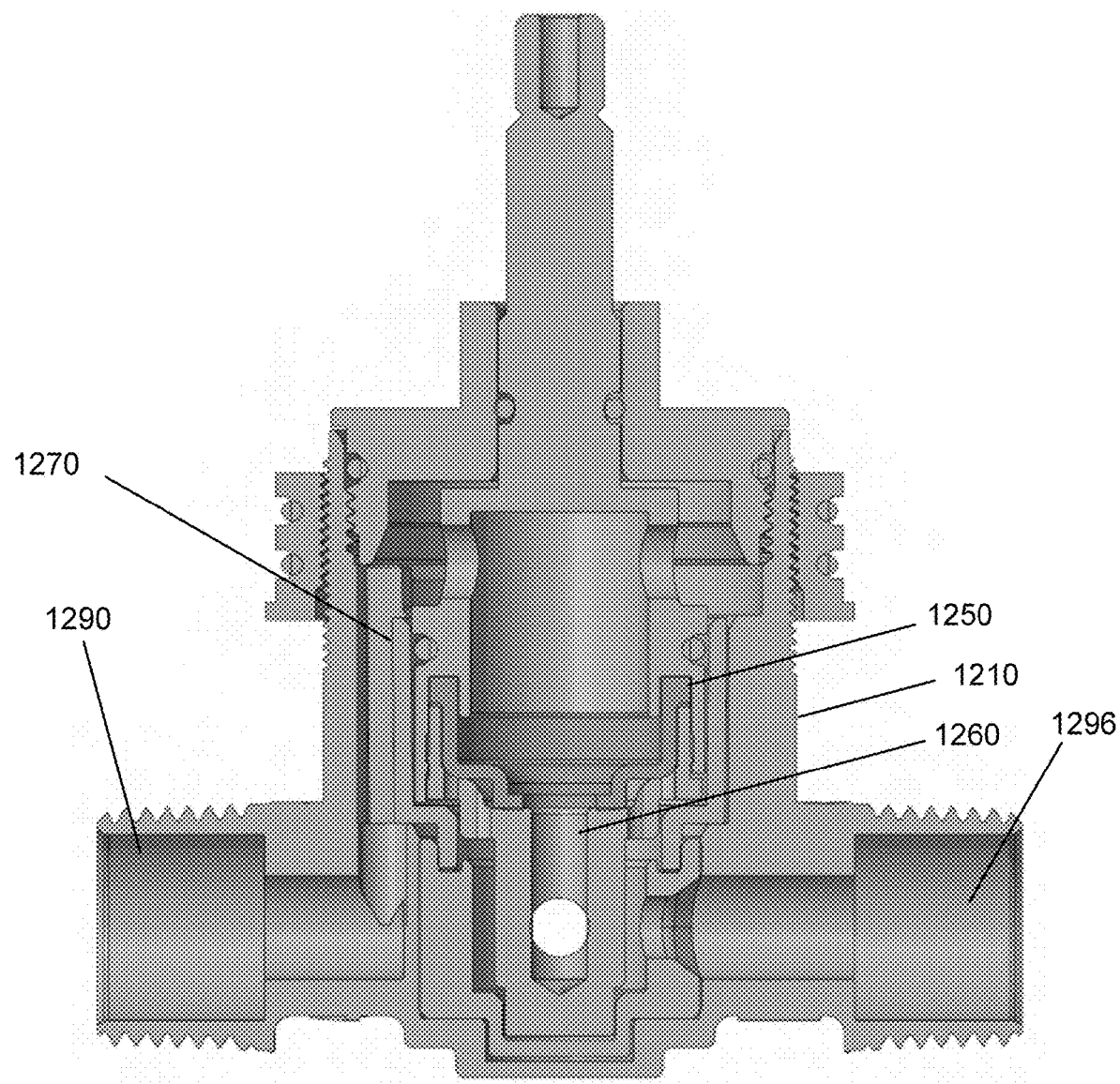
FIG. 12B is a cross sectional view of the fluid valve with automatic draining diverter showing the pressure sensitive drain seal diaphragm when the water pressure is present and the pressure sensitive drain seal diaphragm expands from a normal configuration to an expanded configuration according to one aspect.

With regards to FIGS. 12A and 12B, an internal view of the fluid valve with automatic draining diverter 1200 is shown. The configuration of the pressure sensitive auto drain seal diaphragm is displayed when water pressure is not present in the fluid valve with automatic draining diverter and when water pressure is activated. In this aspect, the pressure sensitive auto drain seal is in a normal configuration when there is no water pressure in the fluid valve. As water is introduced into the fluid valve with automatic draining diverter, water enters the fluid inlet 1290. The water pressure causes the pressure sensitive auto drain seal diaphragm 1250 to expand from a normal configuration to an expanded configuration. With the configuration change, the pressure sensitive auto drain seal diaphragm 1250 closes a gap between the lower diverter body 1260 and the auto drain seal diaphragm and allows water to flow from the inlet 1290 on the diverter body 1210 through the diverter body and diverter sleeve 1270 channel through the holes 1294 in the upper diverter body through the auto drain seal diaphragm 1250 through the lower diverter body 1260 through the diverter seal 1280 through the diverter body first outlet 1296, second outlet (not shown) and third outlet (not shown). Water exits the first outlet 1296 and water enters the associated pipes connected to the first outlet 1296 and the device connected to that outlet.

Figure 36:
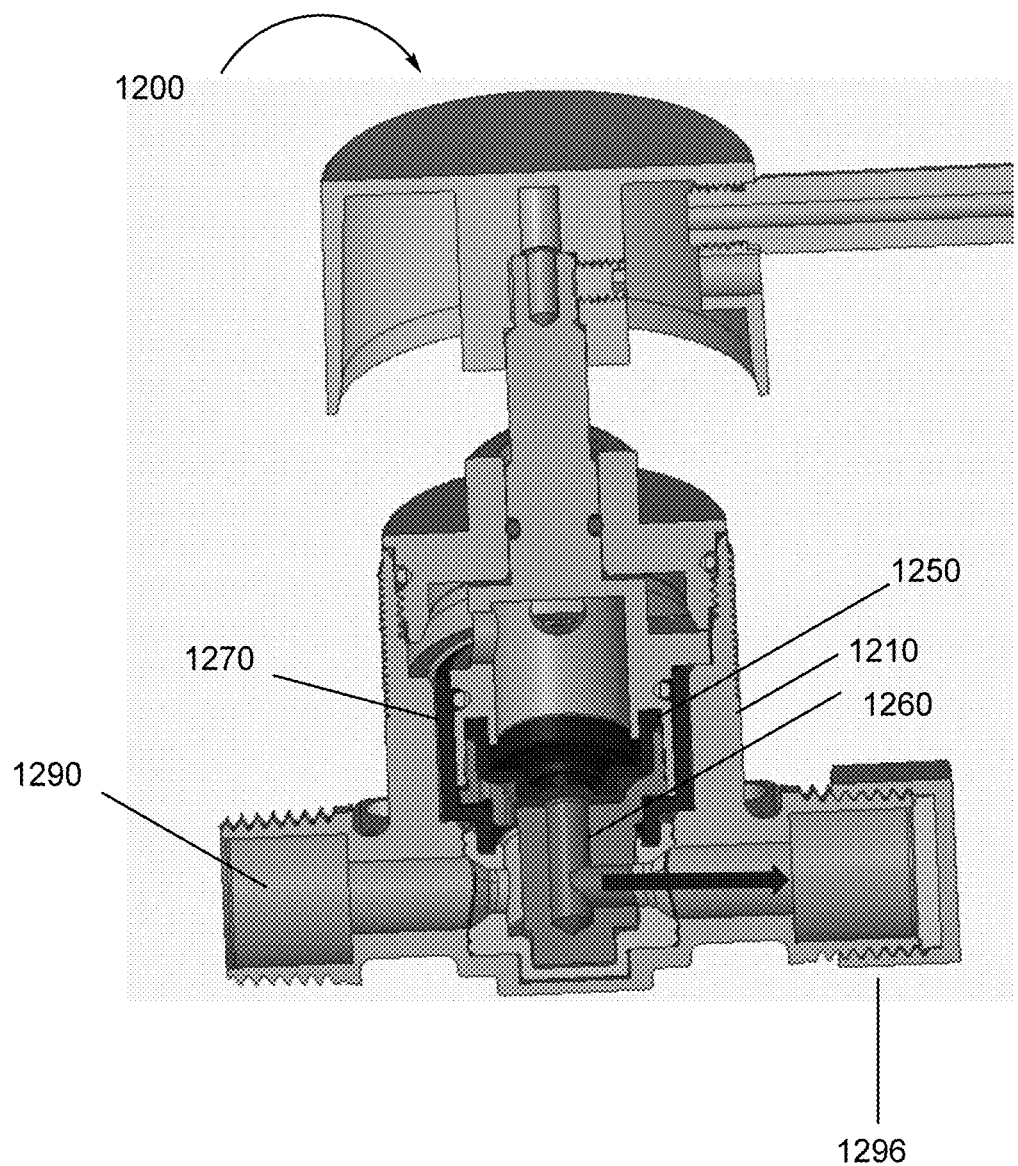
FIG. 36 is a cross sectional view of the fluid valve with automatic draining diverter showing that a cap stops the water flow according to one aspect.
Figure 37:
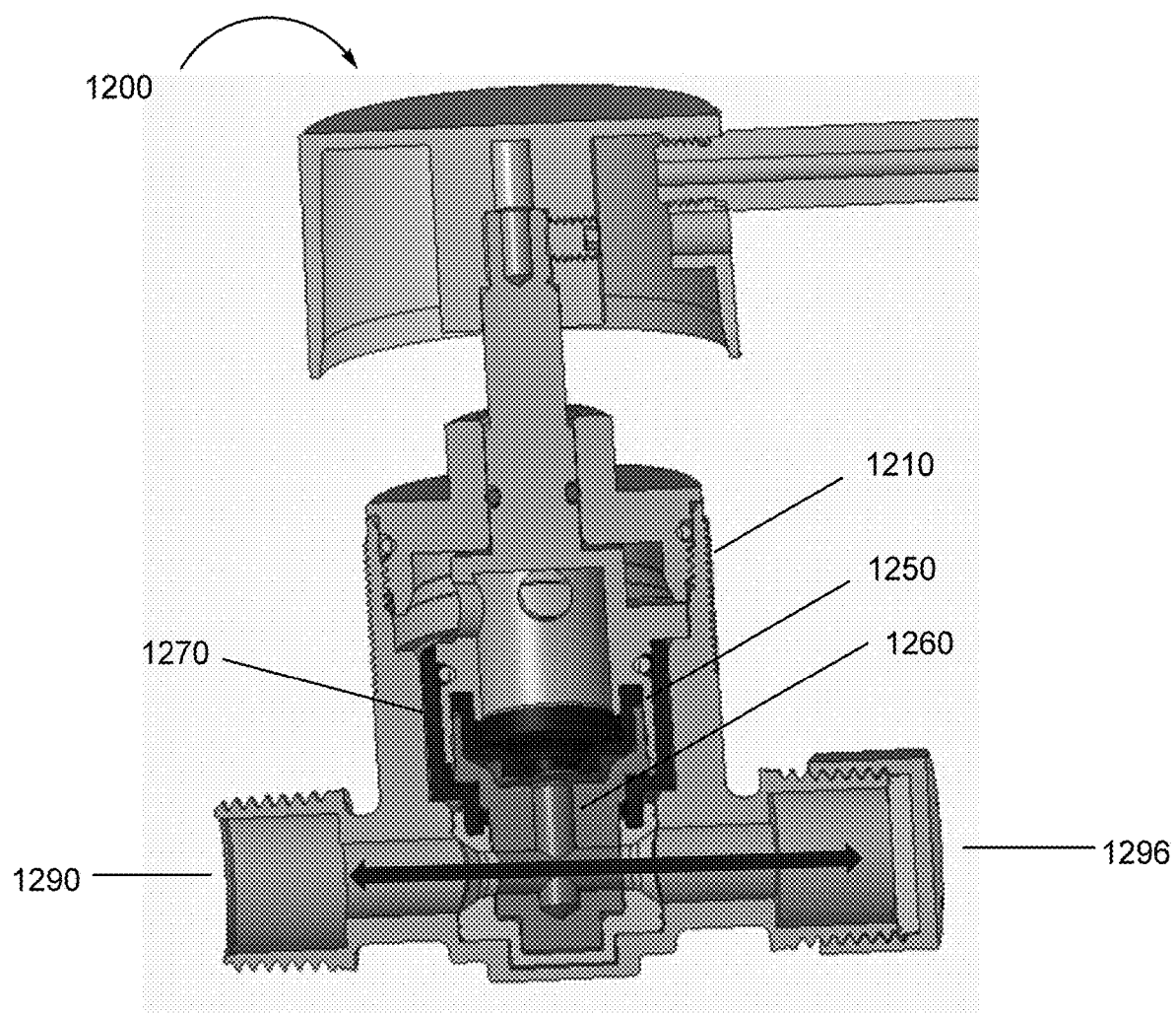
FIG. 37 is a cross sectional view of the fluid valve with automatic draining diverter showing that a cap stops the water flow and the stem allows water to pass through it according to one aspect.

With respect to FIG. 36 and FIG. 37, an internal view of the fluid valve with automatic draining diverter 1200 is shown. In this aspect, FIG. 36 shows the lower diverter body of one style: One hole so that when the diverter is in right or left position, the water is blocked by the cap so there is no water flow to any of the 3 outlets and the diverter can be in a pause position.

In this aspect, FIG. 37 shows the lower diverter of another style, a through a hole style: Through the hole or 2 holes style in the lower diverter, so the when the lower diverter is in either the right or the left position and a cap is affixed in the right or left position, water flows to the opposite outlet due to the through hole in the lower diverter body. There is no pause position in FIG. 37 due to the through hole in the lower diverter body (through hole). The water will just go through to the opposite outlet from the cap.

Figure 13:
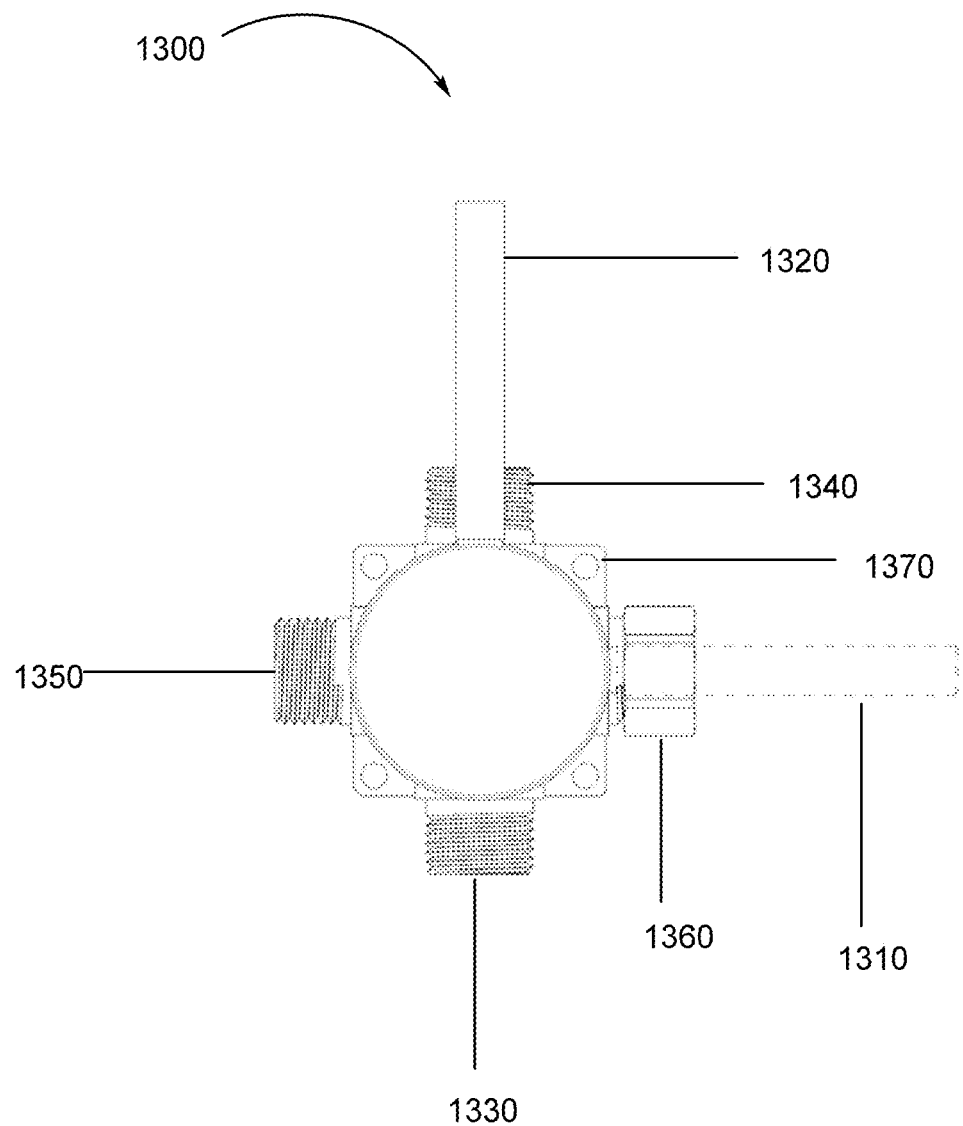
FIG. 13 is a front elevation view of the fluid valve with automatic draining diverter wherein the diverter handle is moved 90° from a closed position to the first outlet according to one aspect.

With regards to FIG. 13, an external view of the fluid valve with automatic draining diverter 1300 is shown. In this aspect, the diverter handle 1320 is rotated from the off position 1310 90° in the valve body 1370. Water flows to all the outlets 1340, 1350, and 1360. By rotating the diverter handle 90° to the left from position 1310 to 1320, water flows from the fluid inlet 1330 to the first outlet 1340. The second outlet 1350 and the third outlet 1360 are not utilized while outlet 1360 has a valve cap coupled to it. Either the first outlet 1340, the second outlet 1350, or the third outlet 1360 may alternatively be closed with a ½" NPT cap or another similar cap. Yet, water pressure from fluid inlet 1330 to this closed outlet remains. This configuration allows for consistent water pressure when switching from one output device to another output device connected to first outlet 1340, the second outlet 1350, or the third outlet 1360 and prevents a pause in the water flow or water pressure. The first outlet 1340 may be connected to specific output device such as hand-held shower device, an overhead shower device, a basin filing device, a wall mounted shower device, a second hand-held shower, etc.

Figure 14:
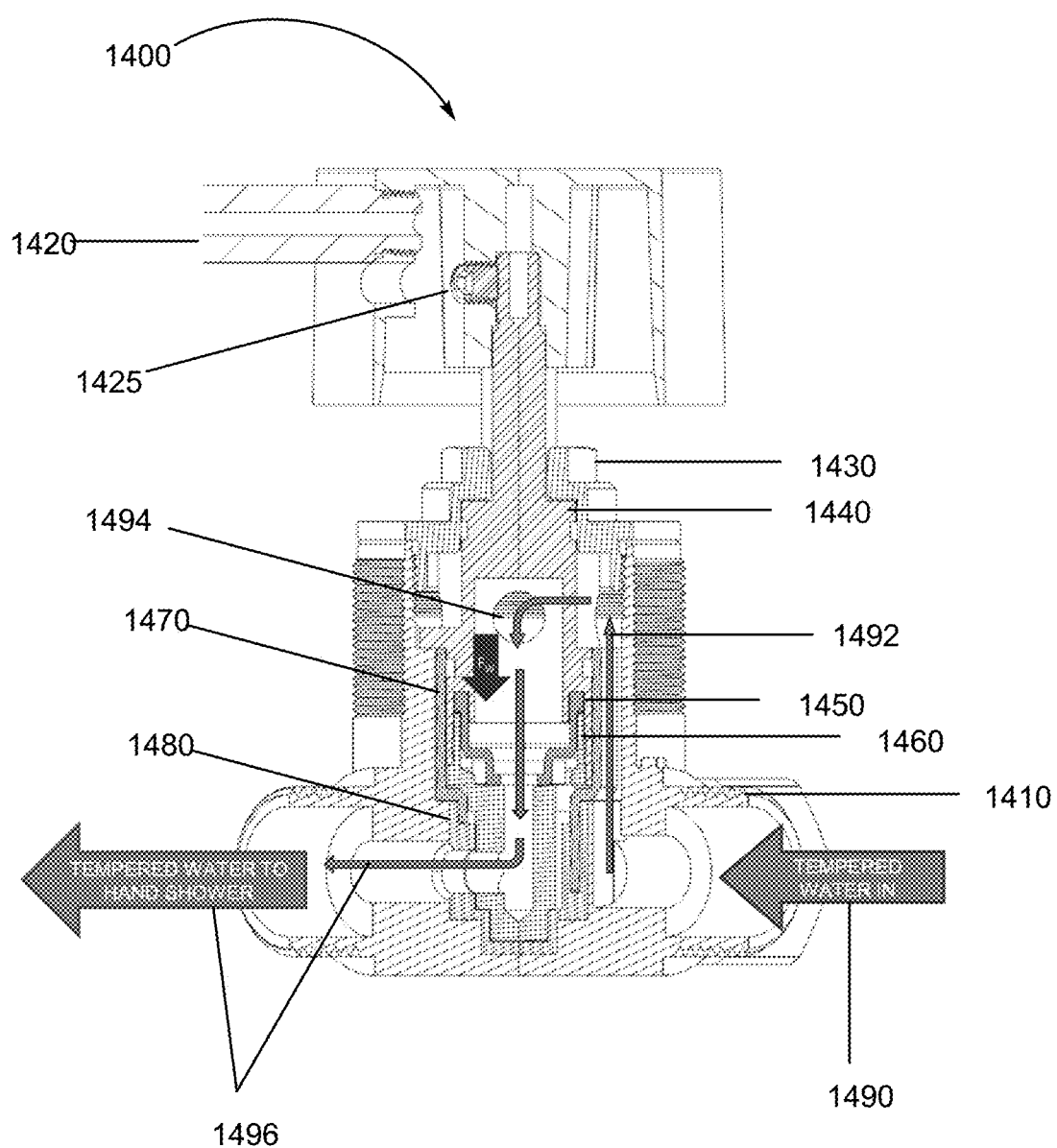
FIG. 14 is a cross-sectional view of the fluid valve with automatic draining diverter showing flow of fluid from the fluid inlet through a second passage to a second outlet according to one aspect.

With regards to FIG. 14, an internal view of the fluid valve with automatic draining diverter 1400 is shown. The valve body 1410 defines the interior. The fluid valve with automatic draining diverter 1400 includes a diverter handle 1420 coupled to the upper diverter body 1440 using a screw 1425 through a hole in the diverter handle 1420. The upper diverter body 1440 is part of the diverter actuator stem which includes the upper diverter actuator body 1440, an auto drain seal diaphragm 1450, and a lower diverter body 1460. The auto drain seal diaphragm 1450 may be a pressure sensitive auto drain seal diaphragm. The pressure sensitive auto drain seal diaphragm 1450 is coupled onto the bottom of the upper diverter body 1440. Onto the bottom of the pressure sensitive auto drain seal diaphragm, the lower diverter body 1460 is located. The diverter sleeve 1470 encapsulates the diverter actuator stem, positions the diverter actuator stem perpendicularly within the valve body 1410, and has a diverter seal 1480 coupled externally onto the outer surface of the diverter sleeve 1470. The diverter seal 1480 prevents water from contacting the valve body 1410 and provides a seal between the diverter actuator stem and the body allowing water to flow through the seal and body outlet 1496.

In this aspect, the flow of water ($F_W$) is displayed. Water is introduced in the fluid valve with automatic draining diverter 1400 by rotating the diverter 90° from the off position to the second configuration. The second configuration now opens the second outlet 1496. By turning the diverter handle 1420, water is introduced through fluid inlet 1490 and travels fluidically to the second pathway. Pressurized water contacts the pressure sensitive auto drain seal diaphragm 1450, causes the pressure sensitive auto drain seal diaphragm 1450 to expand from a normal configuration to an expanded configuration, and closes the gap between the lower diverter body 1460 and the auto drain seal diaphragm 1450. Water passes onto the second outlet 1496 and activates the associating piping and a second device connected to the second outlet 1496.

Figure 15:
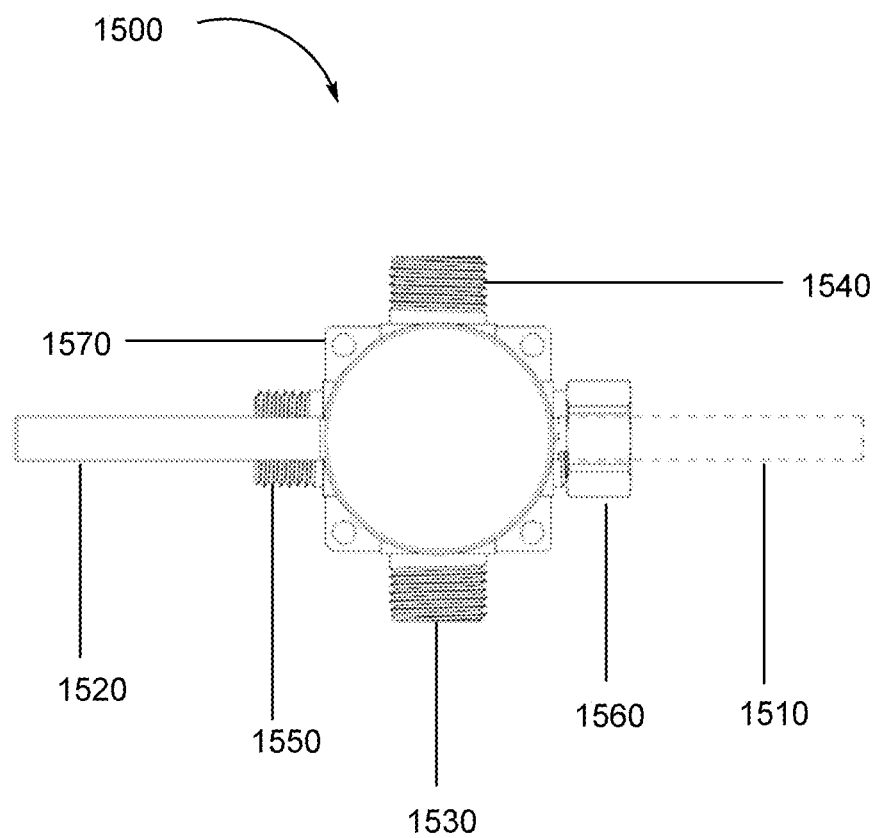
FIG. 15 is a front elevation view of the fluid valve with automatic draining diverter wherein the diverter handle is positioned 180° from a closed position to the second outlet according to one aspect.

With regards to FIG. 15, an external view of the fluid valve with automatic draining diverter 1500 is shown. In this aspect, by rotating the handle in either a clockwise or a counterclockwise to the first or second configuration, pressurized water flows from the fluid inlet 1530, through the valve body to either the first outlet 1540, second outlet 1550, or the third outlet 1560. The first outlet 1540, the second outlet 1550, or the third outlet 1560 may be connected to an output device such as a hand-held shower, an overhead shower, a tub filing device, etc. Either the first outlet 1540, the second outlet 1550, or the third outlet 1550 may alternatively be closed with a ½" NPT cap or another similar cap. Yet, water pressure from fluid inlet 1530 to this closed outlet remains. This configuration allows for consistent water pressure when switching from one output device to another output device connected to first outlet 1540, the second outlet 1550, or the third outlet 1350 and prevents a pause in the water flow or water pressure. Upon completion of utilizing the output device, the pressure balancing on/off valve (not shown) is turned off. The on/off valve terminates the flow of water. By terminating the flow of water, with the handle in any position including the on or off position, the pressure sensitive auto seal diaphragm (not shown) relaxes, and diverter drain is activated, thereby draining the water from all outlets/outputs, associated pipes, and the interior of the valve body 1570.

In this aspect, the diverter handle 1520 is rotated from the off position 1510 90° to the left. By rotating the diverter handle 90° to the left from position 1510 to 1520, water flows from the fluid inlet 1530 to all outlets 1540, 1550, and 1560 and exits through the second outlet 1550. The first outlet 1540 is not utilized and outlet 1560 has a valve cap coupled to it as described above. The second outlet 1540 may be connected to specific output device such as hand-held shower device, an overhead shower device, a basin filing device, a wall mounted shower device, a second hand-held shower, etc.

Figure 16:
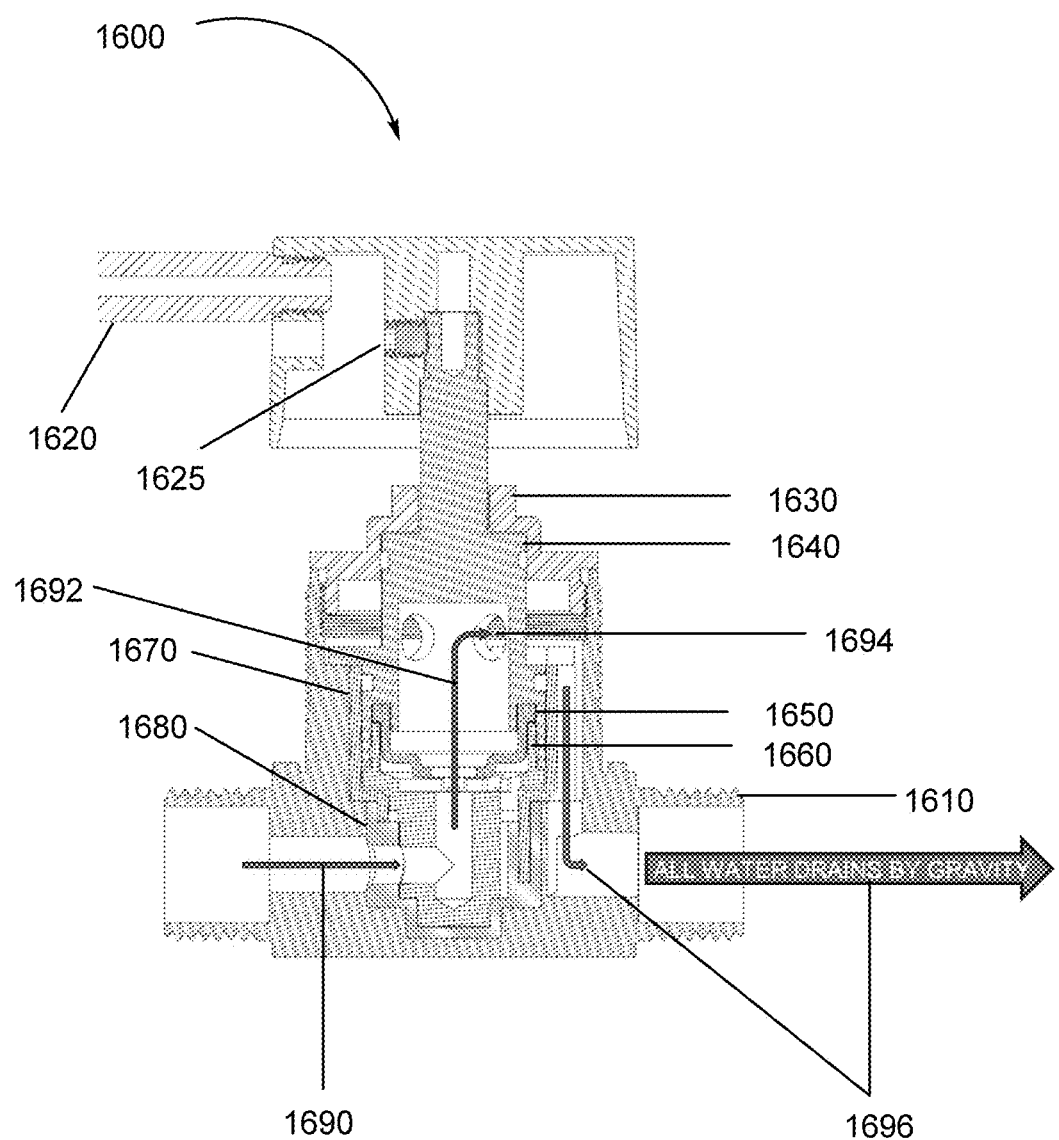
FIG. 16 is a cross-sectional view of the fluid valve with automatic draining diverter showing the flow of fluid from one or more outlets to the drain, wherein the pressure sensitive drain seal diaphragm decompresses to open the drain outlet according to one aspect.

With regards to FIG. 16, an internal view of the fluid valve with automatic draining diverter 1600 is shown. The fluid valve with automatic draining diverter 1600 includes a diverter handle 1620, a screw 1625 which couples the diverter handle to the upper diverter body 1640, a diverter actuator stem including the upper diverter body 1640, an auto drain seal diaphragm 1650, and a lower diverter body 1660. The diverter actuator stem is encapsulated within the valve body 1610 with a valve bonnet 1630 and is perpendicular with the valve body 1610.

In this aspect, the diverter handle 1620 may be in any position (the first outlet, the second outlet, the third outlet, or the off position). By turning off the water pressure to the diverter by shutting off a ON/OFF pressure balancing valve, the water pressure within the valve body 1610 is terminated. By terminating the water pressure, the reduction in fluidic pressure causes the pressure sensitive auto drain seal diaphragm 1650 to return from an expanded configuration to a normal configuration, opening the gap between the lower diverter body 1660 and the pressure sensitive auto seal diaphragm 1650. The first outlet, the second outlet, the third outlet, or the off position are all open to drain through the diverter lower body 1660, through the pressure sensitive auto drain seal diaphragm 1650 through the diverter upper body 1640 through the channel between the diverter sleeve 1670 and diverter body 1610 and back out through the tempered water/cold/hot water inlet which becomes an outlet 1696 for the water becoming the drain for the water in first outlet, second outlet, third outlet, associated pipes, and the diverter internals.

Figure 16A:
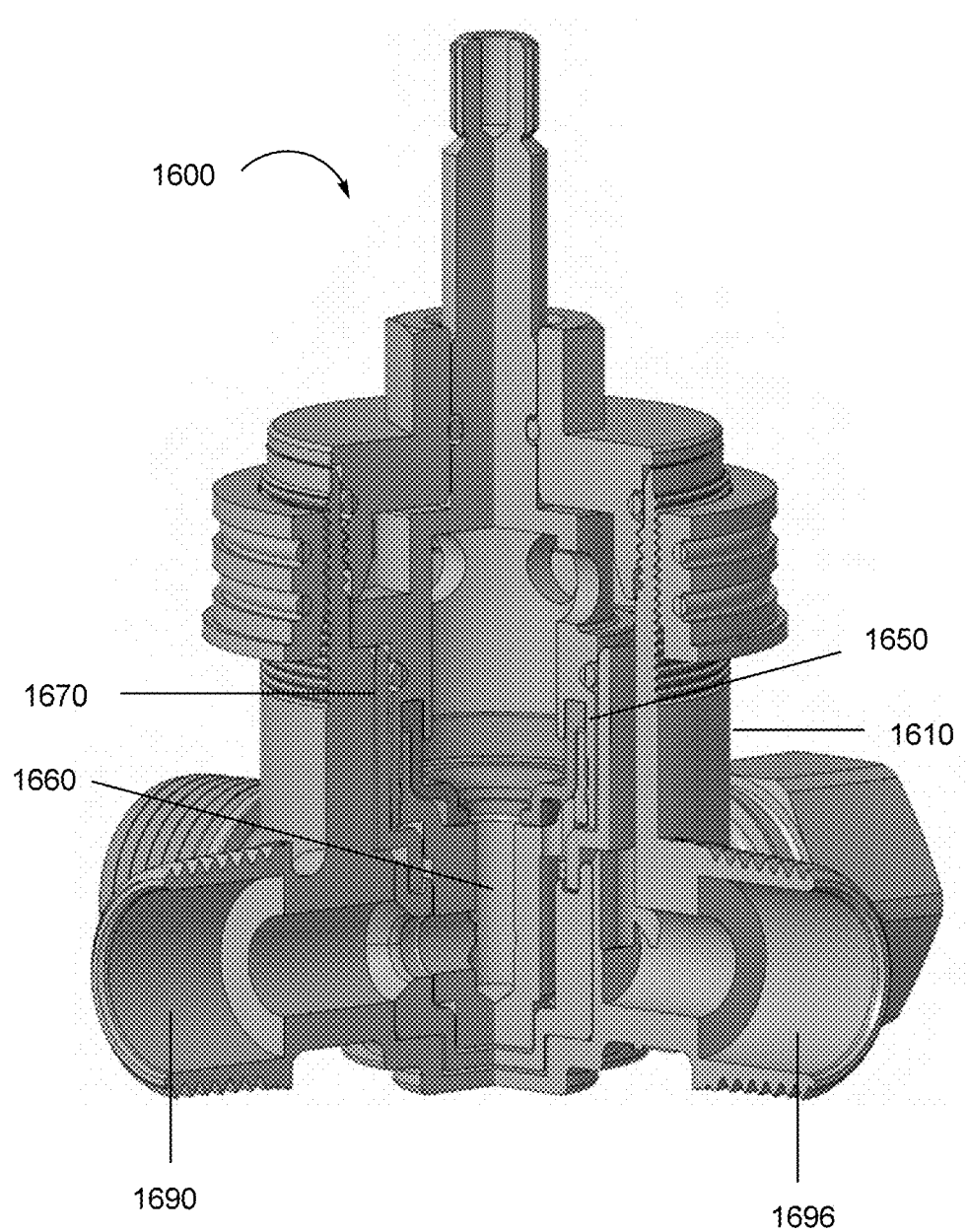
FIG. 16A is a cross sectional view of the fluid valve with automatic draining diverter showing the pressure sensitive drain seal diaphragm when the water pressure is present and in an expanded configuration according to one aspect.
Figure 16B:
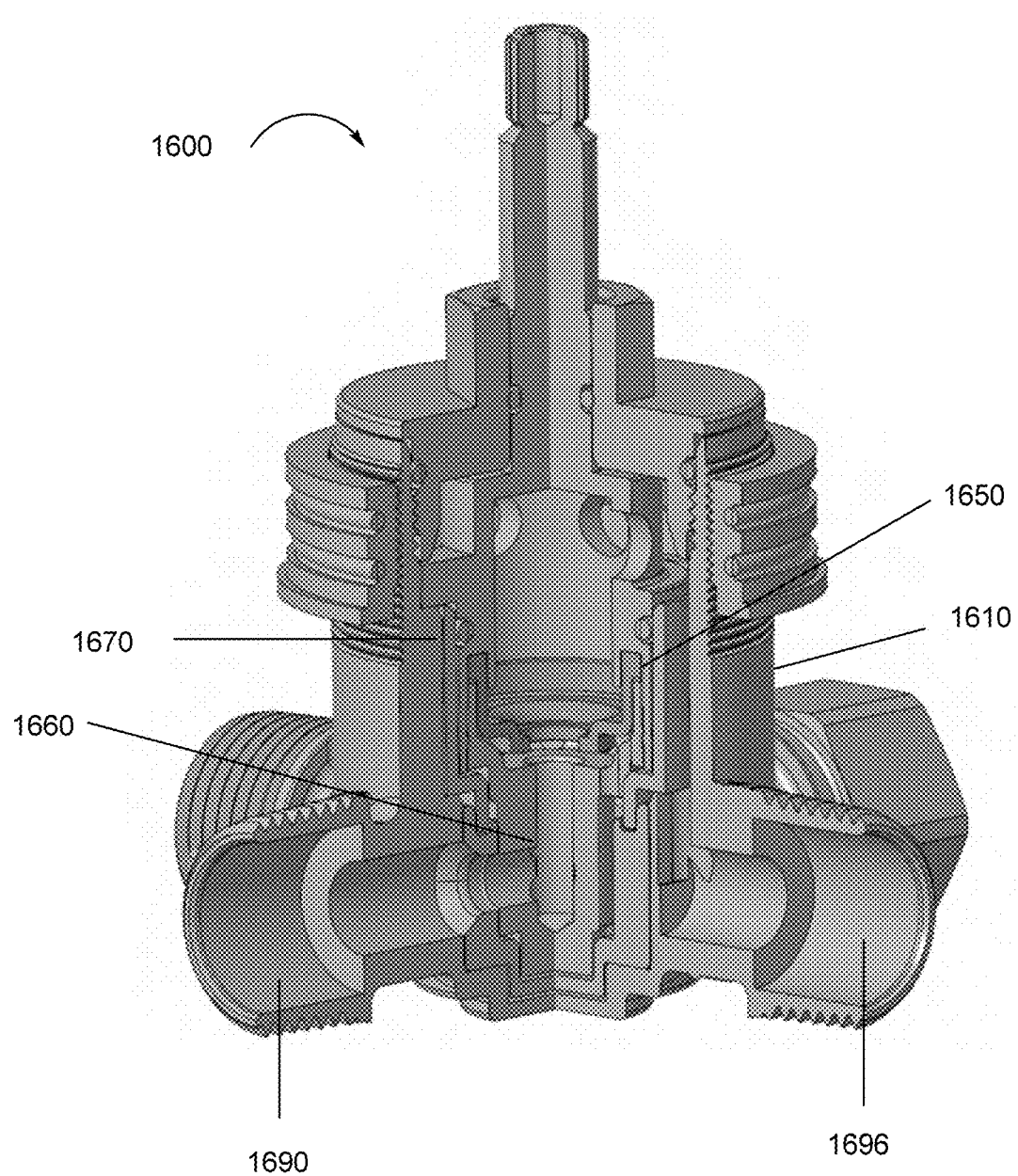
FIG. 16B is a cross sectional view of the fluid valve with automatic draining diverter showing the pressure sensitive drain seal diaphragm when the water pressure is terminated and the pressure sensitive drain seal diaphragm returns from an expanded configuration to a normal configuration according to one aspect.

With regards to FIGS. 16A and 16B, the pressure sensitive auto drain seal diaphragm 1650 is displayed when water pressure is present in the fluid valve with automatic draining diverter and when water pressure is terminated. In this aspect, the pressure sensitive auto drain seal is in an expanded configuration when there is water pressure in the fluid valve. By turning off the water pressure to the diverter by shutting off a ON/OFF pressure balancing valve, the water pressure within the valve body 1610 is terminated. By terminating the water pressure, the reduction in fluidic pressure causes the pressure sensitive auto drain seal diaphragm 1650 to return from an expanded configuration to a normal configuration, opening the gap between the lower diverter body 1660 and the pressure sensitive auto seal diaphragm 1650. The first outlet, the second outlet, the third outlet, or the off position are all open to drain through the diverter lower body 1660, through the pressure sensitive auto drain seal diaphragm 1650 through the diverter upper body 1640 through the channel between the diverter sleeve 1670 and diverter body 1610 and back out through the tempered water/cold/hot water inlet which becomes an outlet 1696 for the water becoming the drain for the water in first outlet, second outlet, third outlet, associated pipes, and the diverter internals.

Figure 17:
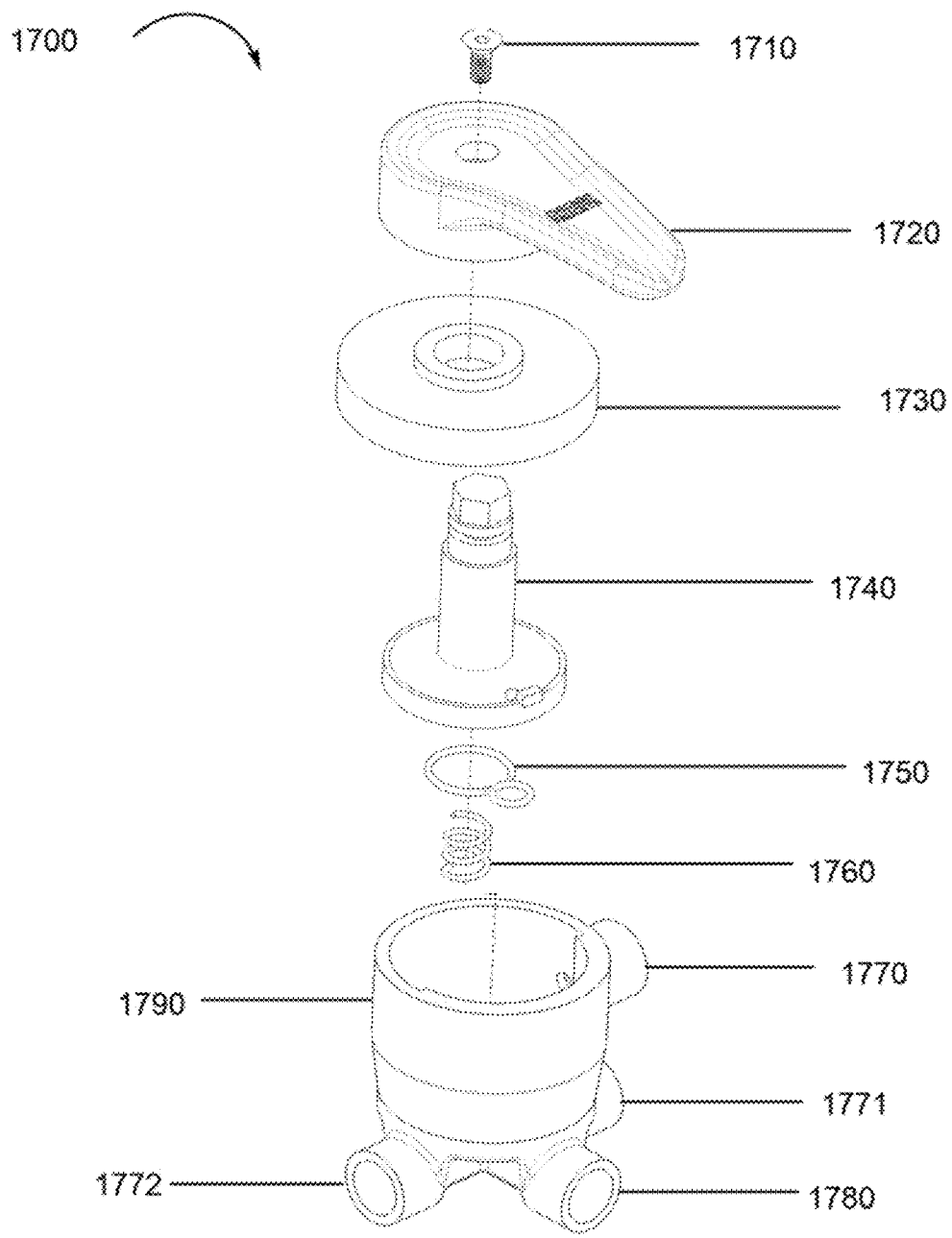
FIG. 17 is an exploded view of the fluid valve with automatic draining diverter showing the internal components utilizing an auto drain seal and a diverter return spring according to one aspect.

With regards to FIG. 17, an internal view of the fluid valve with automatic draining diverter 1700 is shown. The fluid valve with automatic draining diverter 1700 includes a diverter handle 1720, a screw 1710 which couples the diverter handle 1720 to the diverter actuator stem 1740 through a hole in a valve body cap 1730 and diverter handle 1720, a diverter actuator stem 1740, an auto drain seal 1750, and a diverter return spring 1760. The valve body cap 1730 encases the diverter actuator stem 1740, the auto drain seal 1750, and the diverter return spring 1760 in the valve body 1790 and maintain the position of the diverter actuator stem perpendicular within the valve body. The auto drain seal 1750 is located in the bottom of the diverter actuator stem

1740. The diverter return spring 1760 is mounted between the auto drain seal 1750 and the valve body 1790. The diverter return spring 1760 is a pressure sensitive diverter return spring. The diverter handle 1720 coupled to the diverter actuator stem is rotatable to direct the water from the fluid inlet 1770 through the fluid valve with automatic draining diverter to either the first outlet 1771, the second outlet 1772, or the diverter outlet 1780.

Figure 18:
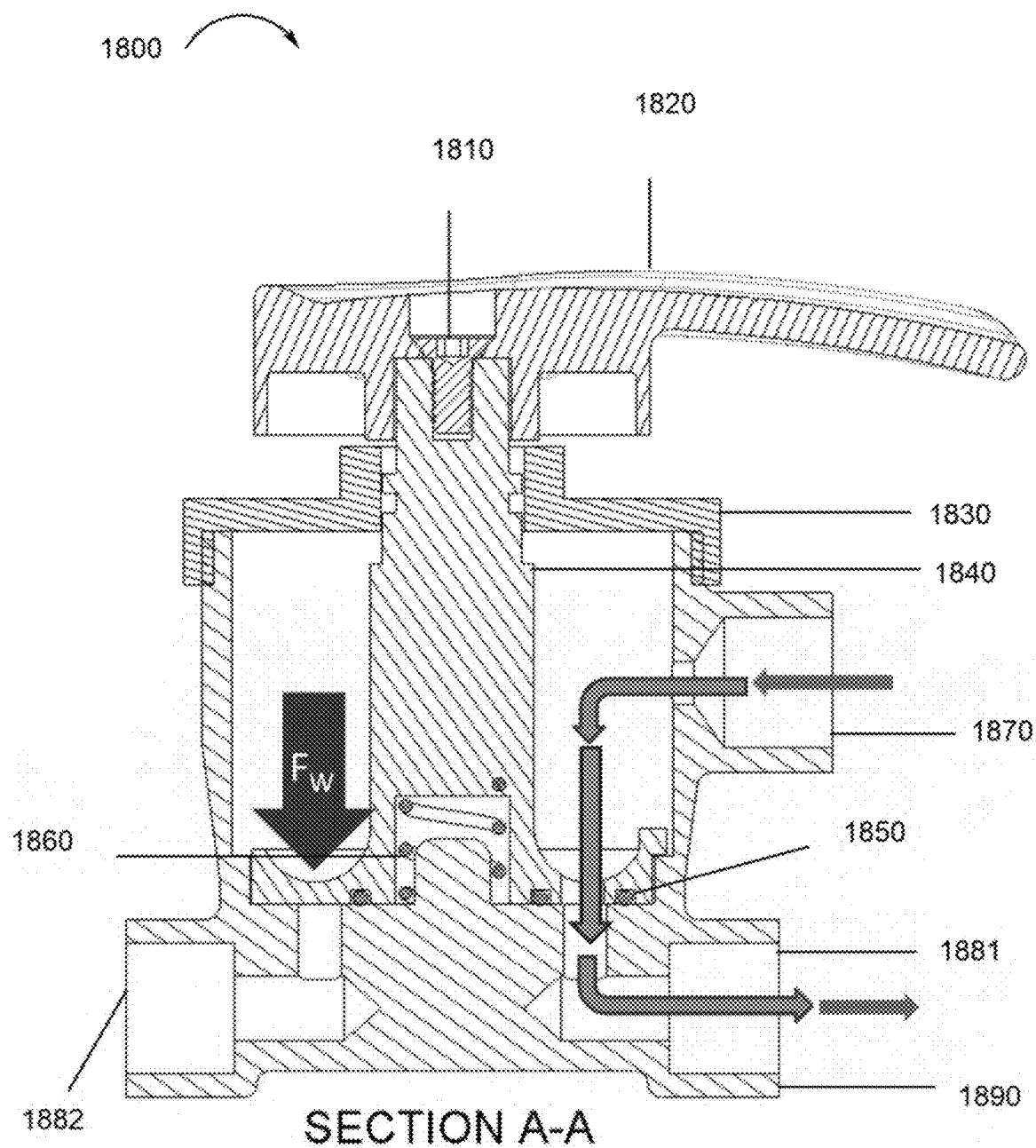
FIG. 18 is a cross-sectional view of the fluid valve with automatic draining diverter of FIG. 17 showing the flow of fluid from a fluid inlet through a first passage to a first outlet according to one aspect.

With respect to FIG. 18, an internal view of the fluid valve with automatic draining diverter 1800 is displayed. In this figure, the direction of the water flow ($F_W$) is shown. Water is introduced into the fluid valve with automatic draining diverter 1800. The fluid valve with automatic draining diverter 1800 includes a diverter handle 1820, a screw which couples the diverter handle 1820 to the diverter actuator stem 1840, an auto drain seal 1850 located on the bottom of the diverter actuator stem 1840, and a diverter return spring located between the auto drain seal 1850 and the bottom of the valve body 1890. The diverter return spring 1860 is a pressure sensitive diverter return spring 1860.

In this aspect, water is introduced through the fluid inlet 1870 and travels to the first passage. The pressure sensitive diverter return spring 1860 has a compressed configuration or a normal configuration. As water in the first passage contacts the pressure sensitive diverter return spring 1860, the pressure of the water creates a pressure force on the diverter actuator stem 1840 and causes the diverter actuator stem 1840 to descend within the valve body 1890 vertically. With the diverter actuator stem 1840 descending vertically, the pressure sensitive diverter spring compresses from a normal configuration to a compressed configuration closing a gap between the diverter actuator stem 1840 and the valve body 1890, closes the diverter passage, and opens the first outlet 1881. The outputted water from the first outlet then activates the associated pipes and the device coupled to the first outlet 1881 which is integral to the body 1890.

Figure 19:
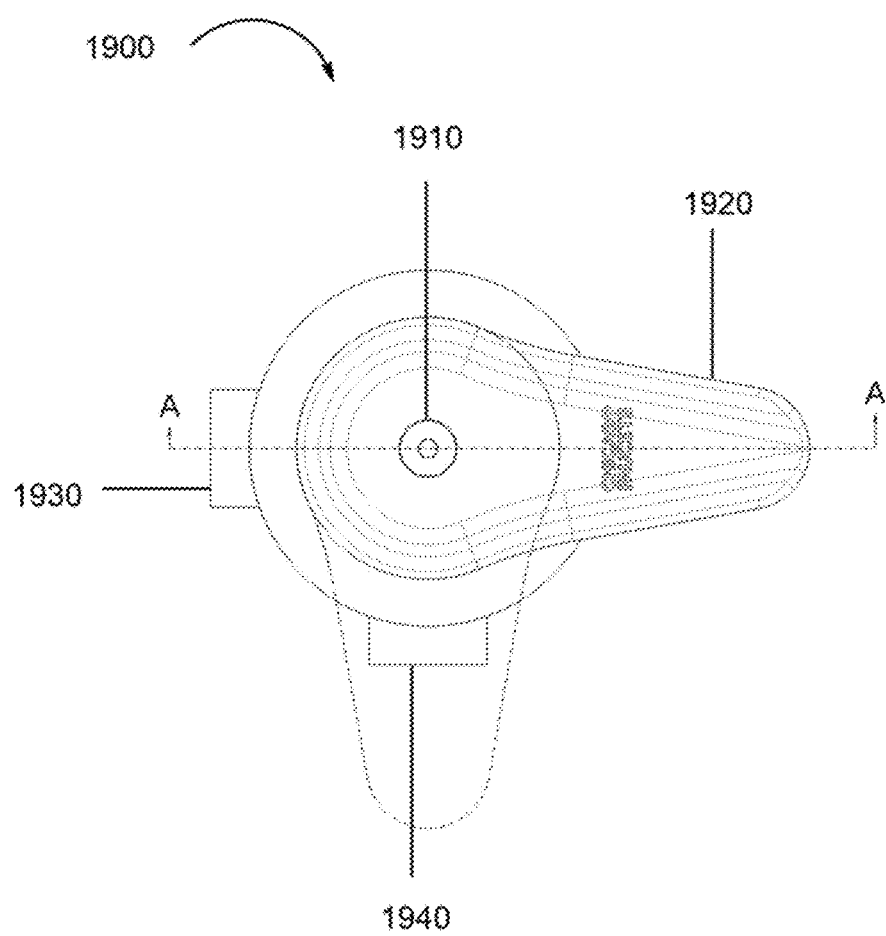
FIG. 19 is a front elevation view of the fluid valve with automatic draining diverter of FIG. 17 wherein the diverter handle is moved 90° from a closed position to the first outlet according to one aspect.

With respect to FIG. 19, an external view of the fluid valve with automatic draining diverter 1900 is portrayed. In this figure, the external view of the fluid valve with automatic draining diverter 1900 is displayed. The fluid valve with automatic draining diverter 1900 includes a diverter handle 1920. As the diverter handle 1920 is rotated 90° to the right, water is introduced from the fluid inlet 1910 to the first outlet 1940. The second outlet, 1930, is not utilized.

Figure 20:
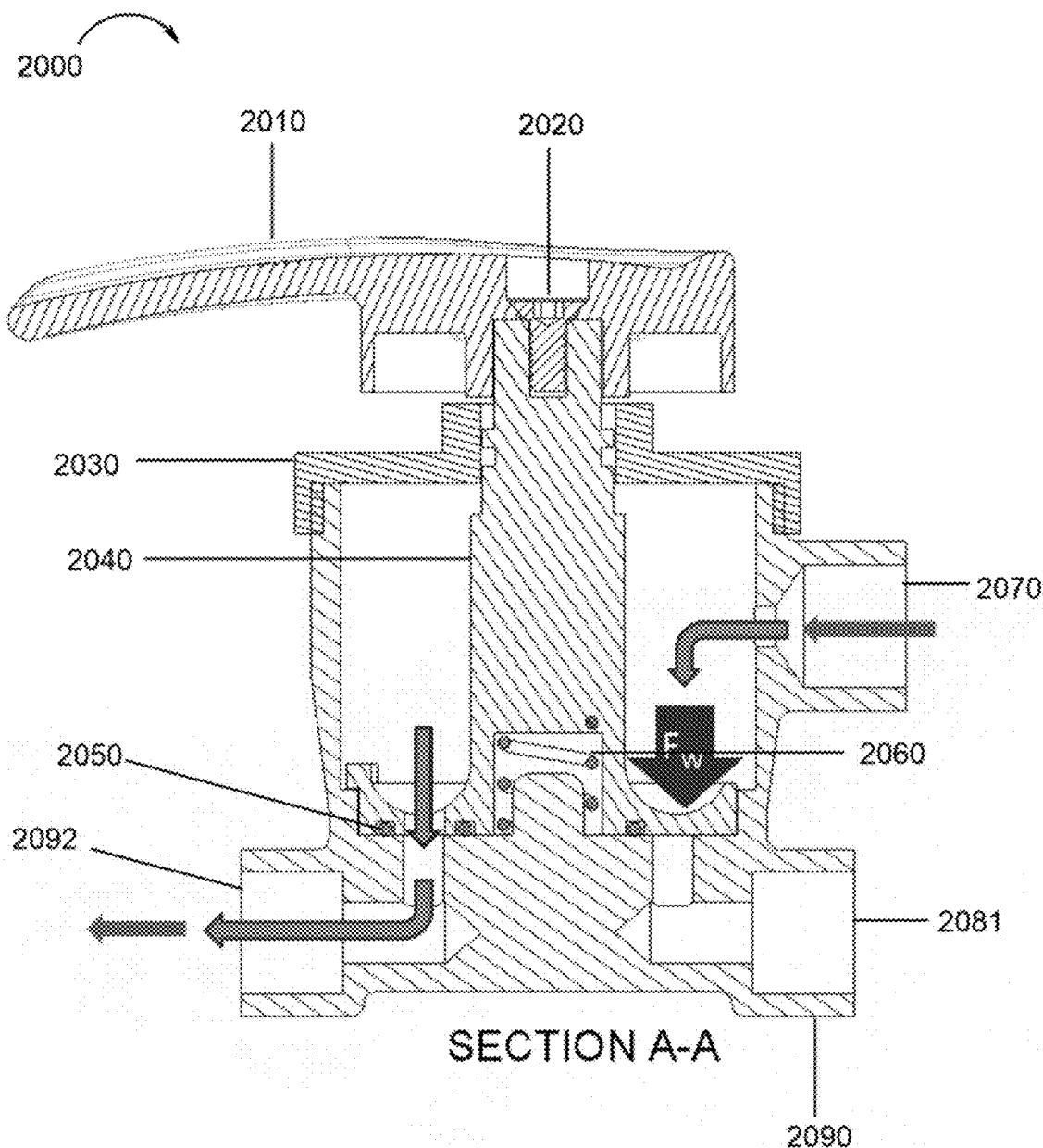
FIG. 20 is a cross-sectional view of the fluid valve with automatic draining diverter of FIG. 17 showing the flow of fluid from the fluid inlet through a second passage to a second outlet according to one aspect.

With respect to FIG. 20, an internal view of the fluid valve with automatic draining diverter 2000 is displayed. In this figure, the direction of the water flow ($F_W$) is shown. The fluid valve with automatic draining diverter 2000 includes a diverter handle 2010, a screw 2020 which couples the diverter handle 2010 to the diverter actuator stem 2040, an auto drain seal 2050 located on the bottom of the diverter actuator stem 2040, and a diverter return spring 2060 located between the auto drain seal 2050 and the bottom of the valve body 2090. The diverter return spring 2060 is a pressure sensitive diverter return spring 2060.

In this aspect, water is introduced through the fluid inlet 2070 and travels to the second passage. The pressure sensitive diverter return spring 2060 has a compressed configuration or a normal configuration. As water in the first passage contacts the pressure sensitive diverter return spring 2060, the pressure of the water ($F_W$) creates a force on the diverter actuator stem 2040 and causes the diverter actuator stem 2040 to descend within the valve body 2090 vertically. With the diverter actuator stem 2040 descending vertically, the pressure sensitive diverter return spring 2060 compresses from a normal configuration to a compressed configuration closing a gap between the diverter actuator stem 2040 and the valve body 2090, closing the diverter passage (not shown), and opening the second outlet 2092. The outputted water from the second outlet 2092 then activates the device coupled to the second outlet.

Figure 21:
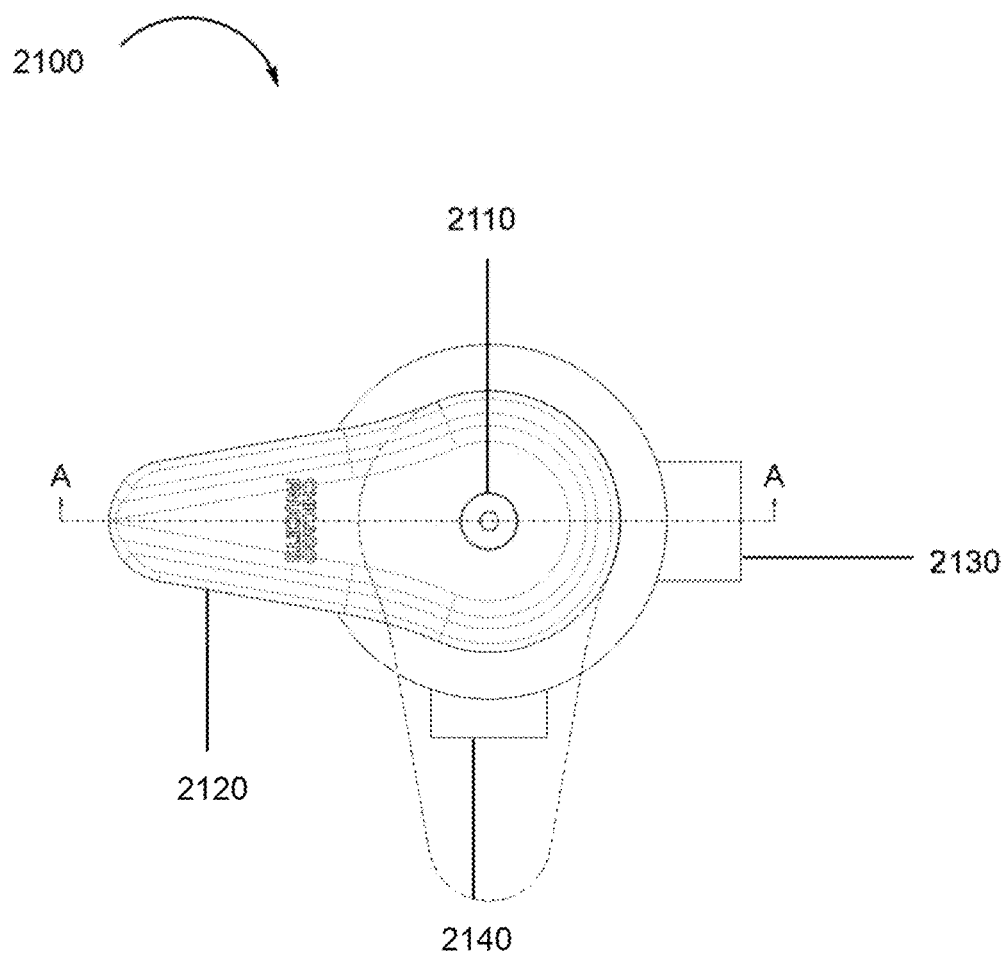
FIG. 21 is a front elevation view of the fluid valve with automatic draining diverter of FIG. 17 wherein the diverter handle is moved 90° from a closed position to the first outlet according to one aspect.

With respect to FIG. 21, an external view of the fluid valve with automatic draining diverter 2100 is displayed. The fluid valve with automatic draining diverter 2100 includes a diverter handle 2120. As the diverter handle 2120 is rotated to the left by 90°, the second configuration is activated. Water is introduced into fluid inlet 2110 and exits out of second outlet 2140. The first outlet 2130 is not utilized.

Figure 22:
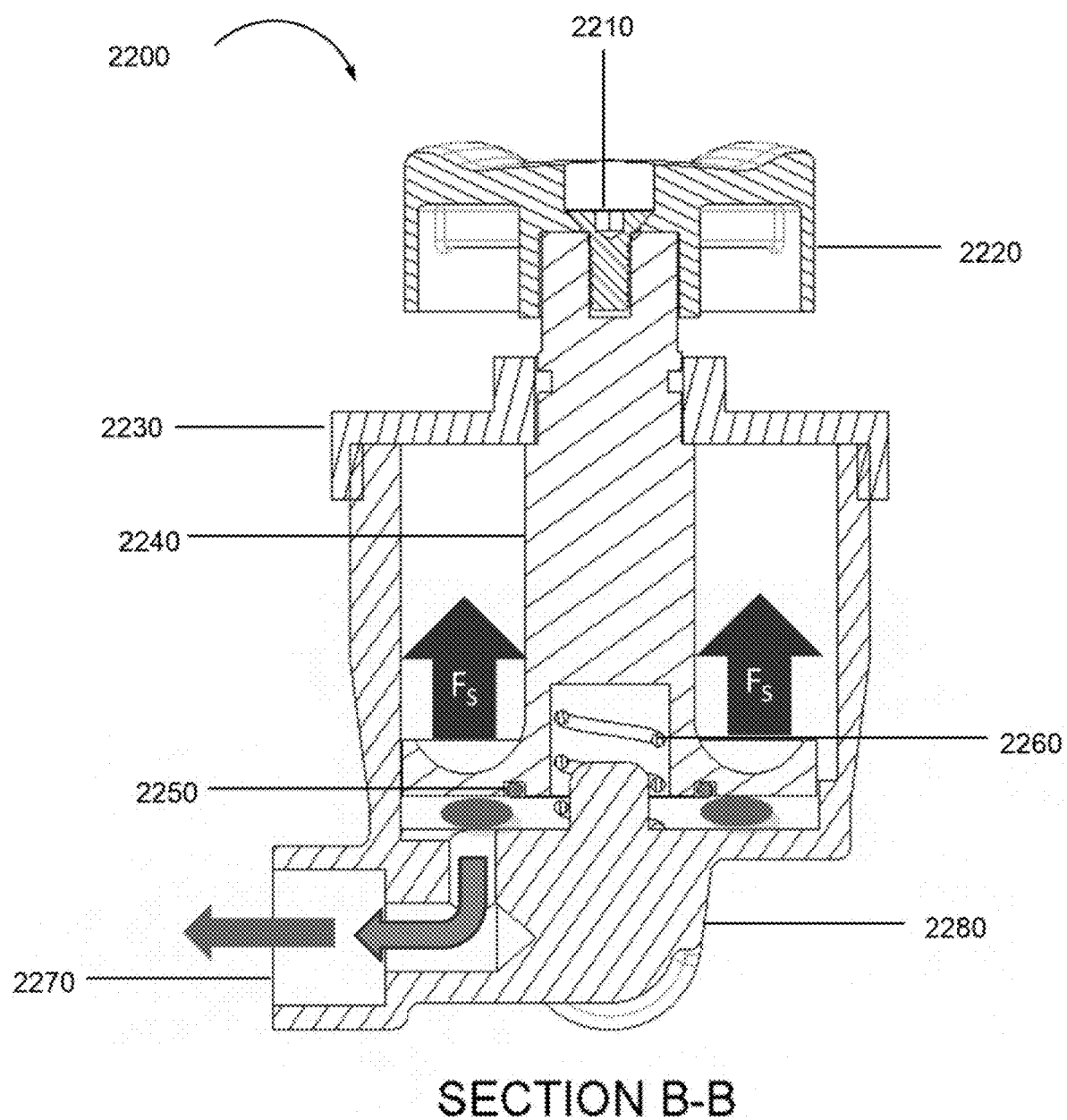
FIG. 22 is a cross-sectional view of the fluid valve with automatic draining diverter of FIG. 17 showing the internal components utilizing a water pressure sensitive spring plunger and the flow of fluid from the outlets to the drain according to one aspect.

With regards to FIG. 22, an internal view of the fluid valve with automatic draining diverter is depicted. In this figure, the direction of the spring force ($F_S$) is shown that returns the diverter actuator stem 2240 and auto drain seal 2250 to their rest positions. The fluid valve with automatic draining diverter 2200 includes a diverter handle 2220, a screw 2210 which couples the diverter handle 2220 to the diverter actuator stem 2240, an auto drain seal 2250 located on the bottom of the diverter actuator stem 2240, and a diverter return spring 2260 located between the auto drain seal 20250 and the bottom of the valve body 2290. The diverter return spring 2260 is a pressure sensitive diverter return spring 2260.

In this aspect, when the water is terminated, the fluidic pressure of the water is eliminated causing the pressure sensitive diverter return spring 2260 to return from a compressed configuration to a normal configuration. With the pressure sensitive diverter return spring in a normal configuration, the diverter actuator stem 2240 ascend vertically within the valve body 2280, closing the first outlet and the second outlet allowing the first outlet and second outlet to be open to the inner chamber and drain the gap between the diverter actuator stem 2240, the auto drain seal 2250, and the valve body 2280. The water drains to the diverter outlet 2270 from the inside of the valve body, the devices and pipes connected to the first outlet and second outlet and the outlets themselves.

Figure 23:
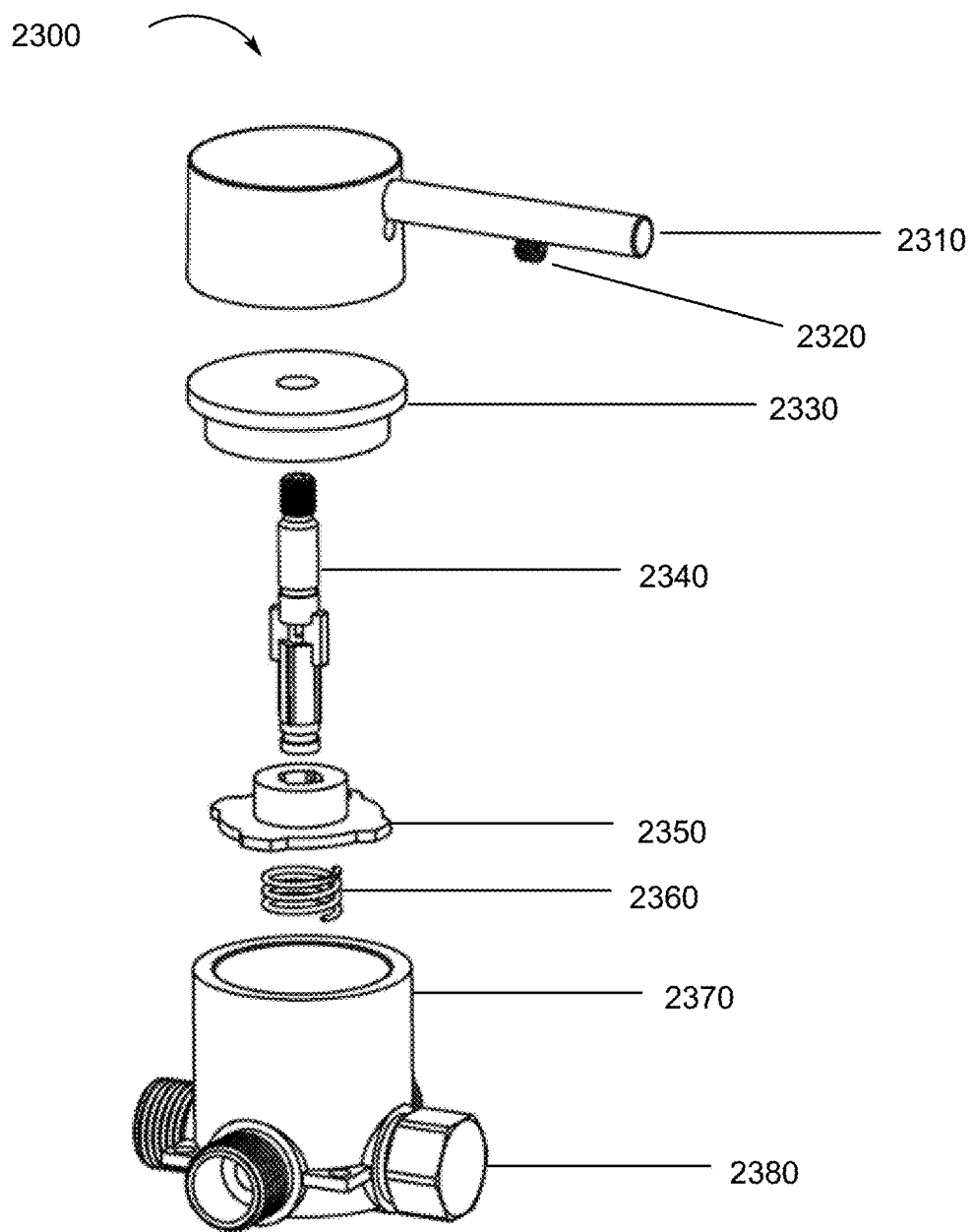
FIG. 23 is an exploded view of the fluid valve with automatic draining diverter of FIG. 23 showing the internal components utilizing a pressure sensitive spring according to one aspect.

With respect to FIG. 23, an internal view of the fluid valve with automatic draining diverter 2300 is shown. The fluid valve with automatic draining diverter 2300 includes a diverter handle 2310, a screw 2320 which couples the diverter handle 2310 to the diverter actuator stem 2340 through a hole in the diverter handle 2310 and a valve body cap 2330, a diverter actuator stem 2340, an auto drain seal plunger 2350, and a diverter return spring 2360. The valve body cap 2330 encases the diverter actuator stem 2340, the auto drain seal plunger 2350, and the diverter return spring 2360 in the valve body 2370 and maintains the position of the diverter actuator stem perpendicular within the valve body. The auto drain seal plunger 2350 is located in the bottom of the diverter actuator stem 2340. The diverter return spring 2360 is mounted between the auto drain seal plunger 2350 and the valve body 2380. The diverter return spring 2360 is a pressure sensitive diverter return spring. The diverter handle 2310 coupled to the diverter actuator stem 2340 is rotatable to direct the water from the fluid inlet through the fluid valve with automatic draining diverter to the first outlet, the second outlet, the third outlet, or the diverter outlet.

Figure 24:
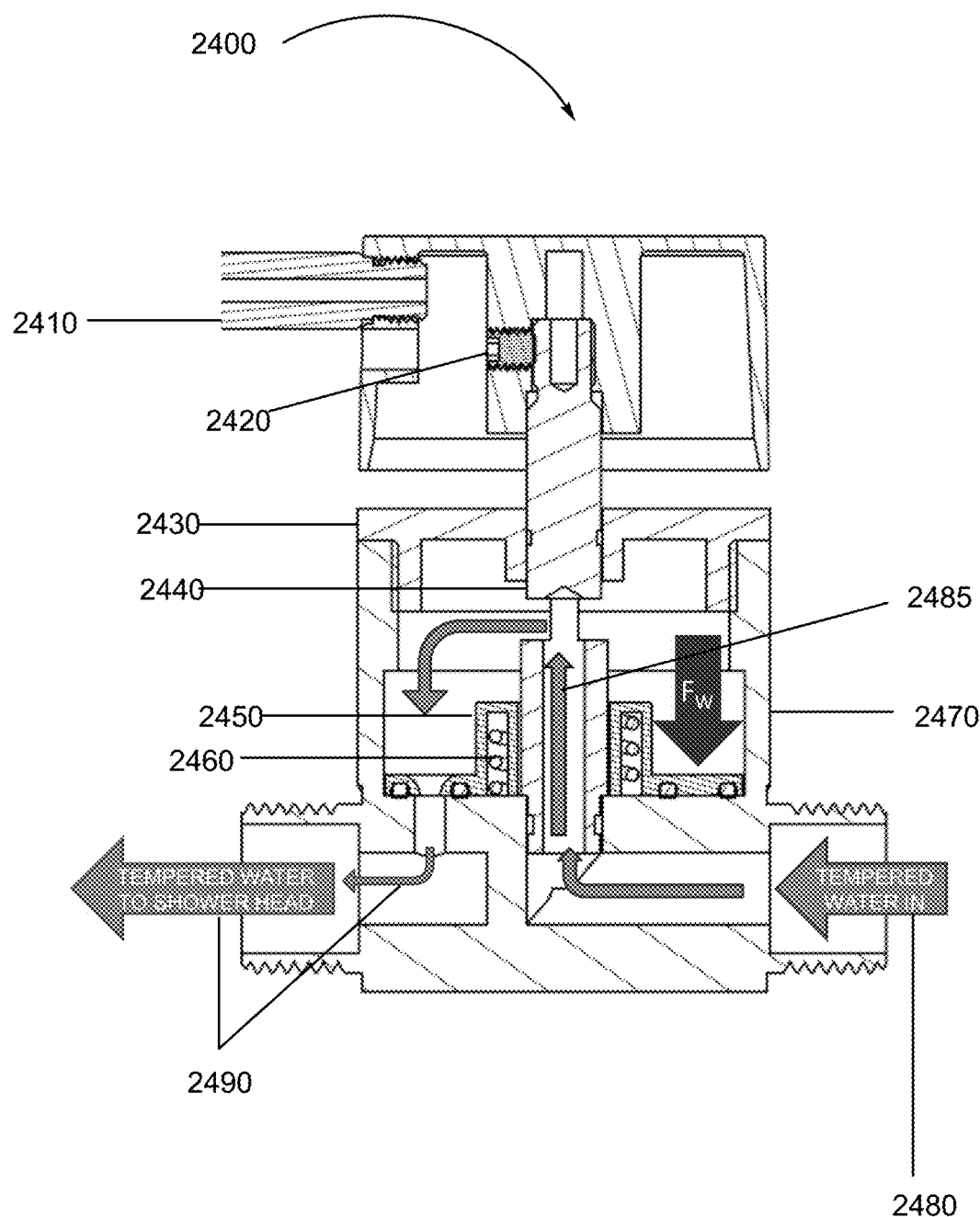
FIG. 24 is a cross-sectional view of the fluid valve with automatic draining diverter of FIG. 23 showing the flow of fluid from a fluid inlet through a first passage to a first outlet according to one aspect.

With respect to FIG. 24, an internal view of the fluid valve with automatic draining diverter 2400 is shown. In this figure, the direction of the water flow ($F_W$) is shown for the first configuration. Water is introduced into the fluid valve with automatic draining diverter 2400 through fluid inlet 2480. The fluid valve with automatic draining diverter 2400 includes a diverter handle 2410, a screw 2420 which couples the diverter handle 2410 to the diverter actuator stem 2440, an auto drain seal plunger 2450 located on the bottom of the diverter actuator stem 2440, and a diverter return spring 2460 located between the auto drain seal plunger 2450 and the bottom of the valve body 2470. The diverter return spring 2460 is a pressure sensitive diverter return spring 2460.

In this aspect, water is introduced through the fluid inlet 2480 and travels to the first passage. The pressure sensitive diverter return spring 2460 has a compressed configuration or a normal configuration. As water enters the first passage, the water contacts the diverter actuator stem 2440. The fluidic pressure of the water ($F_W$) creates a force on the diverter actuator stem 2440 which causes the diverter actuator stem 2440 to descend within the valve body 2470 vertically. With the diverter actuator stem 2440 descending vertically, the pressure sensitive diverter return spring 2460 compresses from a normal configuration to a compressed configuration creating a gap between the diverter actuator stem 2440 and the valve body 2470, closes the gap between the diverter actuator stem 2440 and the valve body, closes the diverter passage (not shown), and opens the first outlet 2490. The water output from the first outlet 2490 then activates the device coupled to the first outlet.

Figure 25:
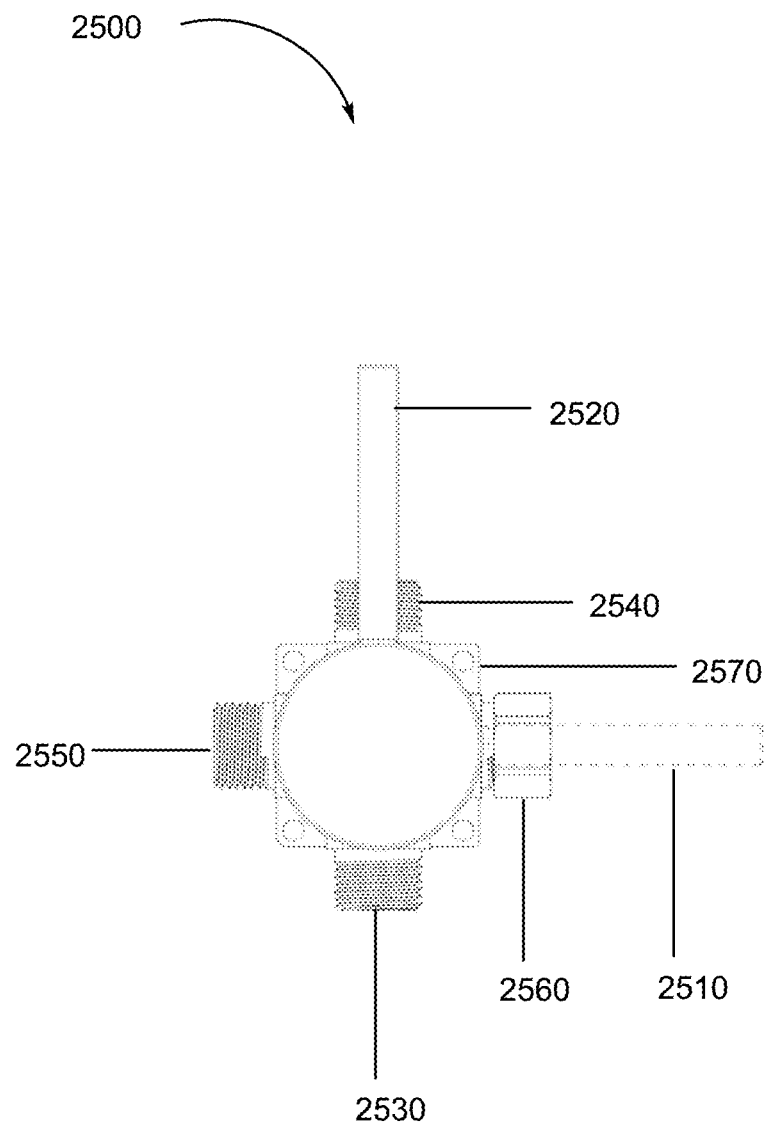
FIG. 25 is a front elevation view of the fluid valve with automatic draining diverter of FIG. 23 wherein the diverter handle is moved 90° from a closed position to the first outlet according to one aspect.

With respect to FIG. 25, an external view of the fluid valve with automatic draining diverter 2500 is portrayed. In this figure, the external view of the fluid valve with automatic draining diverter 2500 is displayed. The fluid valve with automatic draining diverter 2500 includes a diverter handle 2520. As the diverter handle 2520 is rotated 90° to the right, water is introduced from the fluid inlet 2530 to all outlets 2540, 2550, and 2560, and exits the first outlet 2540. The second outlet 2550 and the third outlet 2560 are not utilized yet water pressure to these outlets remains. The third outlet 2560 is capped with a ½" NPT cap or a similar cap.

Figure 26:
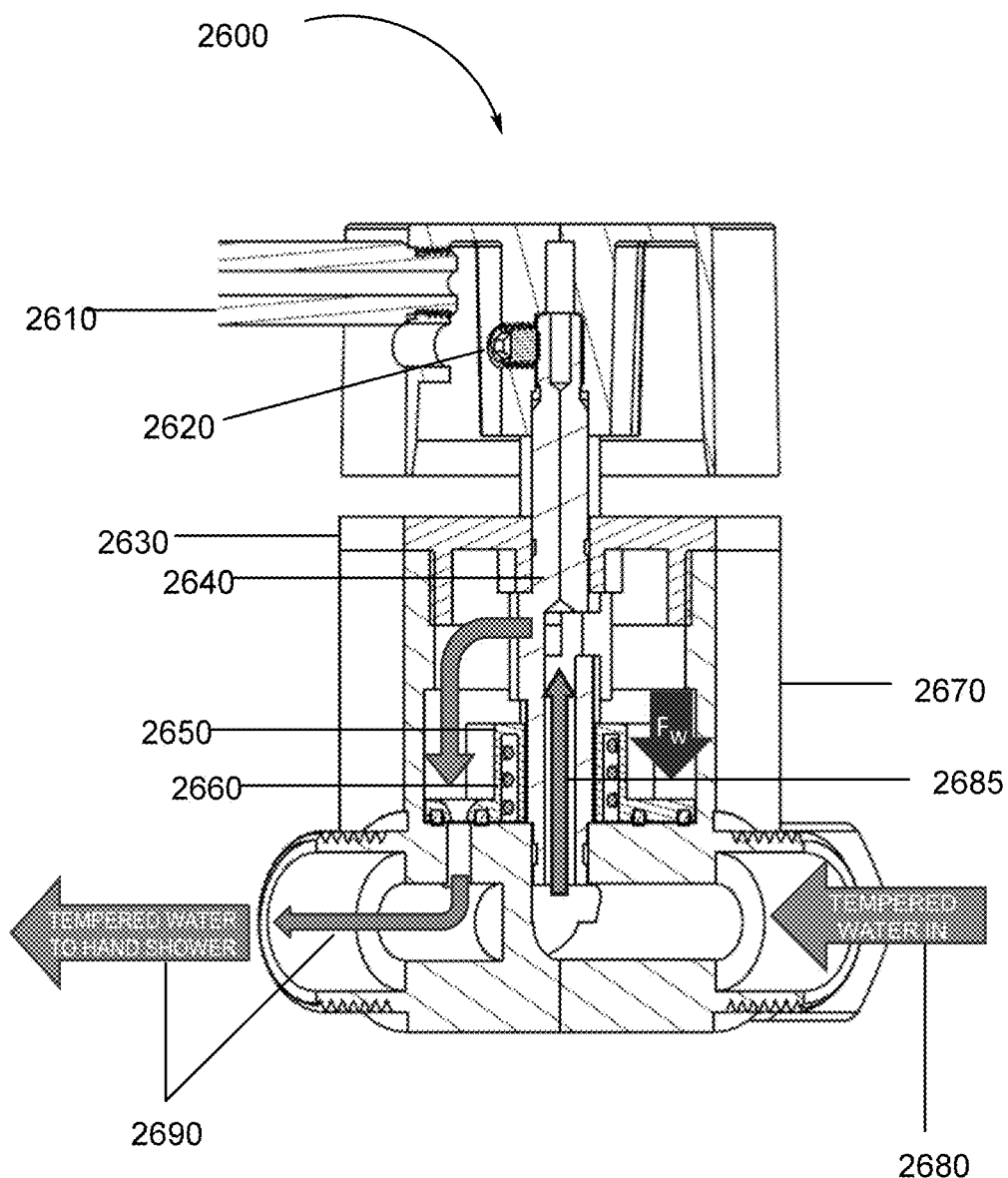
FIG. 26 is a cross-sectional view of the fluid valve with automatic draining diverter of FIG. 23 showing flow of fluid from the fluid inlet through a second passage to a second outlet according to one aspect.

With respect to FIG. 26, an internal view of the fluid valve with automatic draining diverter 2600 is shown for the second configuration. In this figure, the direction of the water flow ($F_W$) within the fluid valve with automatic draining diverter is shown. The fluid valve with automatic draining diverter 2600 includes a diverter handle 2610, a screw 2620 which couples the diverter handle 2610 to the diverter actuator stem 2640, an auto drain seal plunger 2650 located on the bottom of the diverter actuator stem 2640, and a diverter return spring 2660 located between the auto drain seal plunger 2650 and the valve body 2670. The diverter return spring 2660 is a pressure sensitive diverter return spring 2660.

In this aspect, water is introduced into fluid inlet 2680 and enters the second passage 2685. The water in the second passage 2685 comes in contact with the auto drain seal plunger 2650. Upon contact with the auto drain seal plunger 2650 with water, the water flow ($F_W$) causes the auto drain seal plunger 2650 to descend vertically within the valve body 2670 along the diverter actuator stem 2640. By descending vertically, the pressure sensitive diverter return spring 2660 compresses from a normal configuration to a compressed configuration. In the compressed configuration, a gap between the diverter actuator stem 2640 and the valve body 2670 closes and the diverter outlet (not shown) are closed. Water freely flows to the second outlet 2690 and does not flow through the first outlet or the third outlet.

Figure 27:
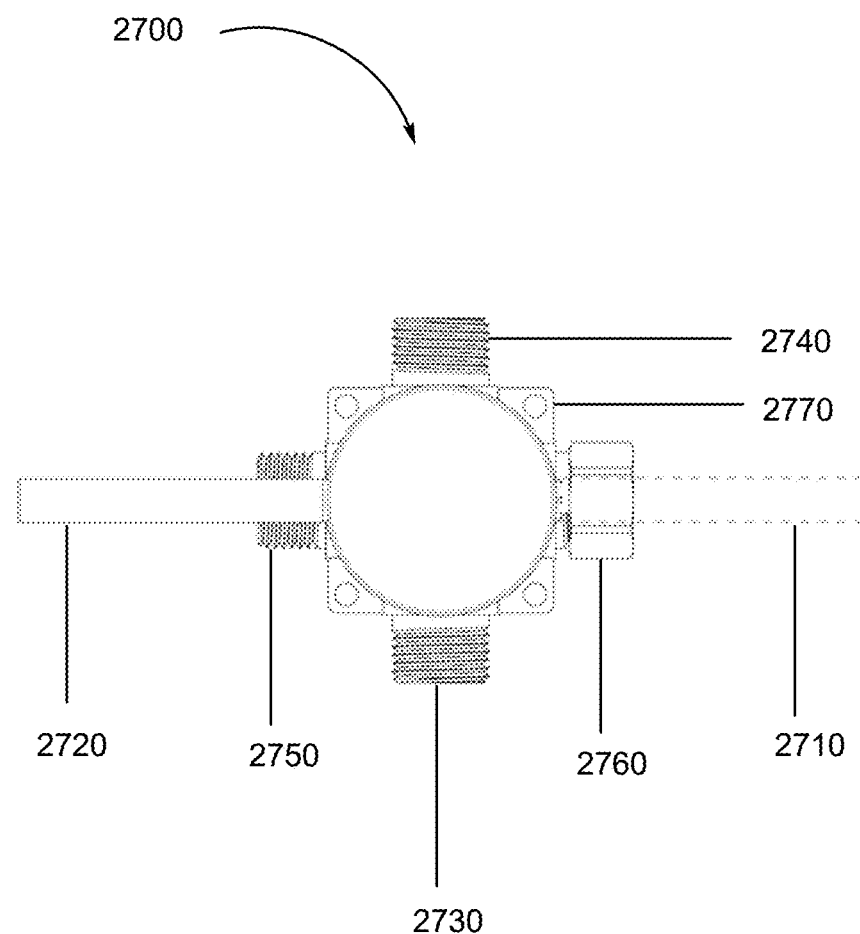
FIG. 27 is a front elevation view of the fluid valve with automatic draining diverter of FIG. 23 wherein the diverter handle is positioned 180° from a closed position to the second outlet according to one aspect.

With respect to FIG. 27, an external view of the fluid valve with automatic draining diverter 2700 is depicted. The fluid valve with automatic draining diverter 2700 includes a diverter handle 2720. As the diverter handle 2720 is rotated 180° to the right from position 2710, water is introduced from the fluid inlet 2730, pressurizes all outlets 2740, 2750, and 2760, and exits the second outlet 2750. Yet, water pressure from fluid inlet 2730 to these closed outlets 2740 and 2760 still remains. This configuration allows for consistent water pressure when switching from one output device to another output device connected to first outlet 2740, the second outlet 2750, or the third outlet 2760 and prevents a pause in the water flow or water pressure.

Figure 28:
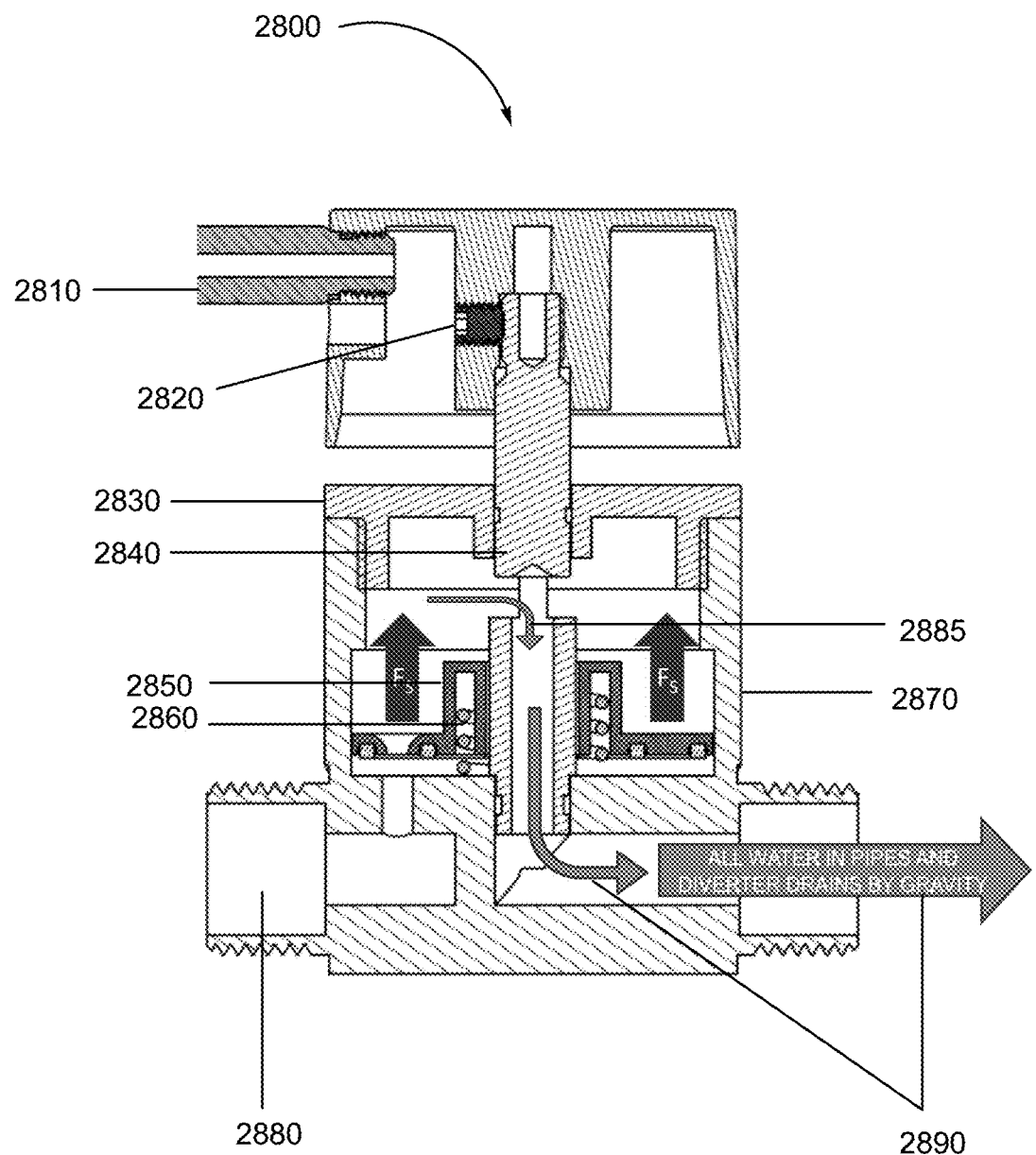
FIG. 28 is a cross-sectional view of the fluid valve with automatic draining diverter of FIG. 23 showing the flow of fluid from one or more outlets to the drain, wherein the pressure sensitive spring decompresses to open the drain outlet according to one aspect.

With respect to FIG. 28, an internal view of the fluid valve with automatic draining diverter 2800 is shown in a third configuration. In this figure, the force of the spring ($F_S$) is shown when the water flow is terminated within the fluid valve with automatic draining diverter. The force of the spring ($F_S$) causes the plunger to move up allowing the water in the outlet's associated pipes to drain. The fluid valve with automatic draining diverter 2800 includes a diverter handle 2810, a screw 2820 which couples the diverter handle 2810 to the diverter actuator stem 2840, an auto drain seal plunger 2850 located on the bottom of the diverter actuator stem 2840, and a diverter return spring 2860 located between the auto drain seal plunger 2850 and the of the valve body 2870. The diverter return spring 2860 is a pressure sensitive diverter return spring 2660.

In this aspect, water is terminated from fluid inlet 2880. By gravity, the termination in the fluidic pressure of the water drains the water from the devices connected to the first fluid outlet, the second fluid outlet (not shown), the third outlet (not shown), associated pipes connected to the first outlet, the second outlet, the third outlet, devices connected to these outlets, and enters the interior of the valve body 2870. After entering the interior of the valve body 2870 and enters the diverter passage 2885. Upon terminating the water pressure in the interior of the valve body 2870, the force of the spring ($F_S$) and the termination of the fluidic pressure causes the auto drain seal plunger 2850 and the diverter actuator stem 2840 to ascend vertically within the valve body 2870. By ascending vertically, the pressure sensitive diverter return spring 2860 returns from a compressed configuration to a normal configuration. In the normal configuration, a gap between the diverter actuator stem 2840 and the valve body 2870 opens and the diverter outlet 2890 is opens. Water freely drains by gravity from the first outlet, the second outlet, the third outlet, associated piping connected to these outlets, the devices connected to these outlets, and the interior of the valve body 2870 to the diverter outlet 2890.

Figure 29:
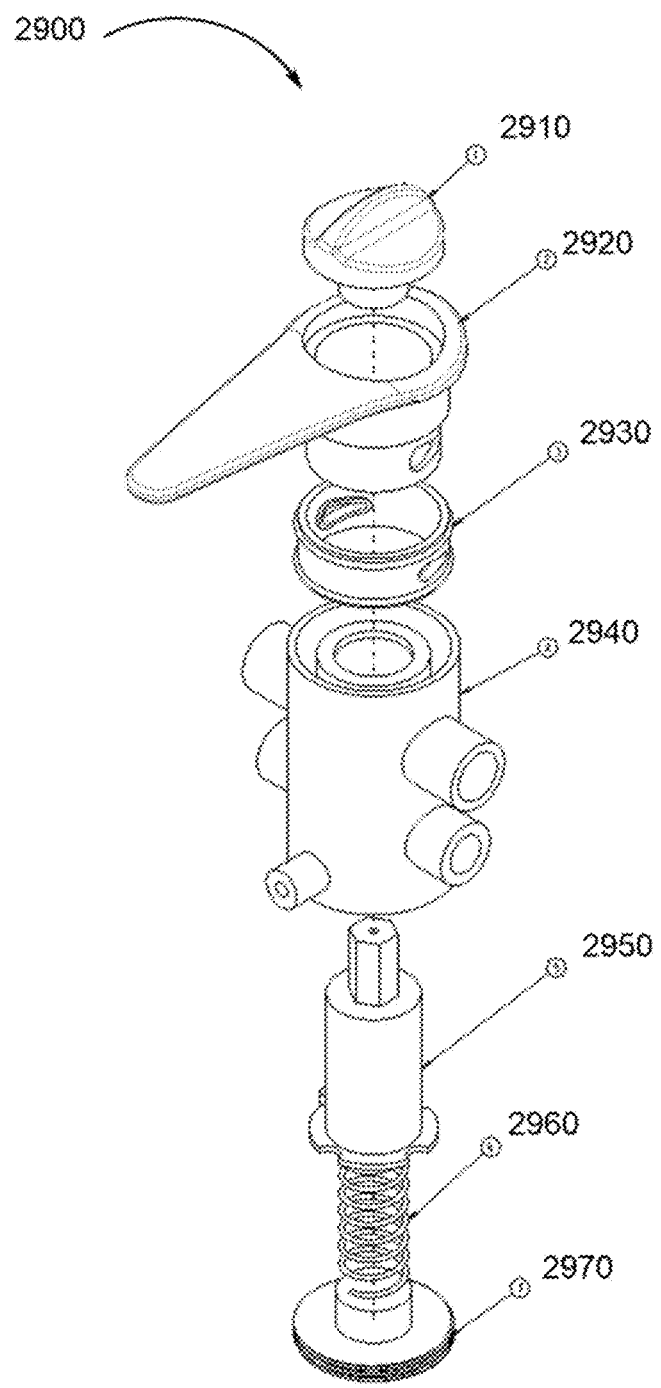
FIG. 29 is an exploded view of a fluid valve with automatic draining diverter having two fluid inlets, a diverter knob, a boot seal, a diverter return spring, and a diverter outlet according to one aspect.

With respect to FIG. 29, an internal view of the fluid valve with automatic draining diverter 2900 is depicted. The fluid valve with automatic draining diverter 2900 includes a diverter knob 2910, a water handle 2920, a boot seal 2930, a valve body 2940, a diverter body 2950, a diverter return spring 2960, and a valve body cap 2970. The valve body 2940 defines the interior of the fluid valve with automatic draining diverter 2900. The valve body cap 2970 may be a threaded valve body cap 2970 which is coupled to the valve body 2940.

In this aspect, the diverter knob 2910 is located in a recess of the diverter handle 2920 and is configured to rotate between a first configuration, a second configuration, a third configuration, and the diverter outlet. In the first configuration, the flow of water is directed from the fluid inlet(s) to the first outlet. In the second configuration, the flow of water is directed from the fluid inlet(s) to the second outlet. In the third configuration, the flow of water is directed from the fluid inlet(s) to the third outlet. The first outlet, the second outlet, and the third outlets may be independently selected from a group consisting of an overhead shower, a hand-held shower, a wall shower, a second hand-held slower, or a basin filling device. When the water flow is terminated, and the water exits from a device connected to the first outlet, the second outlet, the third outlet, piping associate with the outlets, devices connected to these outlets, and the interior of the valve body 2940 which proceeds to the diverter outlet. The diverter handle is coupled to the diverter body 2940. Located in between the diverter handle 2920 and the diverter body 2940 is a boot seal 2930 designed to seal the water in the diverter body 2940 and regulate a water flow from the fluid inlet(s). This regulation of the flow of water from the fluid inlet(s) also provides for a termination of the fluidic pressure of the water.

In this aspect, the diverter body 2950 is mounted perpendicular within the valve body 2940 and houses the water inlet(s), and diverter outlet. The diverter return spring 2960 is located between the diverter body 2950 and the valve body cap 2970. The diverter return spring is mounted perpendicular to a central axis of the diverter body 2950. The valve body cap 2970 encapsulated the pressure sensitive diverter return spring within the diverter body 2940.

Figure 30:
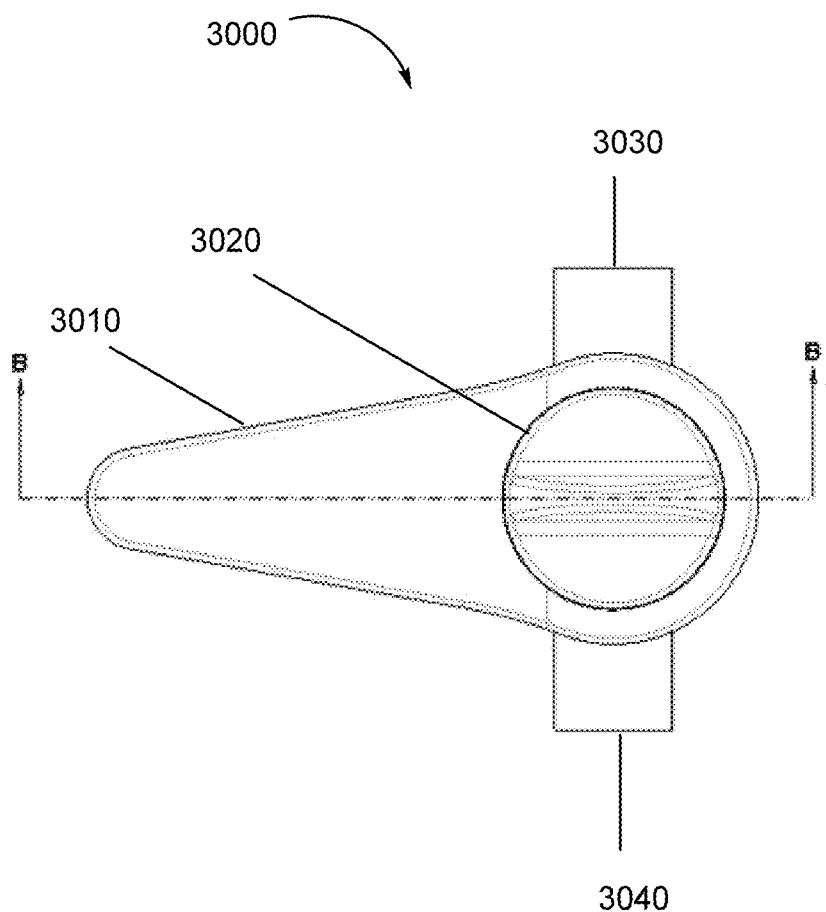
FIG. 30 is a front elevation view of the fluid valve with automatic draining diverter of FIG. 29 wherein the diverter handle is 90° from a closed position to the first outlet according to one aspect.

With respect to FIG. 30, an external view of the fluid valve with automatic draining diverter 3000 is depicted. In this view, the fluid valve with automatic draining diverter included a water handle 3010 with turns the water on or off, a diverter knob 3020, and water inlets 3030 and 3040. By rotating the diverter knob 3020, the selection between the first configuration allowing the water flow from the fluid inlet(s) to the first outlet, the second configuration allowing the water flow from the fluid inlet(s) to the second outlet and draining the water from the system by gravity in the third configuration to the diverter outlet. In this rotation, rotating the diverter knob 3020 90° to the right would direct water to the first outlet, rotating the diverter knob 3020 180° to the left would direct the water to the second outlet, and rotating the diverter knob 90° back to the right would direct the water to the diverter outlet.

Figure 31:
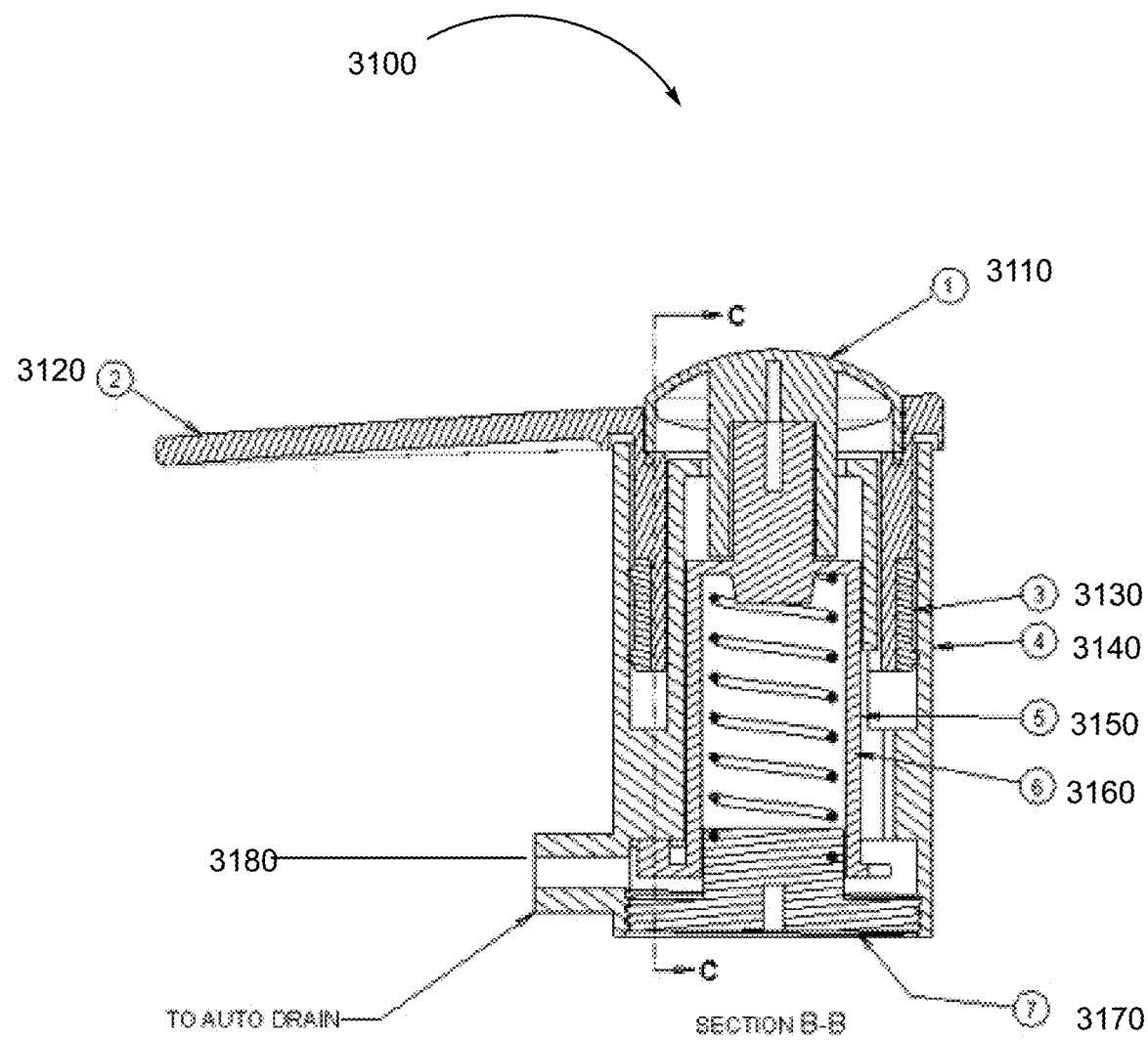
FIG. 31 is a cross-sectional view of the fluid valve with automatic draining diverter of FIG. 29, as viewed along line B-B according to one aspect.

With respect to FIG. 31, an internal view of the fluid valve with automatic draining diverter 3100 is shown. The fluid valve with automatic draining diverter 3100 includes the diverter knob 3110, the water on/off handle 3120, the boot seal 3130, the valve body 3140, the diverter body 3150, the diverter return spring 3160, the valve body cap 3170, and the diverter outlet 3180.

In this aspect, the water on/off handle 3120 provides for a flow from the fluid inlet(s) into the interior of the fluid valve with automatic draining diverter 3100. By rotating the water on/off handle 3120 to the on position, the fluid inlet allows water to flow from the inlet(s) to the specific fluid outlet. By turning off the water on/off handle to the off position, the water pressure terminates. By selecting the position of the diverter knob 3110, water can be directed to the first outlet, the second outlet, or the diverter outlet. The diverter return spring 3160 maintains tension on the diverter body 3140. By selecting the diverter knob 3110 to the diverter outlet, the water drains from the interior of the valve body as well as the devices connected to and associated piping to the first outlet and the second outlet. When selecting the diverter knob to the diverter outlet, the diverter knob 3110 emits a click or a positive detent.

In this aspect, boot seal 3130 seals the water on/off handle by terminating the flow of water through the hot-water inlet and the cold-water inlet. The valve body cap 3170 seals the valve body 3140 and the diverter return spring provides constant spring force to the diverter body 3150 and the diverter knob 3110.

Figure 32A:
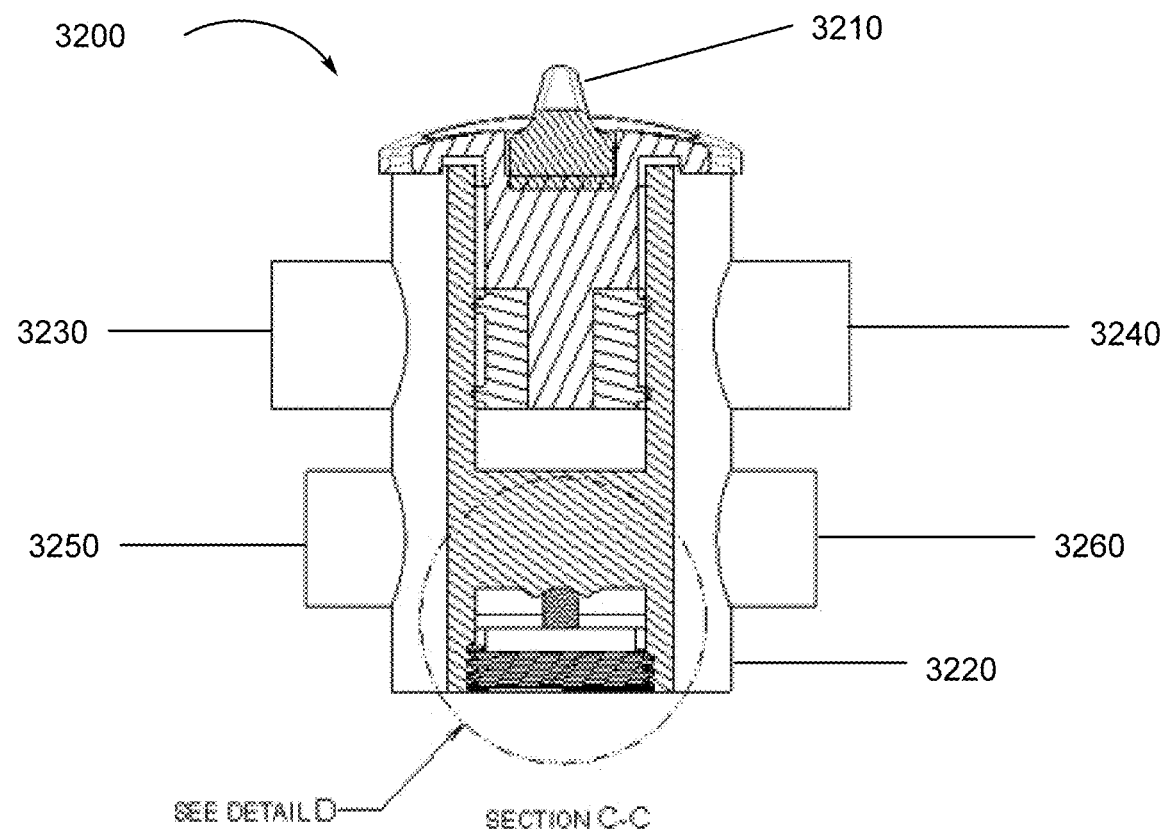
FIG. 32A is a partial cross-sectional view of the fluid valve of FIG. 29 as viewed along line C-C according to one aspect.

With regards to FIG. 32A, an internal view of the fluid valve with automatic draining diverter 3200 is shown. The fluid valve with automatic draining diverter shows the diverter knob 3210 and the valve body 3220. The fluid inlets, 3230 and 3430, may be hot and cold water. As water is introduced into the fluid valve with automatic draining diverter 3200 and the diverter knob is selected for the appropriate outlet (90° right or 180° left), the water from fluid valves 3230 and 3240 are initially mixed and flows to the specific output devices connected to the first outlet and the second outlet such as an overhead shower or a hand-held shower device.

Figure 32B:
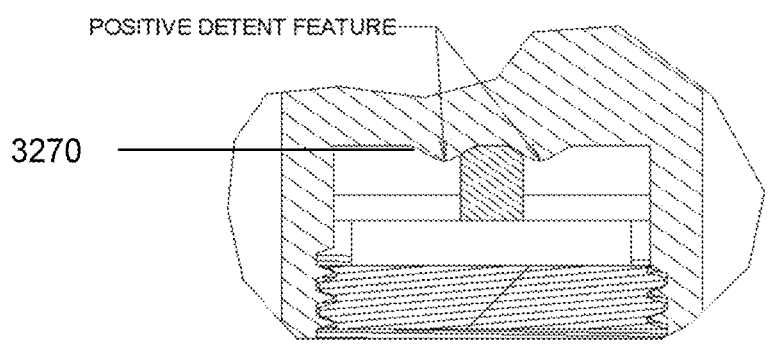
FIG. 32B is an enlarged view of a positive detent feature within the fluid valve with automatic draining diverter shown in FIG. 32A according to one aspect.

With respect to FIG. 32B, an enlarged section of the internal view of the fluid valve with automatic draining diverter is shown. In this figure, the positive detent feature is shown 3270.

Figure 33:
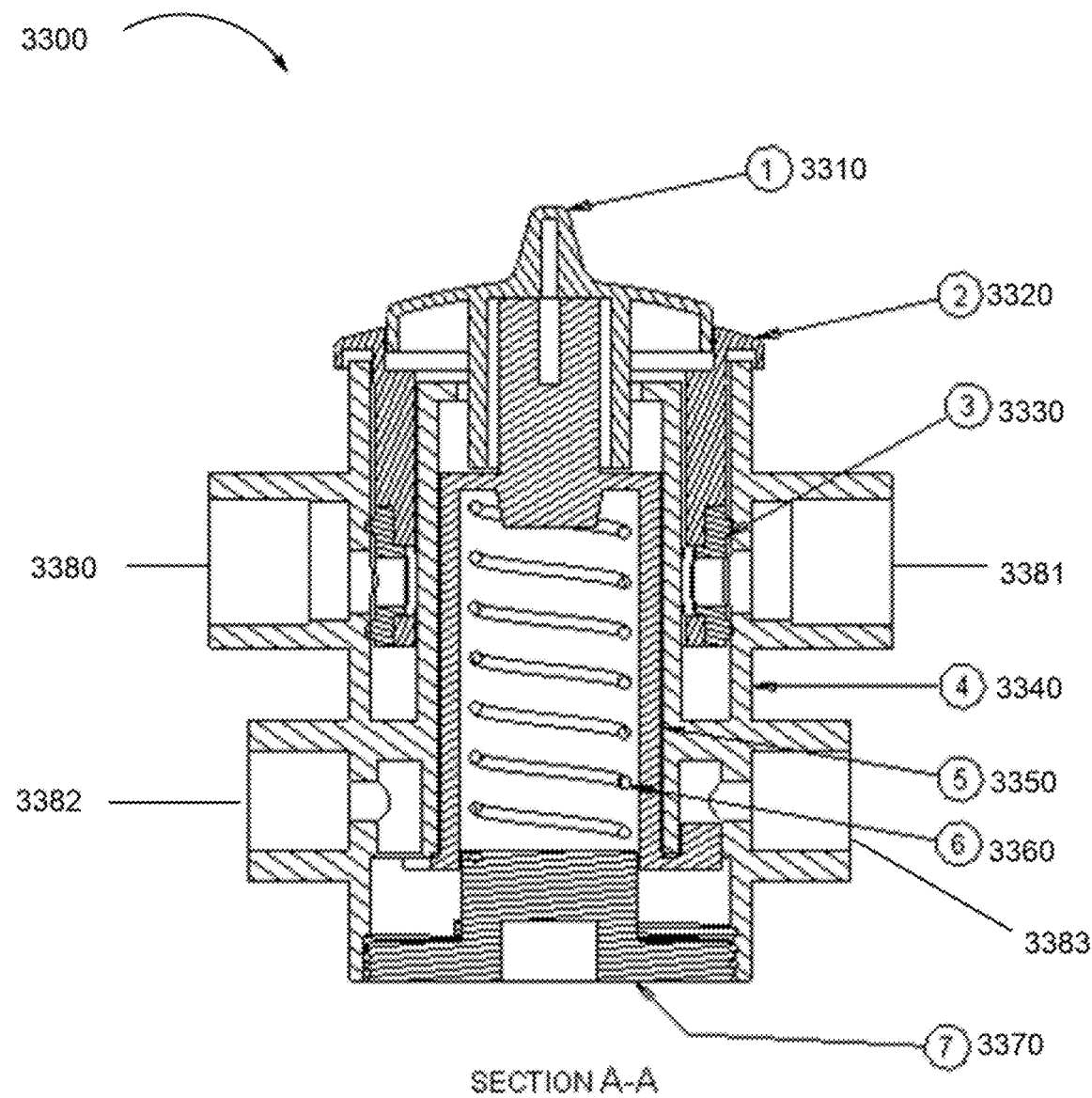
FIG. 33 is a cross-sectional view of the fluid valve with automatic draining diverter shown in FIG. 30 according to one aspect.

With respect to FIG. 33, an internal view of the fluid valve with automatic draining diverter 3300 is shown. The fluid valve with automatic draining diverter 3300 includes the diverter knob 3310, the water on/off handle 3320, the boot seal 3330, the valve body 3340, the diverter body 3350, the diverter return spring 3360, and the valve body cap 3370. Hot water inlet 3380, cold water inlet 3381, the first water outlet 3382, and the second water outlet 3383. By rotating the water on/off handle, the appropriate temperature of the water exiting the first water outlet 3382 may be determined. The boot seal constricts or terminates the water through hot-water inlet 3380 and the cold-water inlet 3381.

In this aspect, the diverter return spring 3360 provides constant tension on the diverter body 3340 and diverter knob 3310 through compression of the diverter return spring.

Numerous examples are provided herein to enhance understanding of the present disclosure. A specific set of statements are provided as follows.

Statement 1: A fluid valve with automatic draining diverter comprising: a valve body defining an interior; a fluid inlet in fluidic communication with the interior; a first passage in fluidic communication with the interior; a first outlet in fluidic communication with the first passage; a second passage in fluidic communication with the interior; a second outlet in fluidic communication with the second passage; a diverter passage in fluidic communication with the interior; a diverter outlet in fluidic communication with the diverter passage; a diverter actuator stem configured to rotate between a first configuration and a second configuration; an auto drain seal mounted within the diverter actuator stem; wherein, the first configuration, the diverter actuator stem directs a fluid to the first outlet and closes the second outlet; and wherein, the second configuration, the diverter actuator stem directs the fluid to the second outlet and closes the first outlet.

Statement 2: The fluid valve with automatic draining diverter of Statement 1, wherein the diverter actuator stem comprises an upper diverter actuator, the auto drain seal, and a lower diverter actuator.

Statement 3: The fluid valve with automatic draining diverter of Statement 2, wherein the diverter actuator stem is mounted perpendicular within the valve body.

Statement 4: The fluid valve with automatic draining diverter of claim 1, further comprising a diverter handle, the diverter handle is coupled to an upper diverter actuator using a screw.

Statement 5: The fluid valve with automatic draining diverter of Statement 1, wherein the auto drain seal is coupled to a lower diverter actuator and a diverter seal retainer is coupled on the auto drain seal.

Statement 6: The fluid valve with automatic draining diverter of Statement 1, further comprising at least one seal, the at least one seal is coupled to a lower diverter actuator and provides a seal against the valve body.

Statement 7: The fluid valve with automatic draining diverter of Statement 2, wherein the diverter actuator stem provides a positive stop in either a clockwise or a counterclockwise direction.

Statement 8: The fluid valve with automatic draining diverter of Statement 2, wherein the upper diverter body comprises at least one hole.

Statement 9: The fluid valve with automatic draining diverter of Statement 4, wherein the upper diverter body provides fluidic communication between the fluid inlet and the first passage; and fluidic communication between the fluid inlet and the second passage.

Statement 10: The fluid valve with automatic draining diverter of Statement 1, wherein the auto drain seal is a pressure sensitive auto drain seal.

Statement 11: The fluid valve with automatic draining diverter of Statement 9, wherein the auto drain seal is configured in an expanded configuration and a normal configuration Statement 12: The fluid valve with automatic draining diverter of Statement 1, wherein an increase in a fluidic pressure within the interior causes the auto drain seal to expand within the diverter actuator stem from a normal configuration to the expanded configuration, closing a gap between the lower diverter actuator and the diverter outlet, and opening the first outlet or the second outlet.

Statement 13: The fluid valve with automatic draining diverter of Statement 1, wherein a decrease in a fluidic pressure within the interior causes the auto drain seal to return to a normal configuration from the expanded configuration, opening the gap between the lower diverter actuator and the diverter outlet, allowing the fluid to drain from the first outlet, the second outlet, associated pipes connected to the first outlet or the second outlet, devices connected to the first outlet or the second outlet, and the interior.

Statement 14: The fluid valve with automatic draining diverter of Statement 1, further comprising a valve cap which is coupled to the diverter handle, the valve cap encapsulates the upper diverter body, the auto drain seal, and the lower diverter body within the valve body.

Statement 15: A fluid valve with automatic draining diverter comprising: a valve body defining an interior; a fluid inlet in fluidic communication with the interior; a first passage in fluidic communication with the interior; a first outlet in fluidic communication with the first passage; a second passage in fluidic communication with the interior; a second outlet in fluidic communication with the second passage; a third passage in fluidic communication with the interior; a third outlet in fluidic communication with the third passage; a diverter passage in fluidic communication with the interior; a diverter outlet in fluidic communication with the diverter passage; a diverter actuator stem configured to rotate between a first configuration, a second configuration, and a third configuration; an auto drain seal diaphragm mounted within the diverter actuator stem; wherein, the first configuration, the diverter actuator stem directs a fluid to the first outlet and closes the second outlet and the third outlet; and wherein, the second configuration, the diverter actuator stem directs the fluid to the second outlet and closes the first outlet and third outlet; wherein, the third configuration, the diverter actuator stem directs the fluid to the third outlet and closes the first outlet and the second outlet wherein a diverter cap may be placed on the first outlet, the second outlet, or the third outlet not allowing the fluid to flow through the first outlet, the second outlet, or the third outlet.

Statement 16: The fluid valve with automatic draining diverter of Statement 15, wherein the diverter actuator stem comprises an upper diverter body, the auto drain seal diaphragm, and a lower diverter body.

Statement 17: The fluid valve with automatic draining diverter of Statement 16, wherein the diverter actuator stem is mounted perpendicular within the valve body.

Statement 18: The fluid valve with automatic draining diverter of Statement 15, further comprising a diverter handle, the diverter handle is coupled to the upper diverter actuator using a screw.

Statement 19: The fluid valve with automatic draining diverter of Statement 15, further comprising a diverter sleeve to encapsulate the upper diverter body, the auto drain seal diaphragm, and the lower diverter body.

Statement 20: The fluid valve with automatic draining diverter of Statement 15, further comprising at least one seal, the at least one seal is coupled externally to the upper diverter actuator and provides a seal against the diverter sleeve; the diverter seal provides a seal against the body and the diverter sleeve.

Statement 21: The fluid valve with automatic draining diverter of Statement 16, wherein the diverter actuator stem provides a positive stop in either a clockwise or a counterclockwise direction.

Statement 22: The fluid valve with automatic draining diverter of Statement 16, wherein the upper diverter body comprises at least one hole.

Statement 23: The fluid valve with automatic draining diverter of Statement 16, wherein the upper diverter body, the auto drain seal diaphragm and the lower diverter body provides fluidic communication between the fluid inlet and the first passage, fluidic communication between the fluid inlet and the second passage, and fluidic communication between the fluid inlet and the third passage.

Statement 24: The fluid valve with automatic draining diverter of Statement 18, further comprising a diverter sleeve, the diverter sleeve provides a guide for the upper diverter body, the lower diverter body, and the fluidic communication.

Statement 25: The fluid valve with automatic draining diverter of Statement 18, wherein the diverter sleeve comprises an external diverter seal coupled externally to the diverter sleeve and the external diverter seal prevents direct fluid to valve body.

Statement 26: The fluid valve with automatic draining diverter of Statement 15, wherein the auto drain seal diaphragm is a pressure sensitive auto drain seal diaphragm.

Statement 27: The fluid valve with automatic draining diverter of Statement 26, wherein the pressure sensitive auto drain seal diaphragm is configured in an expanded configuration and a normal configuration.

Statement 28: The fluid valve with automatic draining diverter of Statement 27, wherein an increase in a fluidic pressure within the interior causes the pressure sensitive auto drain seal diaphragm to expand within the diverter actuator stem from a normal configuration to an expanded configuration, closing a gap between the lower diverter body and the upper diverter body through the auto drain seal diaphragm, allowing water to flow through the diverter body assembly to the diverter body outlet, through the first outlet, the second outlet, or the third outlet.

Statement 29: The fluid valve with automatic draining diverter of Statement 28, wherein the water pressure is not paused to the to the first outlet, first outlet, the second outlet, or the third outlet.

Statement 30: The fluid valve with automatic draining diverter of Statement 27, wherein a decrease in a fluidic pressure within the interior causes the auto drain seal diaphragm to return to a normal configuration within the diverter actuator stem from an expanded configuration, opening a gap between the lower diverter body and the auto drain seal diaphragm and upper diverter body, allowing water to drain from the first outlet, the second outlet, the third outlet, associated piped connected to the first outlet, the second outlet, the third outlet, a device coupled to the first outlet, the second outlet, and the third outlets, and interior.

Statement 31: The fluid valve with automatic draining diverter of Statement 15, further comprising a threaded valve bonnet which is coupled to the valve body and encloses the upper diverter body, the auto drain seal diaphragm, and the lower diverter body within the valve body.

Statement 32: A fluid valve with automatic draining diverter comprising: a valve body defining an interior; a fluid inlet in fluidic communication with the interior; a first passage in fluidic communication with the interior; a first outlet in fluidic communication with the first passage; a second passage in fluid communication with the interior; a second outlet in fluidic communication with the second passage; a diverter passage in fluidic communication with the interior; a diverter outlet in fluidic communication with the diverter passage; a diverter actuator stem configured to rotate between a first configuration and a second configuration; a diverter return spring and an auto drain seal plunger mounted between the diverter actuator stem and the first outlet and the second outlet; wherein, the first configuration, the diverter actuator stem directs a fluid to the first outlet and closes the second outlet; wherein, the second configuration, the diverter actuator stem directs the fluid to the second outlet and closes the first outlet; and wherein, upon a reduction in the water pressure in the interior causes the diverter return spring to open the gap between the auto drain seal plunger and the valve body, allowing the water to drain from the first and the second outlet, all associated pipes connected to these outlets, devices connected to these outlets, and diverter body interior automatically.

Statement 33: The fluid valve with automatic draining diverter of Statement 32, wherein the diverter actuator stem is mounted perpendicular within the valve body.

Statement 34: The fluid valve with automatic draining diverter of Statement 32, wherein the diverter actuator stem includes an upper diverter actuator body, the diverter return spring, and a lower diverter actuator.

Statement 35: The fluid valve with automatic draining diverter of Statement 32, further comprising a diverter handle, the diverter handle is coupled to the upper diverter actuator using a screw.

Statement 36: The fluid valve with automatic draining diverter of Statement 32, wherein the diverter return spring is a pressure sensitive diverter return spring.

Statement 37: The fluid valve with automatic draining diverter of Statement 36, wherein the pressure sensitive diverter return spring is mounted parallel to a central axis of the diverter actuator stem.

Statement 38: The fluid valve with automatic draining diverter of Statement 32, wherein the auto drain seal plunger is located in between the diverter actuator stem and the pressure sensitive diverter return spring.

Statement 39: The fluid valve with automatic draining diverter of Statement 32, wherein the auto drain seal plunger is located in between the diverter actuator stem and the pressure sensitive diverter return spring.

Statement 40: The fluid valve with automatic draining diverter of Statement 36, wherein the pressure sensitive diverter return spring is configured in a compressed configuration and a normal configuration.

Statement 41: The fluid valve with automatic draining diverter of Statement 40, wherein the compressed configuration, the auto drain seal plunger seals the diverter passage.

Statement 42: The fluid valve with automatic draining diverter of Statement 41 wherein the normal configuration, the auto drain seal plunger seals the first outlet and the second outlet.

Statement 43: The fluid valve with automatic draining diverter of Statement 32, wherein the diverter actuator stem is configured to move the diverter actuator stem vertically within the valve body.

Statement 44: The fluid valve with automatic draining diverter of Statement 43, wherein an increase in a fluidic pressure within the interior causes the diverter actuator stem to descend vertically within the valve body, the pressure sensitive diverter return spring to compress from a normal configuration to a compressed configuration, closing a gap between the lower diverter body and the valve body, closing the diverter passage, and opening the first outlet and the second outlet.

Statement 45: The fluid valve with automatic draining diverter of Statement 43, wherein a decrease in the fluidic pressure within the interior causes the diverter actuator stem to ascend vertically within the valve body, the pressure sensitive diverter return spring expands from a compressed configuration to a normal configuration, opening the gap between the lower diverter body and the valve body, opening the diverter passage, and closes the first outlet and the second outlet.

Statement 46: The fluid valve with automatic draining diverter of Statement 32, further comprising a threaded valve body cap to enclose the diverter actuator stem, the auto drain seal plunger, and the pressure sensitive diverter return spring within the valve body.

Statement 47: A fluid valve with automatic draining diverter comprising: a valve body defining an interior; a fluid inlet in fluidic communication with the interior; a first passage in fluidic communication with the interior; a first outlet in fluidic communication with the first passage; a second passage in fluid communication with the interior; a second outlet in fluidic communication with the second passage; a third passage in fluidic communication with the interior; a third outlet in fluidic communication with the third passage; a diverter passage in fluidic communication with the interior; a diverter outlet in fluidic communication with the diverter passage; a diverter actuator stem configured to rotate between a first configuration, a second configuration, and a third configuration; a diverter return spring and an auto drain seal plunger mounted between the diverter actuator stem and the first outlet and the second outlet; wherein, the first configuration, the diverter actuator stem directs a fluid to the first outlet and closes the second outlet and the third outlet; wherein, the second configuration, the diverter actuator stem directs the fluid to the second outlet and closes the first outlet and the third outlet; wherein, the third configuration, the diverter actuator stem directs the fluid to the third outlet and closes the first outlet and the second outlet; wherein, upon a reduction in the water pressure to the interior causes the diverter return spring to open the gap between the auto drain seal plunger and the valve body, allowing the water to drain from the first, second and third outlet, all associated pipes connected to these outlets, devices connected to these outlets, and diverter body interior automatically; and wherein a diverter cap may be placed on the first outlet, the second outlet, or the third outlet not allowing the fluid to flow through the first outlet, the second outlet, or the third outlet.

Statement 48: The fluid valve with automatic draining diverter of Statement 47 wherein the diverter actuator stem is mounted perpendicular within the valve body.

Statement 49: The fluid valve with automatic draining diverter of Statement 47, further comprising a diverter handle, the diverter handle is coupled to the upper diverter stem using a screw.

Statement 50: The fluid valve with automatic draining diverter of Statement 47, wherein the diverter return spring is a pressure sensitive diverter return spring.

Statement 51: The fluid valve with automatic draining diverter of Statement 50, wherein the pressure sensitive diverter return spring is mounted parallel to a central axis of the diverter actuator stem.

Statement 52: The fluid valve with automatic draining diverter of Statement 47, wherein the auto drain seal plunger is located in between the diverter actuator stem and the diverter return spring.

Statement 53: The fluid valve with automatic draining diverter of Statement 50, wherein the pressure sensitive diverter return spring is configured in a compressed configuration and a normal configuration.

Statement 54: The fluid valve with automatic draining diverter of Statement 53, wherein the compressed configuration, the auto drain seal plunger seals the diverter passage.

Statement 55: The fluid valve with automatic draining diverter of Statement 53 wherein the normal configuration, the auto drain seal plunger seals the first outlet, the second outlet, and the third outlet.

Statement 56: The fluid valve with automatic draining diverter of Statement 47, wherein the diverter actuator stem is configured to move the diverter actuator stem vertically within the valve body.

Statement 57: The fluid valve with automatic draining diverter of Statement 56, wherein an increase in a fluidic pressure within the interior causes the diverter actuator stem to descend vertically within the valve body, the pressure sensitive diverter return spring compresses from a normal configuration to a compressed configuration, closing a gap between the lower diverter body and the valve body, closing the diverter passage, and opening the first outlet, the second outlet, or the third outlet.

Statement 58: The fluid valve with automatic draining diverter of Statement 56, wherein a decrease in the fluidic pressure within the interior causes the diverter actuator stem to ascend vertically within the valve body, the pressure sensitive diverter return spring expands from a compressed configuration to a normal configuration, opening a gap between the lower diverter body and the valve body, opening the diverter outlet and closing the first outlet, the second outlet, and the third outlet to drain automatically into the drain.

Statement 59: The fluid valve with automatic draining diverter of Statement 47, further comprising a valve body cap to encapsulate the diverter actuator stem, the auto drain seal plunger, and the pressure sensitive diverter return spring within the valve body.

Statement 60: A fluid valve with automatic draining diverter comprising: a valve body defining an interior; a first fluid inlet and a second fluid inlet in fluidic communication with the interior; a first passage in fluidic communication with the interior; a first outlet in fluidic communication with the first passage; a second passage in fluidic communication with the interior; a second outlet in fluidic communication with the second passage; a diverter passage in fluidic communication with the interior; a diverter outlet in fluidic communication with the diverter passage; a boot seal configured to regulate a flow of a fluid from the first fluid inlet, the second fluid inlet, and seal the fluid from a handle and a diverter body; a diverter knob configured to rotate a diverter body between a first configuration, a second configuration, and a third configuration; a diverter return spring mounted between the diverter body and a valve body cap; wherein, the first configuration, the diverter body directs a fluid to the first outlet; wherein, the second configuration, the diverter body directs the fluid to the second outlet; and wherein, the third configuration, the diverter body directs the fluid to the drain outlet.

Statement 61: The fluid valve with automatic draining diverter of Statement 60, wherein the diverter body is mounted perpendicular within the valve body.

Statement 62: The fluid valve with automatic draining diverter of Statement 60, wherein the diverter knob is coupled to the diverter body in a recess of a diverter handle.

Statement 63: The fluid valve with automatic draining diverter of Statement 60, wherein the diverter return spring is a pressure sensitive diverter return spring.

Statement 64: The fluid valve with automatic draining diverter of Statement 63, wherein the pressure sensitive diverter return spring is mounted parallel to a central axis of the diverter body.

Statement 65: The fluid valve with automatic draining diverter of Statement 60, wherein the boot seal is located in between the handle and the diverter body.

Statement 66: The fluid valve with automatic draining diverter of Statement 63, wherein the pressure sensitive diverter return spring is configured in a compressed configuration and a normal configuration.

Statement 67: The fluid valve with automatic draining diverter of Statement 66, wherein the compressed configuration, the diverter body seals the diverter passage.

Statement 68: The fluid valve with automatic draining diverter of Statement 66, wherein the normal configuration, the diverter body seals the first outlet and the second outlet.

Statement 69: The fluid valve with automatic draining diverter of Statement 60, wherein the diverter body is configured to move vertically within the valve body.

Statement 70: The fluid valve with automatic draining diverter of Statement 69, wherein an increase in a fluidic pressure within the interior causes the diverter body to descend vertically within the valve body, the pressure diverter return spring compresses from a normal configuration to a compressed configuration, closing the diverter passage, and opening the first outlet and the second outlet.

Statement 71: The fluid valve with automatic draining diverter of Statement 69, wherein a decrease in the fluidic pressure within the interior causes the diverter body to ascend vertically within the valve body, the pressure sensitive diverter return spring expands from a compressed configuration to a normal configuration, opening the diverter passage, allowing water to flow from the first outlet, the second outlet, associated pipes, devices connected to the first outlet and second outlet, and diverter body interior, automatically draining the fluid in the first outlet and second outlet and associated pipes and diverter body interior to the drain.

Statement 72: The fluid valve with automatic draining diverter of Statement 60, further comprising a threaded valve body cap, the threaded valve body cap is coupled to the valve body, and contains the boot seal, the diverter body, and the pressure sensitive diverter return spring within the valve body.

Statement 73: A fluid valve with automatic draining diverter comprising: a valve body defining an interior; a fluid inlet in fluidic communication with the interior; a first passage in fluidic communication with the interior; a first outlet in fluidic communication with the first passage; a second passage in fluidic communication with the interior; a second outlet in fluidic communication with the second passage; a diverter passage in fluidic communication with the interior; a diverter outlet in fluidic communication with the diverter passage; a diverter actuator stem configured to rotate between a first configuration and a second configuration; and an auto drain seal mounted within the diverter actuator stem; wherein, the first configuration, the diverter actuator stem directs a fluid to the first outlet and closes the second outlet; wherein, the second configuration, the diverter actuator stem directs the fluid to the second outlet and closes the first outlet.

Statement 74: The fluid valve with automatic draining diverter of Statement 73, wherein the diverter actuator stem is mounted perpendicularly within the valve body and comprises: an upper diverter actuator coupled to a diverter handle, the upper diverter actuator comprising at least one hole; the auto drain seal coupled to a diverter seal retainer; and a lower diverter actuator coupled to the auto drain seal.

Statement 75: The fluid valve with automatic draining diverter of Statement 74, wherein the diverter actuator stem provides a positive stop in either a clockwise or a counterclockwise direction.

Statement 76: The fluid valve with automatic draining diverter of Statement 75, wherein the auto drain seal is a pressure sensitive auto drain seal, the pressure sensitive auto drain seal configured in an expanded configuration and a normal configuration.

Statement 77: The fluid valve with automatic draining diverter of Statement 74, wherein an increase in a fluidic pressure within the interior causes the auto drain seal to expand within the diverter actuator stem from a normal configuration to an expanded configuration, closing a gap between the lower diverter actuator and the diverter outlet, and opening the first outlet or the second outlet, and wherein a decrease in a fluidic pressure within the interior causes the auto drain seal to return to a normal configuration from the expanded configuration, opening the gap between the lower diverter actuator and the diverter outlet, allowing the fluid to drain from the first outlet, the second outlet, associated pipes connected to the first outlet or the second outlet, devices connected to the first outlet or the second outlet, and the interior.

Statement 78: The fluid valve with automatic draining diverter of Statement 74, further comprising a valve cap which is coupled to the diverter handle, the valve cap encapsulates the upper diverter actuator, the auto drain seal, and the lower diverter actuator within the valve body.

Statement 79: The fluid valve with automatic draining diverter of Statement 74, further comprising: a third passage in fluidic communication with the interior; and a third outlet in fluidic communication with the third passage; wherein the diverter actuator stem is further configured to rotate between the first configuration, the second configuration, and a third configuration; wherein the auto drain seal is an auto drain seal diaphragm; wherein, in the first configuration, the diverter actuator stem directs a fluid to the first outlet and closes the second outlet and the third outlet; wherein, in the second configuration, the diverter actuator stem directs the fluid to the second outlet and closes the first outlet and third outlet; wherein, in the third configuration, the diverter actuator stem directs the fluid to the third outlet and closes the first outlet and the second outlet; wherein a diverter cap may be placed on the first outlet, the second outlet, or the third outlet not allowing the fluid to flow through the first outlet, the second outlet, or the third outlet.

Statement 80: The fluid valve with automatic draining diverter of Statement 79, further comprising: a diverter sleeve to encapsulate the upper diverter actuator, the auto drain seal diaphragm, and the lower diverter actuator; and at least one seal, the at least one seal is coupled externally to the upper diverter actuator and provides a seal against the diverter sleeve, the at least one seal provides a seal against the valve body and the diverter sleeve.

Statement 81: The fluid valve with automatic draining diverter of Statement 80, wherein the upper diverter actuator, the auto drain seal diaphragm and the lower diverter actuator provides fluidic communication between the fluid inlet and the first passage, fluidic communication between the fluid inlet and the second passage, and fluidic communication between the fluid inlet and the third passage.

Statement 82: The fluid valve with automatic draining diverter of Statement 81, further comprising a threaded valve bonnet which is coupled to the valve body and encloses the upper diverter actuator, the auto drain seal diaphragm, and the lower diverter actuator within the valve body.

Statement 83: A fluid valve with automatic draining diverter comprising: a valve body defining an interior; a fluid inlet in fluidic communication with the interior; a first passage in fluidic communication with the interior; a first outlet in fluidic communication with the first passage; a second passage in fluid communication with the interior; a second outlet in fluidic communication with the second passage; a diverter passage in fluidic communication with the interior; a diverter outlet in fluidic communication with the diverter passage; a diverter actuator stem configured to rotate between a first configuration and a second configuration; and a diverter return spring and an auto drain seal plunger mounted between the diverter actuator stem and the first outlet and the second outlet; wherein, in the first configuration, the diverter actuator stem directs a fluid to the first outlet and closes the second outlet; wherein, in the second configuration, the diverter actuator stem directs the fluid to the second outlet and closes the first outlet; wherein, a reduction in water pressure in the interior causes the diverter return spring to open a gap between the auto drain seal plunger and the valve body, allowing water to drain from the first and the second outlet, all associated pipes connected to these outlets, devices connected to these outlets, and diverter body interior automatically.

Statement 84: The fluid valve with automatic draining diverter of Statement 83, wherein the diverter actuator stem is mounted perpendicularly within the valve body and comprises: an upper diverter actuator body coupled to a diverter handle; the diverter return spring, the diverter return spring comprising a pressure sensitive diverter return spring mounted parallel to a central axis of the diverter actuator stem; and a lower diverter actuator; wherein the pressure sensitive diverter return spring is configured in a compressed configuration and a normal configuration; wherein the diverter actuator stem is configured to move vertically within the valve body.

Statement 85: The fluid valve with automatic draining diverter of Statement 84, wherein the auto drain seal plunger is located in between the diverter actuator stem and the pressure sensitive diverter return spring.

Statement 86: The fluid valve with automatic draining diverter of Statement 84, wherein the pressure sensitive diverter return spring is configured in a compressed configuration and a normal configuration, wherein, in the compressed configuration, the auto drain seal plunger seals the diverter passage, and wherein, in the normal configuration, the auto drain seal plunger seals the first outlet and the second outlet.

Statement 87: The fluid valve with automatic draining diverter of Statement 84, further comprising a threaded valve body cap to enclose the diverter actuator stem, the auto drain seal plunger, and the pressure sensitive diverter return spring within the valve body.

Statement 88: The fluid valve with automatic draining diverter of Statement 84, further comprising: a third passage in fluidic communication with the interior; and a third outlet in fluidic communication with the third passage; wherein the diverter actuator stem is configured to rotate between a first configuration, a second configuration, and a third configuration; wherein, in the first configuration, the diverter actuator stem directs a fluid to the first outlet and closes the second outlet and the third outlet; wherein, in the second configuration, the diverter actuator stem directs the fluid to the second outlet and closes the first outlet and the third outlet; wherein, in the third configuration, the diverter actuator stem directs the fluid to the third outlet and closes the first outlet and the second outlet; wherein, the reduction in the water pressure to the interior causes the diverter return spring to open the gap between the auto drain seal plunger and the valve body, allowing the water to drain from the first, second and third outlet, all associated pipes connected to these outlets, devices connected to these outlets, and diverter body interior automatically; wherein a diverter cap may be placed on the first outlet, the second outlet, or the third outlet not allowing the fluid to flow through the first outlet, the second outlet, or the third outlet.

Statement 89: A fluid valve with automatic draining diverter comprising: a valve body defining an interior; a first fluid inlet and a second fluid inlet in fluidic communication with the interior; a first passage in fluidic communication with the interior; a first outlet in fluidic communication with the first passage; a second passage in fluidic communication with the interior; a second outlet in fluidic communication with the second passage; a diverter passage in fluidic communication with the interior; a diverter outlet in fluidic communication with the diverter passage; a boot seal configured to regulate a flow of a fluid from the first fluid inlet, the second fluid inlet, and seal the fluid from a handle and a diverter body; a diverter knob configured to rotate a diverter body between a first configuration, a second configuration, and a third configuration; and a diverter return spring mounted between the diverter body and a valve body cap; wherein, in the first configuration, the diverter body directs a fluid to the first outlet; wherein, in the second configuration, the diverter body directs the fluid to the second outlet; wherein, in the third configuration, the diverter body directs the fluid to a drain outlet.

Statement 90: The fluid valve with automatic draining diverter of Statement 89, wherein the diverter knob is coupled to the diverter body in a recess of a diverter handle.

Statement 91: The fluid valve with automatic draining diverter of Statement 89, wherein the diverter return spring is a pressure sensitive diverter return spring mounted parallel to a central axis of the diverter body, the pressure sensitive diverter return spring configured in a compressed configuration and a normal configuration, wherein, in the compressed configuration, the diverter body seals the diverter passage, and wherein, in the normal configuration, the diverter body the diverter body seals the first outlet and the second outlet.

Statement 92: The fluid valve with automatic draining diverter of Statement 91, wherein an increase in a fluidic pressure within the interior causes the diverter body to descend vertically within the valve body, the pressure sensitive diverter return spring compresses from a normal configuration to a compressed configuration, closing the diverter passage, and opening the first outlet and the second outlet, and wherein a decrease in the fluidic pressure within the interior causes the diverter body to ascend vertically within the valve body, the pressure sensitive diverter return spring expands from a compressed configuration to a normal configuration, opening the diverter passage, allowing water to flow from the first outlet, the second outlet, associated pipes, devices connected to the first outlet and second outlet, and diverter body interior, automatically draining the fluid in the first outlet and second outlet and associated pipes and diverter body interior to the drain outlet.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A fluid valve with automatic draining diverter comprising:
   a valve body defining an interior;
   a fluid inlet in fluidic communication with the interior;
   a first passage in fluidic communication with the interior;
   a first outlet in fluidic communication with the first passage;
   a second passage in fluidic communication with the interior;
   a second outlet in fluidic communication with the second passage;
   a diverter passage in fluidic communication with the interior;
   a diverter outlet in fluidic communication with the diverter passage; and
   a diverter actuator stem configured to rotate between a first configuration and a second configuration and mounted perpendicularly within the valve body; the diverter actuator stem comprising:
      an upper diverter actuator coupled to a diverter handle, the upper diverter actuator comprising at least one hole;
      an auto drain seal mounted within the diverter actuator stem and coupled to a diverter seal retainer; and
      a lower diverter actuator coupled to the auto drain seal;
   wherein, in the first configuration, the diverter actuator stem directs a fluid to the first outlet and closes the second outlet;
   wherein, in the second configuration, the diverter actuator stem directs the fluid to the second outlet and closes the first outlet.

2. The fluid valve with automatic draining diverter of claim 1, wherein the diverter actuator stem provides a positive stop in either a clockwise or a counterclockwise direction.

3. The fluid valve with automatic draining diverter of claim 1, wherein the auto drain seal is a pressure sensitive auto drain seal, the pressure sensitive auto drain seal configured in an expanded configuration and a normal configuration.

4. The fluid valve with automatic draining diverter of claim 1, wherein an increase in a fluidic pressure within the interior causes the auto drain seal to expand within the diverter actuator stem from a normal configuration to an expanded configuration, closing a gap between the lower diverter actuator and the diverter outlet, and opening the first outlet or the second outlet, and wherein a decrease in a fluidic pressure within the interior causes the auto drain seal to return to a normal configuration from the expanded configuration, opening the gap between the lower diverter actuator and the diverter outlet, allowing the fluid to drain from the first outlet, the second outlet, associated pipes connected to the first outlet or the second outlet, devices connected to the first outlet or the second outlet, and the interior.

5. The fluid valve with automatic draining diverter of claim 1, further comprising a valve cap which is coupled to the diverter handle, the valve cap encapsulates the upper diverter actuator, the auto drain seal, and the lower diverter actuator within the valve body.

6. The fluid valve with automatic draining diverter of claim 1, further comprising:
   a third passage in fluidic communication with the interior; and
   a third outlet in fluidic communication with the third passage;
   wherein the diverter actuator stem is further configured to rotate between the first configuration, the second configuration, and a third configuration;
   wherein the auto drain seal is an auto drain seal diaphragm;
   wherein, in the first configuration, the diverter actuator stem directs a fluid to the first outlet and closes the second outlet and the third outlet;
   wherein, in the second configuration, the diverter actuator stem directs the fluid to the second outlet and closes the first outlet and third outlet;
   wherein, in the third configuration, the diverter actuator stem directs the fluid to the third outlet and closes the first outlet and the second outlet;
   wherein a diverter cap is located on the first outlet, the second outlet, or the third outlet not allowing the fluid to flow through the first outlet, the second outlet, or the third outlet.

7. The fluid valve with automatic draining diverter of claim 6, further comprising:
   a diverter sleeve to encapsulate the upper diverter actuator, the auto drain seal diaphragm, and the lower diverter actuator; and
   at least one seal, the at least one seal is coupled externally to the upper diverter actuator and provides a seal against the diverter sleeve, the at least one seal provides a seal against the valve body and the diverter sleeve.

8. The fluid valve with automatic draining diverter of claim 7, wherein the upper diverter actuator, the auto drain seal diaphragm and the lower diverter actuator provides fluidic communication between the fluid inlet and the first passage, fluidic communication between the fluid inlet and the second passage, and fluidic communication between the fluid inlet and the third passage.

9. The fluid valve with automatic draining diverter of claim 8, further comprising a threaded valve bonnet which is coupled to the valve body and encloses the upper diverter actuator, the auto drain seal diaphragm, and the lower diverter actuator within the valve body.

* * * * *